US010262352B2

(12) United States Patent
Holman et al.

(10) Patent No.: US 10,262,352 B2
(45) Date of Patent: Apr. 16, 2019

(54) DIRECTING ONE OR MORE USERS TO ONE OR MORE AUTOMATED CUSTOMIZED FOOD GENERATION MACHINES

(71) Applicant: Elwha LLC, Bellevue, WA (US)

(72) Inventors: Pablos Holman, Seattle, WA (US); Roderick A. Hyde, Redmond, WA (US); Muriel Y. Ishikawa, Livermore, CA (US); Jordin T. Kare, Seattle, WA (US); Max R. Levchin, San Francisco, CA (US); Royce A. Levien, Lexington, MA (US); Richard T. Lord, Gig Harbor, WA (US); Robert W. Lord, Seattle, WA (US); Mark A. Malamud, Seattle, WA (US); Nathan P. Myhrvold, Bellevue, WA (US); Robert C. Petroski, Seattle, WA (US); Clarence T. Tegreene, Mercer Island, WA (US); Charles Whitmer, North Bend, WA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 804 days.

(21) Appl. No.: 14/200,514

(22) Filed: Mar. 7, 2014

(65) Prior Publication Data
US 2015/0187026 A1   Jul. 2, 2015

Related U.S. Application Data

(63) Continuation of application No. 14/199,667, filed on Mar. 6, 2014, which is a continuation-in-part of
(Continued)

(51) Int. Cl.
*G06Q 30/06*  (2012.01)
*G06Q 50/10*  (2012.01)
(Continued)

(52) U.S. Cl.
CPC ..... *G06Q 30/0621* (2013.01); *G06Q 30/0633* (2013.01); *G06Q 30/0635* (2013.01);
(Continued)

(58) Field of Classification Search
CPC .......... G06Q 30/0633; G06Q 30/0635; G06Q 30/0641; G06Q 30/0639; G06Q 20/3324; G06Q 50/12; G06Q 50/10
(Continued)

(56) References Cited

U.S. PATENT DOCUMENTS 5,147,068 A   9/1992   Wright
5,997,924 A   12/1999   Olander, Jr. et al.
(Continued)

OTHER PUBLICATIONS

Rodgers, Svetlana. Technological innovation supporting different food production philosophies in the food service sectors. International Journal of Contemporary Hospitality Management; Bradford vol. 20, Iss. 1, (2008): 19-34.*
(Continued)

*Primary Examiner* — Nathan C Uber
*Assistant Examiner* — Fawaad Haider

(57) ABSTRACT

Computationally implemented methods and systems include acquiring user preference information of a user that indicates one or more customized food preferences of the user including at least one or more preferences related to integrity of one or more ingredients for use in generating one or more customized food items; identifying one or more capable automated customized food generation machines that have one or more ingredients in one or more sufficient quantities to be able to currently generate at least one customized food
(Continued)

item in accordance with the one or more customized food preferences of the user; and presenting, in response at least in part to the identification, one or more indicators that direct the user to at least one automated customized food generation machine. In addition to the foregoing, other aspects are described in the claims, drawings, and text.

40 Claims, 40 Drawing Sheets

Related U.S. Application Data application No. 14/145,864, filed on Dec. 31, 2013, which is a continuation of application No. 14/144,163, filed on Dec. 30, 2013, said application No. 14/199,667 is a continuation-in-part of application No. 14/176,408, filed on Feb. 10, 2014, which is a continuation of application No. 14/175,416, filed on Feb. 7, 2014, now Pat. No. 9,824,382.

(51) Int. Cl.
  *G06Q 50/12*   (2012.01)
  *G07F 11/00*   (2006.01)
  *G07F 17/00*   (2006.01)
  *G07F 9/02*    (2006.01)

(52) U.S. Cl.
  CPC ..... *G06Q 30/0639* (2013.01); *G06Q 30/0641* (2013.01); *G06Q 50/10* (2013.01); *G06Q 50/12* (2013.01); *G07F 9/023* (2013.01); *G07F 11/002* (2013.01); *G07F 17/0064* (2013.01)

(58) Field of Classification Search
  USPC .......................................................... 705/15
  See application file for complete search history.

(56) References Cited

U.S. PATENT DOCUMENTS

| | | |
|---|---|---|
| 6,646,659 B1 | 11/2003 | Brown et al. |
| 6,662,195 B1 | 12/2003 | Langseth et al. |
| 7,076,438 B1 | 7/2006 | Tobelmann et al. |
| 7,421,285 B1 | 9/2008 | Rao et al. |
| 8,255,699 B2 | 8/2012 | Tagscherer |
| 8,429,026 B1 | 4/2013 | Kolawa et al. |
| 8,504,440 B1 | 8/2013 | Kolawa et al. |
| 8,751,334 B2 | 6/2014 | Wijaya et al. |
| 8,863,649 B1 | 10/2014 | Rao et al. |
| 9,172,738 B1 | 10/2015 | daCosta |
| 9,239,246 B2 | 1/2016 | Jones |
| 2001/0011680 A1 | 8/2001 | Soltesz et al. |
| 2002/0081356 A1 | 6/2002 | Bebiak et al. |
| 2003/0006281 A1 | 1/2003 | Thomas et al. |
| 2003/0028885 A1 | 2/2003 | Wilcox et al. |
| 2003/0061094 A1 | 3/2003 | Banerjee et al. |
| 2004/0238555 A1* | 12/2004 | Parks ............ G07F 9/105 221/80 |
| 2005/0267811 A1 | 12/2005 | Almblad |
| 2006/0188620 A1 | 8/2006 | Gutwein et al. |
| 2007/0112460 A1 | 5/2007 | Kiselik |
| 2007/0231425 A1 | 10/2007 | Ream et al. |
| 2007/0294129 A1 | 12/2007 | Froseth et al. |
| 2008/0012726 A1 | 1/2008 | Publicover |
| 2009/0077007 A1 | 3/2009 | Schwarzberg et al. |
| 2009/0204492 A1 | 8/2009 | Scifo et al. |
| 2009/0228325 A1 | 9/2009 | Simmons et al. |
| 2009/0275075 A1 | 11/2009 | Dodd et al. |
| 2010/0255484 A1 | 10/2010 | Halverson et al. |
| 2011/0208617 A1 | 8/2011 | Weiland |
| 2011/0238296 A1 | 9/2011 | Purks et al. |
| 2012/0102993 A1 | 5/2012 | Hortin |
| 2012/0226698 A1 | 9/2012 | Silvestre et al. |
| 2012/0239683 A1 | 9/2012 | Starkman |
| 2012/0303573 A1 | 11/2012 | Pan et al. |
| 2012/0323691 A1 | 12/2012 | McLaughlin et al. |
| 2013/0024299 A1 | 1/2013 | Wong et al. |
| 2013/0029693 A1 | 1/2013 | Bradley, Jr. et al. |
| 2013/0054016 A1 | 2/2013 | Canter et al. |
| 2013/0085345 A1 | 4/2013 | Geisner et al. |
| 2013/0218687 A1 | 8/2013 | Sohangir et al. |
| 2013/0311311 A1 | 11/2013 | Chopra et al. |
| 2013/0317921 A1 | 11/2013 | Havas |
| 2014/0037805 A1 | 2/2014 | Minvielle |
| 2014/0080102 A1 | 3/2014 | Krishna |
| 2014/0108320 A1 | 4/2014 | Baca et al. |
| 2015/0058063 A1 | 2/2015 | Pinel et al. |
| 2015/0227140 A1 | 8/2015 | Douglas et al. |

OTHER PUBLICATIONS

"Burritobot: A 3-D Printer That Spits Out Burritos"; bearing a date of Jun. 19, 2012; retrieved on Aug. 26, 2015; pp. 1-9; located at: http://www.fastcodesign.com/1670070/burritobot-a-3-d-printer-that-spits-out-burritos (hereinafter "Burritobot").

"Inside Redbox Mobile Demo"; bearing a date of Feb. 1, 2009; uploaded to YouTube by habdeira; retrieved on Aug. 27, 2015; 1 page; located at: https://www.youtube.come/watch?v—iroan2Btza; ("Redbox").

"Say Hello to Burritobox, The World's First Burrito Vending Machine"; bearing a date of Jan. 8, 2014; updated on Jan. 23, 2014; pp. 1-3.

Andersen; "Freshly Baked Pizzas . . . from a Vending Machine?"; bearing a date of Aug. 27, 2013; pp. 1-2; located at: http://slice.seriouseats.com/archives/2013/08/freshly-baked-pizzasfrom-a-vending-machine.html.

pizzamarketplace.com; "Let's Pizza vending machine ready for U.S. debut"; bearing a date of Jun. 5, 2017; pp. 1-2; located at: https://www.pizzamarketplace.com/articles/lets-pizza-vending-machine-ready-for-us-debut/.

Microwave Oven reference, The Southwest Museum of Engineering, Communication and Computation; 2007; total of 13 pages; located at: http://www.smecc.org/microwave_oven.htm.

"EatWaveTM Vending Launches the Industry's First 'All-In-One' Vending Machine for Hot and Cold Food Items as well as Snacks and Drinks": Business Wire; Nov. 6, 2012; total of 3 pages, ProQuest LLC 2018.

Rodgers, Svetlana; "Technological innovation supporting different food production philosophies in the food service sectors"; International Journal of Contemporary Hospitality Management; 2008; pp. 19-34; vol. 20; Issue 1.

* cited by examiner

Customized Food: Hamburger

Requested Customization:
- Beef from Kobe, Japan
- Beef Source tested for Prions
- Whole Wheat Bread
- No mustard ← 210a Indicator

FULLY CAPABLE MACHINES

| OPTION | ADDRESS | DISTANCE | Price |
|---|---|---|---|
| 1 | Shell Gas Station – 245 Main Street | 745 YARDS | $6.50 |
| 2 | Lakeview Mall – Food Court – red vending machine | ¾ MILES | $6.50 |

SUBSTITUTE MACHINES

| OPTION | ADDRESS | DISTANCE | Non-compliance | Price |
|---|---|---|---|---|
| 3 | 245 North Street | 440 YARDS | Beef from Texas | $5.20 |

200e Screen

220e Indicator

FIG. 2E

302* User Preference Information Obtaining Module

402 User Entry Obtaining Module

404 User Device User Preference Information Obtaining Module

406 Memory User Preference Information Obtaining Module

408 Internet User Preference Information Obtaining Module

410 User Proximity Detecting Module

412 User Affiliated Determining Module

414 Unsatisfactory Automated Customized Food Generation Machine Determining Module

FIG. 4A

306* Indicator Presenting Module

436 Electronic Indicator Communicating Module

438 Textual Indicator Presenting Module

440 Graphical Indicator Presenting Module

FIG. 4C

304\* Capable Automated Customized Food Generation Machine Ascertaining Module

- 416 Automated Customized Food Generation Machine Identifier Ascertaining Module
- 418 Automated Customized Food Generation Machine Location Ascertaining Module
- 420 Distance Ascertaining Module
- 422 Travel Instructions Ascertaining Module
- 424 Short Traveling Distance Determining Module
- 426 Automated Customized Food Generation Machine Querying Module
- 428 Nearby Automated Customized Food Generation Machine Ascertaining Module
- 430 Substitute Automated Food Generation Machine Ascertaining Module
- 432 Unsatisfactory Interfaced Machine Detecting Module
- 434 Unsatisfactory Proximity Machine Detecting Module

FIG. 4B

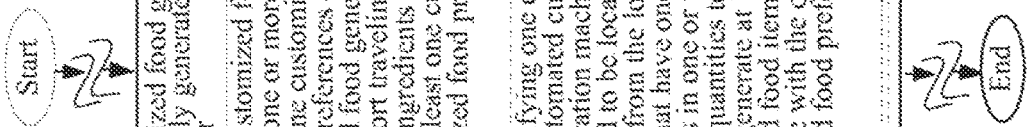

804 Identifying one or more capable automated customized food generation machines that have one or more ingredients in one or more sufficient quantities to be able to currently generate at least one customized food item in accordance with the one or more customized food preferences of the user 741 Identifying the one or more capable automated customized food generation machines that have the one or more ingredients in the one or more sufficient quantities to be able to currently generate at least the one customized food item in accordance with the one or more customized food preferences of the user by identifying one or more capable automated customized food generation machines that are determined to be located within a short traveling distance from a location of the user and that have one or more ingredients in one or more sufficient quantities to be able to currently generate at least one customized food item in accordance with the one or more customized food preferences of the user 742 Identifying one or more capable automated customized food generation machines that are determined to be located within a maximum distance corresponding to a maximum distance traveled by a user via walking, mass transit, and/or automobile in 30 minutes and that have one or more ingredients in one or more sufficient quantities to be able to currently generate at least one customized food item in accordance with the one or more customized food preferences of the user 743 Identifying one or more capable automated customized food generation machines that are determined to be located within five miles from the location of the user and that have one or more ingredients in one or more sufficient quantities to be able to currently generate at least one customized food item in accordance with the one or more customized food preferences of the user 744 Identifying the one or more capable automated customized food generation machines that have the one or more ingredients in the one or more sufficient quantities to be able to currently generate the at least one customized food item in accordance with the one or more customized food preferences of the user, the identification being based on data stored in a memory, the data having been previously supplied to the memory by one or more capable automated customized food generation machines and indicating ingredient supply statuses of the one or more capable automated customized food generation machines

FIG. 7B

504 Identifying one or more capable automated customized food generation machines that have one or more ingredients in one or more sufficient quantities to be able to currently generate at least one customized food item in accordance with the one or more customized food preferences of the user

745 Identifying the one or more capable automated customized food generation machines that have the one or more ingredients in the one or more sufficient quantities to be able to currently generate the at least one customized food item in accordance with the one or more customized food preferences of the user by querying one or more automated customized food generation machines in order to determine that the one or more queried automated customized food generation machines have the one or more ingredients in the one or more sufficient quantities to be able to currently generate the at least one customized food item in accordance with the one or more customized food preferences of the user

746a Determining presence of one or more automated customized food generation machines within a short walking, mass transit, and/or driving distance from current location of the user

747 Determining the presence of the one or more automated customized food generation machines within the short walking, mass transit, and/or driving distance from the current location of the user by determining presence of one or more automated customized food generation machines within one mile from current location of the user

748 Determining the presence of the one or more automated customized food generation machines within the short walking, mass transit, and/or driving distance from the current location of the user by determining presence of one or more automated customized food generation machines within five miles from the current location of the user

749 Determining the presence of the one or more automated customized food generation machines within the short walking, mass transit, and/or driving distance from the current location of the user by determining presence of one or more automated customized food generation machines within 30 minutes of traveling by walking, mass transit, and/or automobile from the current location of the user

746b Querying the one or more automated customized food generation machines that were determined to be located within the short walking, mass transit, and/or driving distance from the current location of the user in order to determine that the one or more capable automated customized food generation machines have the one or more ingredients in the one or more sufficient quantities to be able to currently generate the at least one customized food item in accordance with the one or more customized food preferences of the user

FIG. 7C

Start →

504 Identifying one or more capable automated customized food generation machines that have one or more ingredients in one or more sufficient quantities to be able to currently generate at least one customized food item in accordance with the one or more customized food preferences of the user

758 Identifying the one or more capable automated customized food generation machines that have one or more ingredients in one or more sufficient quantities to be able to currently generate at least one customized food item in accordance with one or more purity preferences of the user related to purity of one or more ingredients to be used for generating the at least one customized food item

759 Identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested for presence or absence of one or more impurities

762 Identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested for presence or absence of one or more selective bacteria

763 Identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested to confirm that the one or more selective bacteria are present in the one or more sources at below one or more predefined levels

764 Identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested for the presence of the one or more selective bacteria within one or more predefined amounts of time from when the one or more ingredients were harvested from the one or more sources

765 Identifying the one or more capable automated customized food generation machines by identifying one or more capable automated customized food generation machines that have one or more sufficient quantities to be able to currently generate at least one customized food item in accordance with one or more preferences of the user that the one or more sources for the one or more ingredients were tested for presence or absence of the one or more selective bacteria, the one or more selective bacteria including at least one of enterococcus, E. coli, campylobacter, klebsiella pneumoniae, salmonella, or staphylococcus aureus → End

FIG. 7G

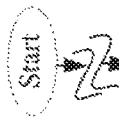

504 Identifying one or more capable automated customized food generation machines that have one or more ingredients in one or more sufficient quantities to be able to currently generate at least one customized food item in accordance with the one or more customized food preferences of the user 758 Identifying the one or more capable automated customized food generation machines by identifying one or more capable automated customized food generation machines that have one or more ingredients in one or more sufficient quantities to be able to currently generate at least one customized food item in accordance with one or more purity preferences of the user related to purity of one or more ingredients to be used for generating the at least one customized food item 759 Identifying the one or more capable automated customized food generation machines by identifying one or more capable automated customized food generation machines that have one or more ingredients in one or more sufficient quantities to be able to currently generate at least one customized food item in accordance with one or more preferences of the user that one or more sources for the one or more ingredients were tested for presence or absence of one or more impurities 766 Identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested for presence or absence of one or more antibiotics 767 Identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested to confirm that the one or more antibiotics are present in the one or more sources at below one or more predefined levels 768 Identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested for presence or absence of one or more pesticides 769 Identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources were tested to confirm that the one or more sources were tested to be free of one or more specified pesticides

FIG. 7H

504 Identifying one or more capable automated customized food generation machines that have one or more ingredients in one or more sufficient quantities to be able to currently generate at least one customized food item in accordance with the one or more customized food preferences of the user 758 Identifying the one or more capable automated customized food generation machines by identifying one or more capable automated customized food generation machines that have one or more ingredients in one or more sufficient quantities to be able to currently generate at least one customized food item in accordance with one or more purity preferences of the user related to purity of one or more ingredients to be used for generating the at least one customized food item 770 Identifying the one or more capable automated customized food generation machines that have the one or more ingredients in the one or more sufficient quantities to be able to currently generate the at least one customized food item in accordance with the one or more purity preferences of the user by identifying one or more capable automated customized food generation machines that have one or more ingredients in one or more sufficient quantities to be able to currently generate at least one customized food item in accordance with one or more preferences of the user related to purity of one or more meat ingredients to be used for generating the at least one customized food item 771 Identifying the one or more capable automated customized food generation machines that have the one or more ingredients in the one or more sufficient quantities to be able to currently generate the at least one customized food item in accordance with the one or more purity preferences of the user by identifying one or more capable automated customized food generation machines that have one or more ingredients in one or more sufficient quantities to be able to currently generate at least one customized food item in accordance with one or more preferences of the user related to purity of one or more processed ingredients to be used for generating the at least one customized food item 772 Identifying the one or more capable automated customized food generation machines that have the one or more ingredients in the one or more sufficient quantities to be able to currently generate the at least one customized food item in accordance with the one or more purity preferences of the user by identifying one or more capable automated customized food generation machines that have one or more ingredients in one or more sufficient quantities to be able to currently generate at least one customized food item in accordance with one or more preferences of the user related to purity of one or more vegetable ingredients to be used for generating the at least one customized food item

Start

End

FIG. 7I

DIRECTING ONE OR MORE USERS TO ONE OR MORE AUTOMATED CUSTOMIZED FOOD GENERATION MACHINES

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 14/199,667, entitled DIRECTING ONE OR MORE USERS TO ONE OR MORE AUTOMATED CUSTOMIZED FOOD GENERATION MACHINES, naming Pablos Holman, Son Hong, Roderick A. Hyde, Muriel Y. Ishikawa, Jordin T. Kare, Max R. Levchin, Royce A. Levien, Richard T. Lord, Robert W. Lord, Mark A. Malamud, Nathan P. Myhrvold, Robert C. Petroski, Clarence T. Tegreene, Charles Whitmer, Lowell L. Wood, Jr., and Victoria Y. H. Wood as inventors, filed 6 Mar. 2014, which is currently co-pending or is an application of which a currently co-pending application is entitled to the benefit of the filing date.

The present application constitutes a continuation-in-part of U.S. patent application Ser. No. 14/145,864, entitled SYSTEMS AND METHODS FOR PROVIDING CUSTOMIZED PACKAGINGS FOR CUSTOMIZED FOOD ITEMS THAT WERE CUSTOMIZED BASED, AT LEAST IN PART, ON CUSTOMIZED FOOD ITEM INTEGRITY PREFERENCE, naming Pablos Holman, Son Hong, Roderick A. Hyde, Muriel Y. Ishikawa, Jordin T. Kare, Max R. Levchin, Royce A. Levien, Richard T. Lord, Robert W. Lord, Mark A. Malamud, Nathan P. Myhrvold, Robert C. Petroski, Clarence T. Tegreene, Charles Whitmer, Lowell L. Wood, Jr., and Victoria Y. H. Wood, as inventors, filed 31, Dec. 2013, which is currently co-pending or is an application of which a currently co-pending application is entitled to the benefit of the filing date, and which is a continuation of U.S. patent application Ser. No. 14/144,163, entitled SYSTEMS AND METHODS FOR PROVIDING CUSTOMIZED PACKAGINGS FOR CUSTOMIZED FOOD ITEMS THAT WERE CUSTOMIZED BASED, AT LEAST IN PART, ON CUSTOMIZED FOOD ITEM INTEGRITY PREFERENCE, naming Pablos Holman, Son Hong, Roderick A. Hyde, Muriel Y. Ishikawa, Jordin T. Kare, Max R. Levchin, Royce A. Levien, Richard T. Lord, Robert W. Lord, Mark A. Malamud, Nathan P. Myhrvold, Robert C. Petroski, Clarence T. Tegreene, Charles Whitmer, Lowell L. Wood, Jr., and Victoria Y. H. Wood, as inventors, filed 30, Dec. 2013.

The present application constitutes a continuation-in-part of U.S. patent application Ser. No. 14/176,408, entitled SYSTEMS AND METHODS FOR PROVIDING CUSTOMIZED FOOD ITEMS THAT ARE CUSTOMIZED BASED, AT LEAST IN PART, ON CUSTOMIZED FOOD ITEM INTEGRITY PREFERENCE, naming Pablos Holman, Son Hong, Roderick A. Hyde, Muriel Y. Ishikawa, Jordin T. Kare, Max R. Levchin, Royce A. Levien, Richard T. Lord, Robert W. Lord, Mark A. Malamud, Nathan P. Myhrvold, Robert C. Petroski, Clarence T. Tegreene, Charles Whitmer, Lowell L. Wood, Jr., and Victoria Y. H. Wood, as inventors, filed 10, Feb. 2014, which is currently co-pending or is an application of which a currently co-pending application is entitled to the benefit of the filing date, and which is a continuation of U.S. patent application Ser. No. 14/175,416, entitled SYSTEMS AND METHODS FOR PROVIDING CUSTOMIZED FOOD ITEMS THAT ARE CUSTOMIZED BASED, AT LEAST IN PART, ON CUSTOMIZED FOOD ITEM INTEGRITY PREFERENCE, naming Pablos Holman, Son Hong, Roderick A. Hyde, Muriel Y. Ishikawa, Jordin T. Kare, Max R. Levchin, Royce A. Levien, Richard T. Lord, Robert W. Lord, Mark A. Malamud, Nathan P. Myhrvold, Robert C. Petroski, Clarence T. Tegreene, Charles Whitmer, Lowell L. Wood, Jr., and Victoria Y. H. Wood, as inventors, filed 7, Feb. 2014.

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes, but is not limited to, acquiring user preference information of a user that indicates one or more customized food preferences of the user including at least one or more preferences related to integrity of one or more ingredients for use in generating one or more customized food items, identifying one or more capable automated customized food generation machines that have one or more ingredients in one or more sufficient quantities to be able to currently generate at least one customized food item in accordance with the one or more customized food preferences of the user; and presenting, in response at least in part to the identification, one or more indicators that direct the user to at least one automated customized food generation machine. In various implementations, at least one of the above recited operations is performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for acquiring user preference information of a user that indicates one or more customized food preferences of the user including at least one or more preferences related to integrity of one or more ingredients for use in generating one or more customized food items, means for identifying one or more capable automated customized food generation machines that have one or more ingredients in one or more sufficient quantities to be able to currently generate at least one customized food item in accordance with the one or more customized food preferences of the user and means for presenting, in response at least in part to the identification, one or more indicators that direct the user to at least one automated customized food generation machine. In addition to the foregoing, other system aspects are described in the claims, drawings, and text forming a part of the disclosure set forth herein.

In one or more various aspects, a system includes, but is not limited to, circuitry for acquiring user preference information of a user that indicates one or more customized food preferences of the user including at least one or more preferences related to integrity of one or more ingredients for use in generating one or more customized food items, circuitry for identifying one or more capable automated customized food generation machines that have one or more ingredients in one or more sufficient quantities to be able to currently generate at least one customized food item in accordance with the one or more customized food preferences of the user; and circuitry for presenting, in response at least in part to the identification, one or more indicators that direct the user to at least one automated customized food generation machine. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, acquiring user preference information of a user that indicates one or more customized food preferences of the user including at least one or more preferences related to integrity of one or more ingredients for use in generating one or more customized food items, identifying one or more capable automated customized food generation machines that have one or more ingredients in one or more sufficient quantities to be able to currently generate at least one customized food item in accordance with the one or more customized food preferences of the user, and presenting, in response at least in part to the identification, one or more indicators that direct the user to at least one automated customized food generation machine. In addition to the foregoing, other computer program product aspects are described in the claims, drawings, and text forming a part of the disclosure set forth herein.

In one or more various aspects, a system includes, but is not limited to, a user preference information obtaining module configured to obtain user preference information of a user that indicates one or more customized food preferences of the user, the one or more customized food preferences of the user preference information including at least one or more preferences of the user that are related to integrity of one or more ingredients for use in generating one or more customized food items; a capable automated customized food generation machine ascertaining module configured to ascertain one or more capable automated customized food generation machines that have one or more ingredients in one or more sufficient quantities to be able to currently generate at least one customized food item in accordance with the one or more customized food preferences of the user; and an indicator presenting module configured to present one or more indicators that direct the user to at least one automated customized food generation machine, the presentation of the one or more indicators being in response at least in part to the ascertainment.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 2E illustrates an exemplary screen that identifies locations of capable and substitute automated customized food generation machines.

FIG. 3A shows a block diagram of a particular implementation of the automated customized food generation machine 10* of FIG. 1A illustrated as automated customized food generation machine 10a.

FIG. 3D shows a block diagram of a particular implementation of the network device 12* of FIG. 1B, 1C, or 1D illustrated as network device 12a.

FIG. 4A shows another perspective of the user preference information obtaining module 302* of FIG. 3A, 3B, 3D, or 3E (e.g., the user preference information obtaining module 302' of FIG. 3A, the user preference information obtaining module 302'' of FIG. 3B, the user preference information obtaining module 302''' of FIG. 3D, or the user preference information obtaining module 302'''' of FIG. 3E) in accordance with various implementations.

FIG. 4B shows another perspective of the capable automated customized food generation machine ascertaining module 304* of FIG. 3A, 3B, 3D, or 3E (e.g., the capable automated customized food generation machine ascertaining module 304' of FIG. 3A, the capable automated customized food generation machine ascertaining module 304'' of FIG. 3B, the capable automated customized food generation machine ascertaining module 304''' of FIG. 3D, or the capable automated customized food generation machine ascertaining module 304'''' of FIG. 3E) in accordance with various implementations.

FIG. 4C shows another perspective of the indicator presenting module 306* of FIG. 3A, 3B, 3D, or 3E (e.g., the indicator presenting module 306' of FIG. 3A, the indicator presenting module 306'' of FIG. 3B, the indicator presenting module 306''' of FIG. 3D, or the indicator presenting module 306'''' of FIG. 3E) in accordance with various implementations.

FIG. 7B is a high-level logic flowchart of a process depicting alternate implementations of the capable automated customized food generation machine identifying operation 504 of FIG. 5.

FIG. 7C is a high-level logic flowchart of a process depicting alternate implementations of the capable automated customized food generation machine identifying operation 504 of FIG. 5.

FIG. 7G is a high-level logic flowchart of a process depicting alternate implementations of the capable automated customized food generation machine identifying operation 504 of FIG. 5.

FIG. 7H is a high-level logic flowchart of a process depicting alternate implementations of the capable automated customized food generation machine identifying operation 504 of FIG. 5.

FIG. 7I is a high-level logic flowchart of a process depicting alternate implementations of the capable automated customized food generation machine identifying operation 504 of FIG. 5.

DETAILED DESCRIPTION

Figure 1A:
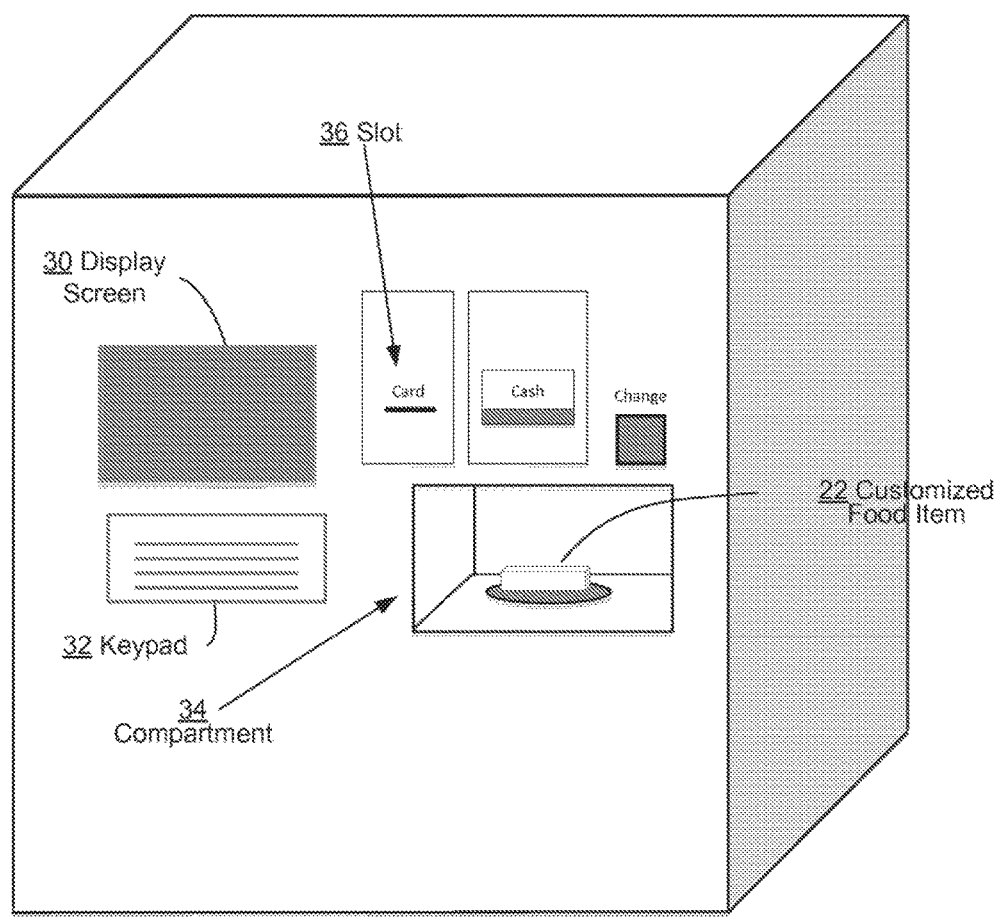
FIG. 1A illustrates an exemplary automated customized food generation machine 10* that is designed to generate customized food items.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex inter-chaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructionsper_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/ converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The development and evolution of food vending machine technology has remained relatively stagnant over the last few decades even though there have been substantial technological advancements in the fields of microelectronics, automated manufacturing, and robotics. That is, today's food vending machines are not that different from vending machines of thirty or even forty years ago. With the exception of a very limited number of vending machines (such as coffee machines that allow users to make certain limited customizations of their order such as making their coffee sweeter or adding cream), the vast majority of today's food vending machines do not allow any customization of customer purchases. The vast majority of today's food vending machines only allow a user/customer to select and purchase a food item (e.g., candy bars, chips, sandwiches, drinks, and so forth) from a plurality of ready-to-eat or substantially ready-to-eat food items (note that some current food vending machines do offer food items that will need to be heated using a microwave oven) and that do not allow the user to customize their purchased food item.

With the advancement of microelectronics, robotics, and automated manufacturing technologies such as 3-D (three-dimensional) printing, it is envisioned that future food vending machines will not only be able to manufacture food items "on the spot" but will also be able to customize food items to the specific customization preferences of users. For example, with the development of 3-D (three-dimensional) printing technology, it is envisioned that customized food bars (e.g., customized energy bars) may be printed for users based on their preferences (e.g., if a user is allergic to peanuts, no peanut ingredients are used in forming an energy bar for the user). It is also envisioned that with the use of robotics, fully customized meals (e.g., customized sandwiches, breads, stews, soups, shakes, and so forth) may be manufactured using automated vending machines that employ robotics or other forms of automation.

It is also envisioned that such automated vending machines for generating customized foods (herein "customized food items") will be relatively compact and therefore, will have relatively limited ingredient supplies (e.g., low-fat milk, beef from Kobe, Japan, pecans, and so forth) for generating customized food items. Consequently, there may be many instances in which a user who wishes to consume a particular customized food item (e.g., a customized energy bar, a customized sandwich, a customized shake, a customized stew, and so forth) will need to be directed to the appropriate customized food vending machine (herein "customized food generation machine") that will have appropriate ingredient supplies in sufficient quantities in order to generate a customized food item that is in full compliance with the customization preferences of the user or in order to generate a substitute customized food item that is in partial compliance with the customization preferences of the user (e.g., a substitute customized food item that satisfies most the customization preferences of the user).

It should also be noted that many of today's sophisticated consumers are very concerned about the integrity (e.g., purity, cleanliness, and so forth) of our food supplies. It seems as though that in recent years food supply contamination (e.g., *salmonella*, mad-cow disease, *E-coli*, and so forth) stories are being reported on a regular basis. That is, today's food supplies come from a vast number of food vendors located across the globe. For example, some food supplies originate from countries in the southern hemisphere that supply meats, fruits, and vegetables. There are also countless domestic farms and ranches throughout North America that supply chickens, pork, and beef. While the vegetable and fruit farms of California and Florida supplying the rest of America with a variety of produce. It is often very difficult for end consumers to be ensured that the ingredients used to make, for example, ready-to-eat foods are of high purity and free of any disease or pesticides.

Accordingly, methods, systems, and articles of manufactures are presented herein that are designed to, among other things, acquire or obtain user preference information of a user that indicates one or more customized food preferences of the user, the one or more customized food preferences of the user preference information including at least one or more preferences of the user that are related to integrity of one or more ingredients for use in generating one or more customized food items; identify or ascertain one or more capable automated customized food generation machines that have one or more ingredients in one or more sufficient quantities to be able to currently generate at least one customized food item in accordance with the one or more customized food preferences of the user; and present one or more indicators that direct the user to at least one automated customized food generation machine, the presentation of the one or more indicators being in response at least in part to the identification. As will be further described herein, in various embodiments such operations may be performed at an automated customized food generation machine (e.g., a vending machine that can dispense customized foods), while in other embodiments such operations may be performed at a network device (e.g., one or more servers, a workstation, and so forth) that may be in communication with one or more automated customized food generation machines.

As will be used herein, the phrase "customized food preference" or "customized food preferences" of a user may be in reference to the user's preferences for customizing a food item. Examples of customization preferences include, for example, preference to use beef ingredients from Kobe Japan and not from Britain, preference that aspartame be used as a sweetener, preferences that ingredient to be included in the customized food item are free of tree nuts, sources of ingredients such as beef having been tested to be free of impurities such as certain bacterial agents, and so forth Other examples of customization preferences will be provided herein. In various embodiments references in the following "capable" automated customized food generation machine[s] may be in reference to automated customized food generation machines that have sufficient amounts of preferred ingredients in sufficient quantities to be able to presently generate at least one customized food item in accordance with the one or more customized food preferences of a user.

Referring now to FIG. 1A, which illustrates an exemplary automated customized food generation machine 10* that is designed to generate customized food items 22 in accordance with customization preferences of users. Note that although the exemplary automated customized food generation machine 10* illustrated in FIG. 1A is depicted as generating a customized food item 22 that is in the form of an energy bar, in alternative embodiments, the exemplary automated customized food generation machine 10* may generate other types of customized food items 22 (e.g., customized sandwiches, customized stew, customized shakes, and so forth) having other forms. In some embodiments, the exemplary automated customized food generation machine 10* may be a standalone system that is self-contained with all of the logic needed in order to execute the various operations to be described herein—see, for example, FIG. 5. Alternatively, at least some of the operations to be described herein may actually be executed by a network device 12* that may be in communication with the exemplary automated customized food generation machines 10* as illustrated, for example, in FIGS. 1B, 1C, and 1D.

Figure 3A:
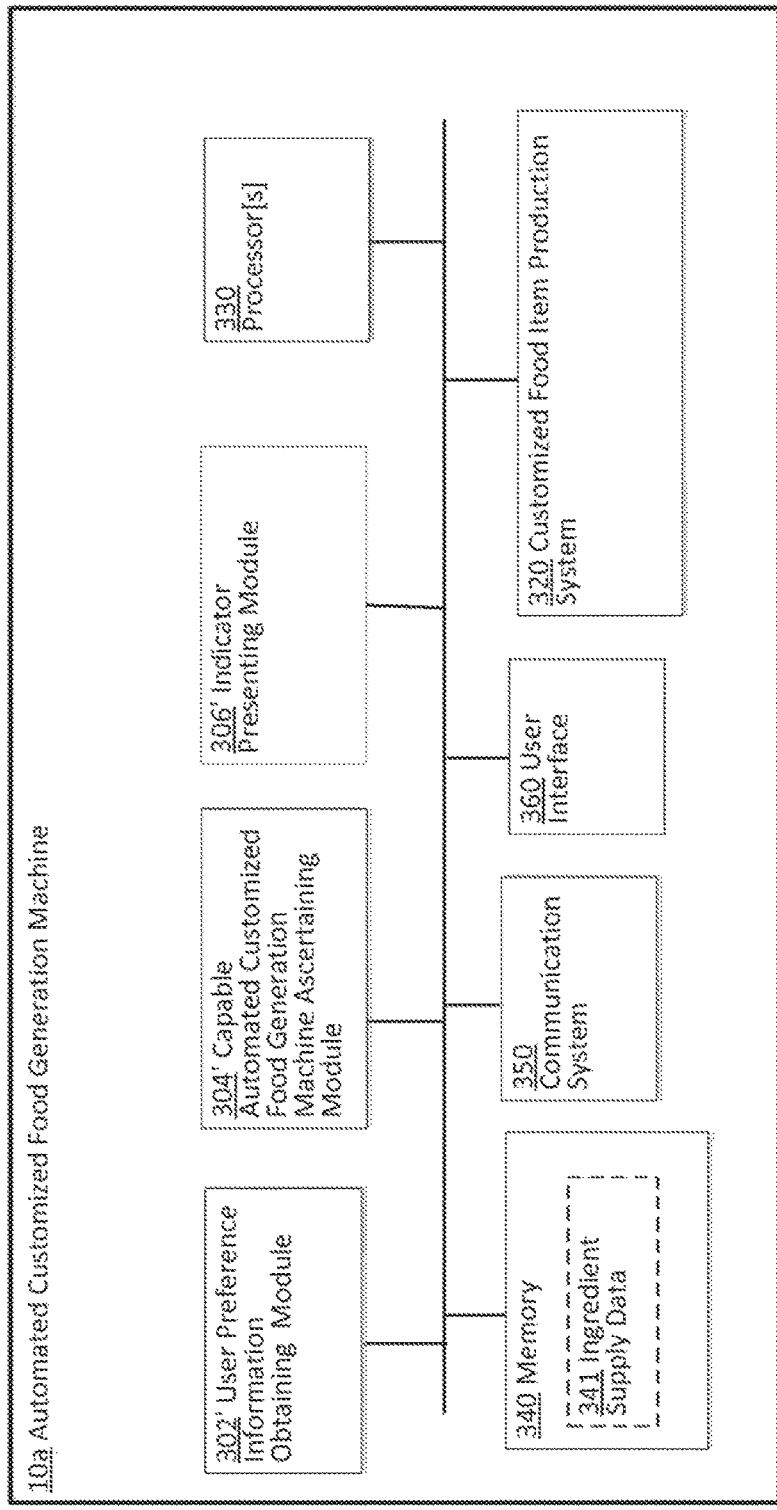
Figure 3B:
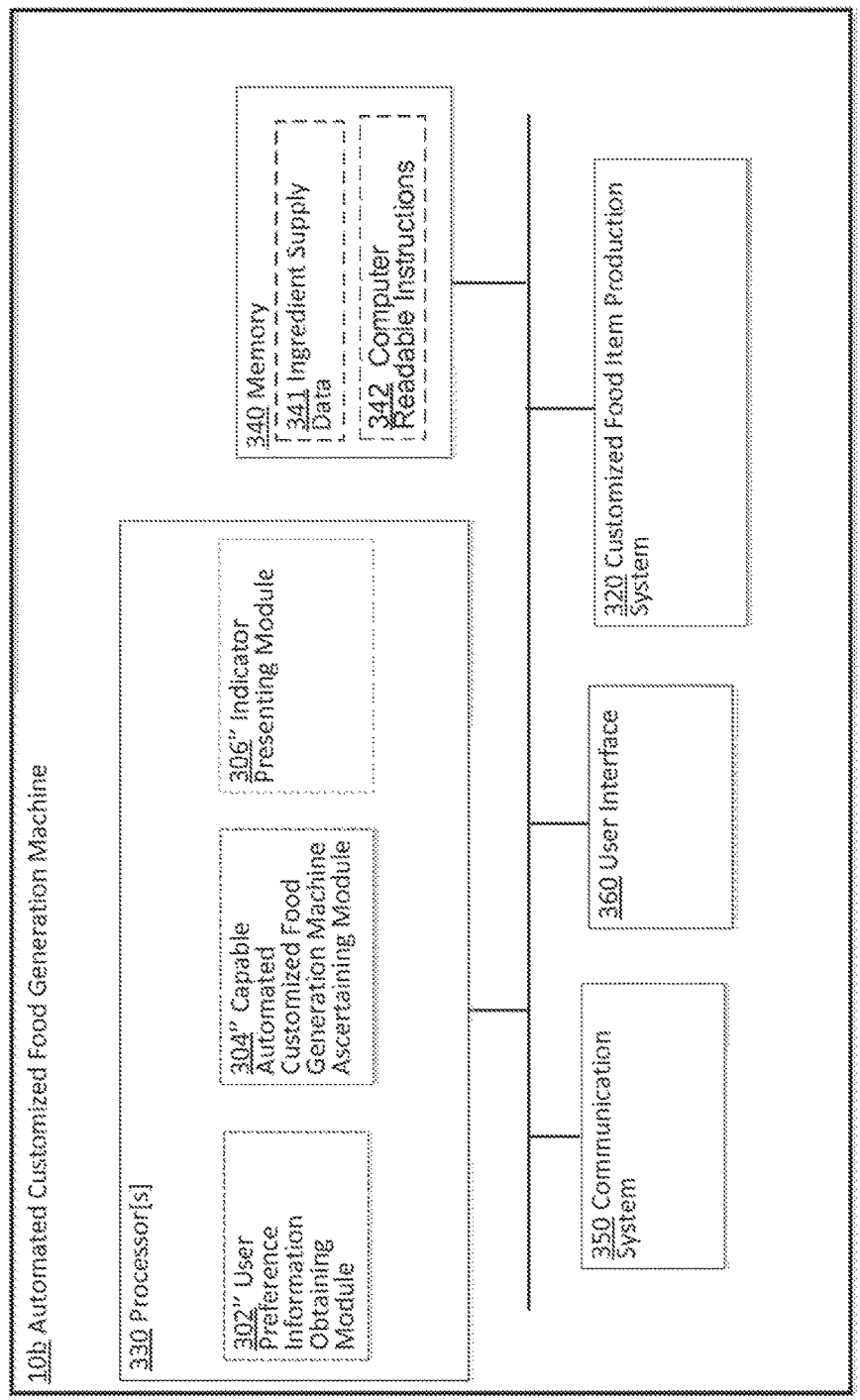
FIG. 3B shows a block diagram of another implementation of the automated customized food generation machine 10* of FIG. 1A illustrated as automated customized food generation machine 10b.
Figure 3C:
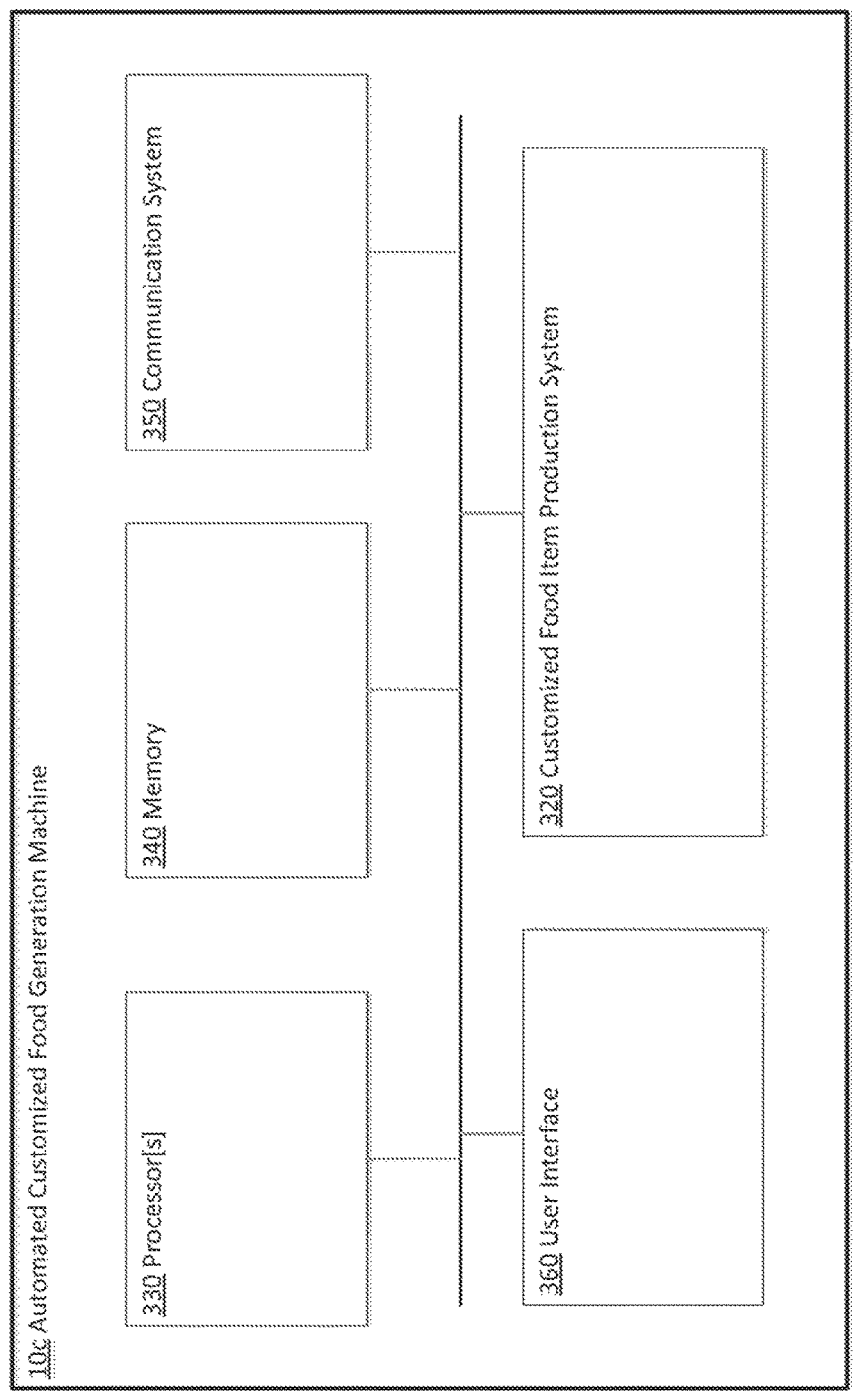
FIG. 3C shows a block diagram of another implementation of the automated customized food generation machine 10* of FIG. 1A illustrated as automated customized food generation machine 10c.

Note that FIGS. 3A, 3B, and 3C are three block diagrams of three different implementations of the exemplary automated customized food generation machine 10* of FIG. 1A illustrated in FIG. 3A as exemplary automated customized food generation machine 10a, illustrated in FIG. 3B as exemplary automated customized food generation machine 10b, and illustrated in FIG. 3C as exemplary automated customized food generation machine 10c. Further note that for purposes of the following description, "*" represents a wildcard. Thus, references in the following description to, for example, "automated customized food generation machine 10*" may be in reference to any one of, for example, the exemplary automated customized food generation machine 10a of FIG. 3A, to the exemplary automated customized food generation machine 10b of FIG. 3B, or to the exemplary automated customized food generation machine 10c of FIG. 3C (and/or to the automated customized food generation machine 10', 10", 10''', or 10'''' of FIGS. 1B, 1C, 1D, and 1E.

Referring back to the exemplary automated customized food generation machine 10* of FIG. 1A, the exemplary automated customized food generation machine 10*, as illustrated, includes a display screen 30 (which may be a touchscreen), a keypad 32, a compartment 34 for dispensing one or more customized food items 22, and a slot 36 for inserting a credit card or a Smartcard. The display screen 30 may be employed to display (as well as to enter user input if it is a touchscreen) food menus, ingredient options, ingredient purity options (e.g., use ingredients free of pesticides), ingredient sourcing options (e.g., only chicken ingredients from Tysons farm), and so forth. In various embodiments, keypad 32 may be used by a user to make selections (e.g., selection of user preferences), as well as to provide input for other types of information (e.g., user identification, credit card information, dietary information, and so forth). The automated customized food generation machine 10* may further include a slot 36 for reading a credit card or a Smartcard. Such cards may be a source for providing certain user information including user identification information and user preferences. Such cards, particularly Smartcards, which may have connectivity to mobile devices such as Smartphones, may be used in order to provide other types of user data including social networking data through their connectivity to the mobile devices or directly from such cards.

Referring briefly now to FIGS. 3A and 3B, which illustrate two block diagrams of two different implementations of the exemplary automated customized food generation machine 10* of FIG. 1A when the exemplary automated customized food generation machine 10* is a "standalone" device that has, for example, most or all of the various logic needed in order to execute, for example, the various functionalities to be described herein. In particular, FIGS. 3A and 3B illustrate two extreme implementations of the standalone implementation of the automated customized food generation machine 10* of FIG. 1A in which all of the logic modules are implemented using purely hardware solutions (e.g., employing dedicated circuitry such as application specific integrated circuitry or ASIC) as illustrated in FIG. 3A (e.g., illustrated in FIG. 3A as automated customized food generation machine 10a) or in which all of the logic modules are implemented using software solutions (e.g., software executed by one or more processors or controllers) as illustrated in FIG. 3B (e.g., illustrated in FIG. 3B as automated customized food generation machine 10b).

Note that for purposes of simplicity and for ease of illustration, only the two extreme implementations (e.g., the "hardware" implementation as illustrated by the automated customized food generation machine 10a of FIG. 3A and the "software" implementation as illustrated by the automated customized food generation machine 10b of FIG. 3B) of the standalone automated customized food generation machine 10* are presented here. However, it is recognized that any combination of software and hardware solutions are possible and may be employed in various alternative embodiments. In any event, the "standalone" automated customized food generation machine 10a depicted in FIG. 3A is the "hard" implementation of the standalone implementation of the automated customized food generation machine 10* of FIG. 1A where all of the logic modules (e.g., the user preference information obtaining module 302', the capable automated customized food generation machine ascertaining module 304', and the indicator presenting module 306') are implemented using purely hardware solutions (e.g., circuitry such as application specific integrated circuit or ASIC). In contrast, the automated customized food generation machine 10b of FIG. 3B is the soft implementation of the standalone implementation of the automated customized food generation machine 10* of FIG. 1A where all of the logic modules (e.g., the user preference information obtaining module 302", the capable automated customized food generation machine ascertaining module 304", and the indicator presenting module 306") are implemented using software solutions (e.g., programmable instructions in the form of computer readable instructions 342 being executed by hardware such as one or more processors 330) as illustrated in, for example, FIG. 3B. Note that FIG. 3C illustrates a block diagram (illustrated in FIG. 3C as automated customized food generation machine 10c) of a particular implementation of the automated customized food generation machine 10* of FIG. 1 when the automated customized food generation machine 10* is not a standalone device (e.g., when one or more logic modules may be remotely located, such as at a network device 12*, as illustrated in FIG. 1B)

Figure 1B:
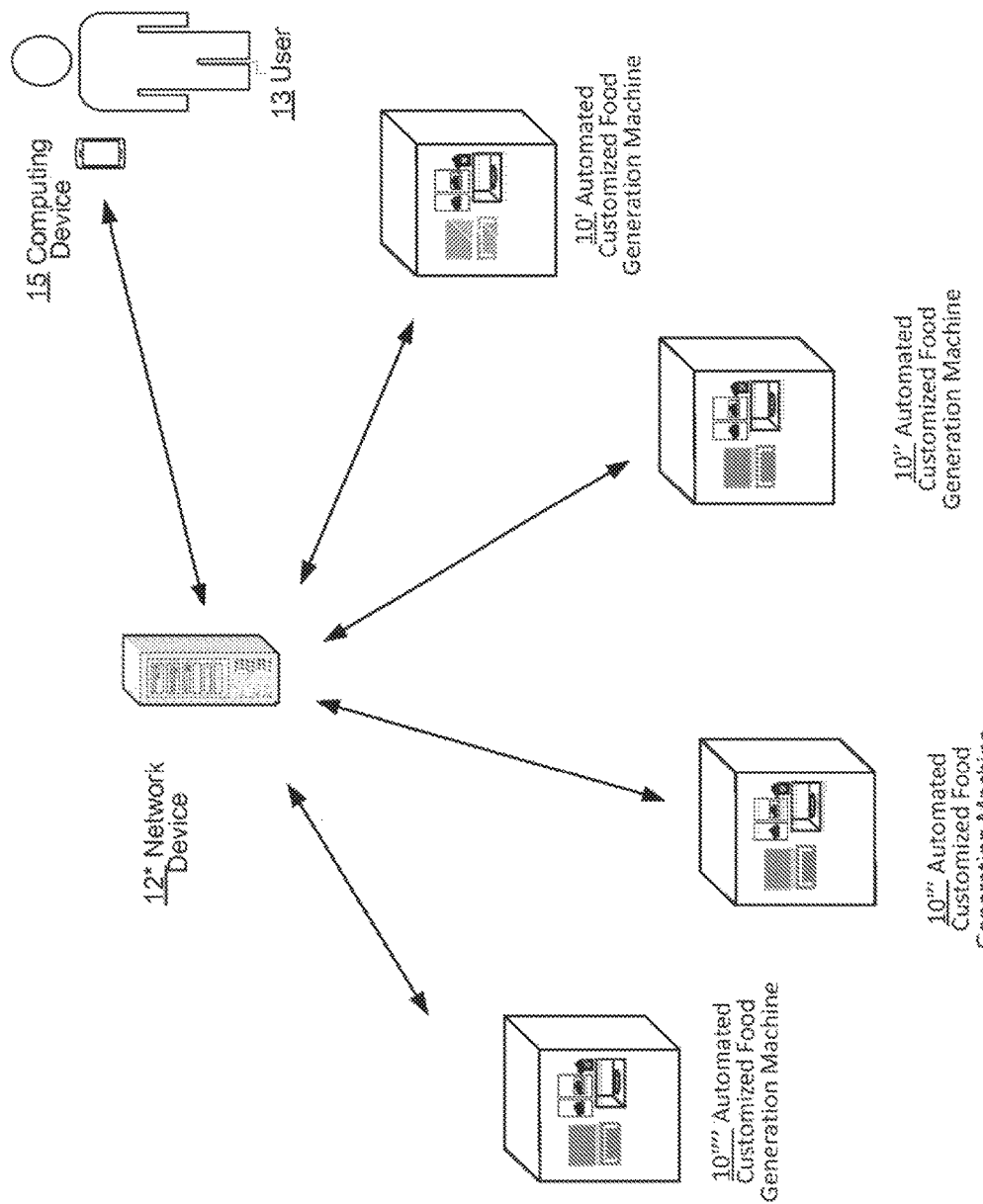
FIG. 1B shows a user 13 in an example environment that includes multiple automated customized food generation machines.

Turning now to FIGS. 1B, 1C, 1D, and 1E, which illustrate various exemplary scenarios of a user 13 interacting with a network device 12* and/or with one or more automated customized food generation machines 10* in accordance with various embodiments. Note that in the exemplary scenarios illustrated in FIGS. 1B, 1C, 1D, and 1E, the network device 12* or a particular automated customized food generation machine 10* will actually implement the various operations to be described herein—see, for example, operational flow 500 of FIG. 5. Referring particularly now to FIG. 1B, which shows a user 13 interacting with a network device 12* (e.g., a network system such as a server or a workstation, or a plurality of network computers—"the cloud") via a computing device 15. In this scenario the user 13 is in communication with the network device 12* so that the network device 12* may direct the user 13 to one or more automated customized food generation machines 10* that may be able to currently generate one or more customized food items 22 in compliance with one or more customized food preferences of the user 13. Although the computing device 15 is depicted in FIG. 1B as being in the form of a Smartphone, in alternative embodiments, the computing device 15 may be a workstation, desktop or laptop computer, a tablet computer, a cellular telephone, and so forth.

As illustrated in FIG. 1B, the network device 12* may be in communication with a plurality of automated customized food generation machines 10* (e.g., automated customized food generation machine 10', automated customized food generation machine 10", automated customized food generation machine 10''', and automated customized food generation machine 10''''). Though not explicitly illustrated, the network device 12* may communicate with the automated customized food generation machines 10* and the computing device 15 via wireless and/or wired networks. In order to be directed to the right or appropriate automated customized food generation machine 10* that has the capability of generating one or more customized food items 22 in accordance with the customized food preferences of the user 13, the user 13 may provide to the network device 12*, via the computing device 15, various information such as user ID, customized food preferences, dietary information, previous machine usage information, and so forth.

Note that for purposes of the following description, it will be assumed that only the automated customized food generation machine 10''' and the automated customized food generation machine 10'''' of FIG. 1B (as well as of FIGS. 1C, 1D, and 1E) will be able to generate one or more customized food items 22 in accordance with (e.g., in full compliance with) the one or more customized food preferences of the user 13 related to the one or more customized food items 22. That is, it will be presumed that for purposes of this description the automated customized food generation machine 10''' and the automated customized food generation machine 10'''' (of FIGS. 1B, 1C, 1D, and 1E) have the preferred ingredients in sufficient quantities to currently generate the one or more customized food items 22 in accordance with the one or more customized food preferences of the user 13. Not further that for purposes of this description, the automated customized food generation machine 10''' and the automated customized food generation machine 10'''' will be referred to as "capable" automated customized food generation machines since they are able to currently generate one or more customized food items 22 in accordance with the one or more customized food preferences of the user 13.

Also for purposes of this description, it will be assumed that automated customized food generation machine 10" of FIG. 1B (as well as of FIGS. 1C, 1D, and 1E) is only able to currently generate one or more customized food items 22 that are only in partial compliance with the one or more customized food preferences of the user 13. Since the automated customized food generation machine 10" is able to generate a customized food item 22 only in partial compliance (which in some cases may be substantial compliance) with the one or more customized food preferences of the user 13, the automated customized food generation machine 10" will be referred to herein as a "substitute" automated customized food generation machine. As will be further described herein, in some cases the user 13 may be directed to a substitute automated customized food generation machine 10" in order to purchase a "substitute" customized food item 22 even though a capable automated customized food generation machines (e.g., the automated customized food generation machine 10''' and the automated customized food generation machine 10'''') has been detected. Finally, for purposes of the following description, it will be assumed that the automated customized food generation machine 10' of FIG. 1B (as well as of FIGS. 1C, 1D, and 1E) is unable to satisfactorily generate a customized food item 22 in accordance with the one or more customized food preferences of the user 13.

In any event, after the user 13, via the computing device 15, provides certain information such as user preference information (or alternatively, the user 13 may instead simply provide a username/password to the network device 12* and the network device 12* may then retrieve user preference information from a memory based on the username/password) to the network device 12*, the network device 12* may then check to see which of the plurality of automated customized food generation machines 10* has the preferred ingredients in sufficient quantities to currently generate one or more customized food items 22 in accordance with the one or more customized food preferences of the user 13. In some cases, such a determination may be accomplished by querying each of the automated customized food generation machines 10* to determine which of the automated customized food generation machines 10* has the necessary ingredients in sufficient quantities to make the one or more customized food items 22 that are in compliance with the one or more customized food preferences of the user 13. Alternatively, such information (e.g., information that indicates which automated customized food generation machines 10* has the necessary ingredients in sufficient quantities to make the one or more customized food items 22 that are in compliance with the one or more customized food preferences of the user 13) may already be stored in a memory 340 (see FIG. 3D or 3E) of the network device 12* (e.g., such information may have been previously supplied by the automated customized food generation machines 10*) in which case the network device 12* merely has to parse the data stored in its memory 340 in order to determine which automated customized food generation machines 10* are capable automated customized food generation machines that have the necessary ingredients in sufficient quantities to make the one or more customized food items 22.

Based on, at least in part, the identification of one or more capable automated customized food generation machines (e.g., the automated customized food generation machine 10''' and/or the automated customized food generation machine 10''''), the network device 12* may direct the user 13, via the computing device 15, to one of the capable automated customized food generation machines and/or to one or more substitute automated customized food generation machines (e.g., automated customized food generation machine 10''). As will be further described herein, in various alternative embodiments, various other factors (other than determining which automated customized food generation machines 10* are capable automated customized food generation machines) may be considered in determining which automated customized food generation machines 10* the user will be directed to. Examples of other factors that may be considered include, for example, which automated customized food generation machines 10* is closer to the user 13, which automated customized food generation machines 10* is nearest to the historical travel paths of the user 13*, which automated customized food generation machines 10* has the user 13 previously used, which substitute automated customized food generation machines provides price discounts for offering only substitute customized food items 22, and so forth.

In various embodiments, only those automated customized food generation machines 10* that are determined to be located near the location of the user 13 may be considered when determining which automated customized food generation machine 10* the user 13 should be directed to. That is, in most many situations, it is preferable to only consider nearby automated customized food generation machines 10* as it may be impractical for the user 13 to travel long distances in order to obtain a customized food item 22. In some embodiments, only those automated customized food generation machines 10* that are within a "short traveling distance" from the location of the user 13 may be considered. In some embodiments, references in the following to a "short traveling distance" may be in reference to the distance that is traveled by a user 13 in 30 minutes or less via walking, mass transit, and/or automobile. In other embodiments, a "short traveling distance" may be defined by a distance such as ½ mile, 1 mile, 2 miles, or 5 miles.

Figure 1C:
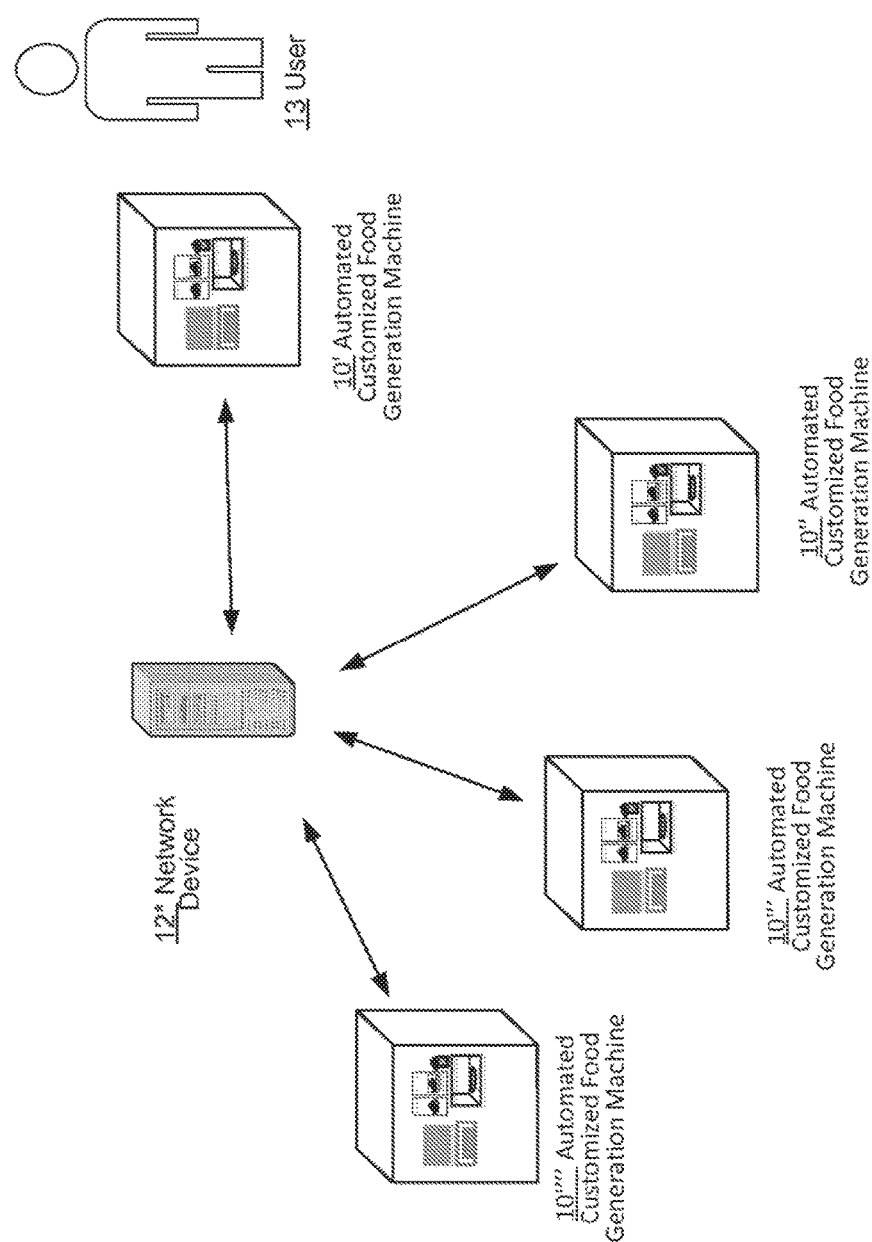
FIG. 1C shows the user 13 in another example environment that includes multiple automated customized food generation machines.

Turning now to FIG. 1C, which illustrates another scenario that is a slight variation from the scenario illustrated in FIG. 1B. In this example scenario of FIG. 1C, the user 13 directly interfaces or interacts with an automated customized food generation machine 10' in an effort to order one or more customized food items 22. Upon determining that the automated customized food generation machine 10' is unable to satisfactorily fulfill the user's customization preferences (e.g., is unable to generate one or more customized food items that are in compliance with the one or more customized food preferences of the user 13), the network device 12* determines which of the other automated customized food generation machines 10* (e.g., automated customized food generation machine 10'', automated customized food generation machine 10''', and/or automated customized food generation machine 10'''') are capable automated customized food generation machines (or simply "capable machines") that are able to generate one or more customized food items 22 in compliance with the one or more customized food preferences of the user 13.

In order to identify which of the other automated customized food generation machines 10* is a capable machine, the network device 12* may query each of the other automated customized food generation machines 10* in order to ascertain which of the other automated customized food generation machines 10* currently have the preferred ingredients in sufficient quantities in order to make the one or more customized food items 22 in accordance with the one or more customized food preferences of the user 13. Alternatively, such a determination may be based on data previously provided to the network device 12* by the automated customized food generation machines 10* and stored in a memory 340. After one or more capable machines (e.g., the automated customized food generation machine 10''' and the automated customized food generation machine 10'''') are identified, the network device 12* may direct the user 13, via the user interface 360 (see FIGS. 3A, 3B, and 3C) of the automated customized food generation machine 10', to one or more of the capable automated customized food generation machines (e.g., the automated customized food generation machine 10''' and the automated customized food generation machine 10'''') and/or to one or more substitute automated customized food generation machines (e.g., automated customized food generation machine 10'').

Figure 1D:
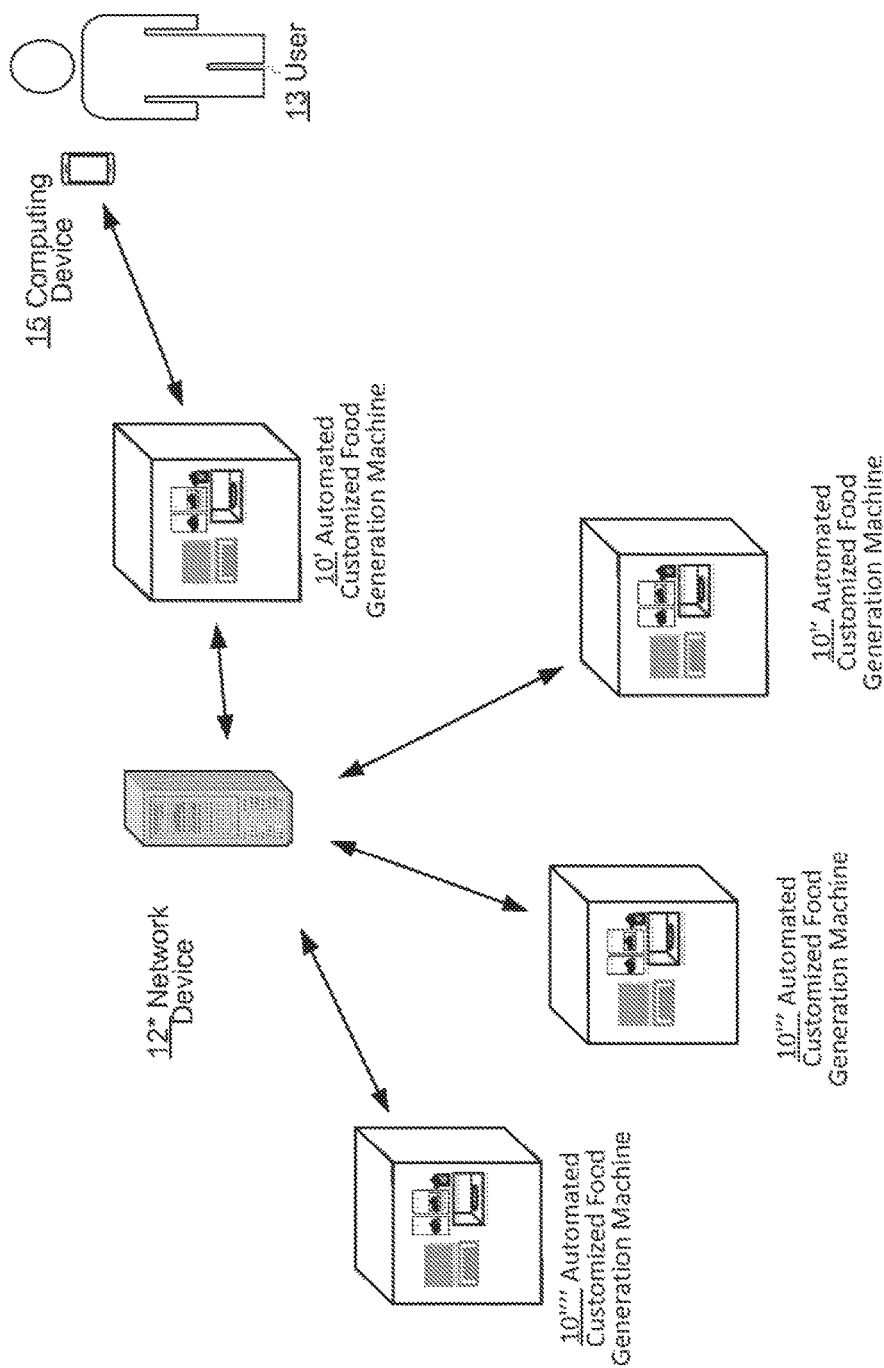
FIG. 1D shows the user 13 in another example environment that includes multiple automated customized food generation machines.

Turning now to FIG. 1D, which illustrates a scenario that is a slight variation from the scenario illustrated in FIG. 1C. The only difference between the scenario illustrated in FIG. 1C and the scenario illustrated in FIG. 1D is that in the scenario illustrated in FIG. 1D the user 13 communicates with the automated customized food generation machine 10' through a computing device 15 (e.g., a Smartphone, a cellular telephone, a tablet computer, a laptop, a desktop computer, and so forth). Thus, rather than the user 13 inputting user information (e.g., user preference information, user ID/password, and so forth) directly into the automated customized food generation machine 10', the user 13 may provide user input through the computing device 15, and to receive output information (e.g., identification of one or more capable automated customized food generation machines 10''', 10'''' and/or one or more substitute automated customized food generation machines 10'').

Figure 1E:
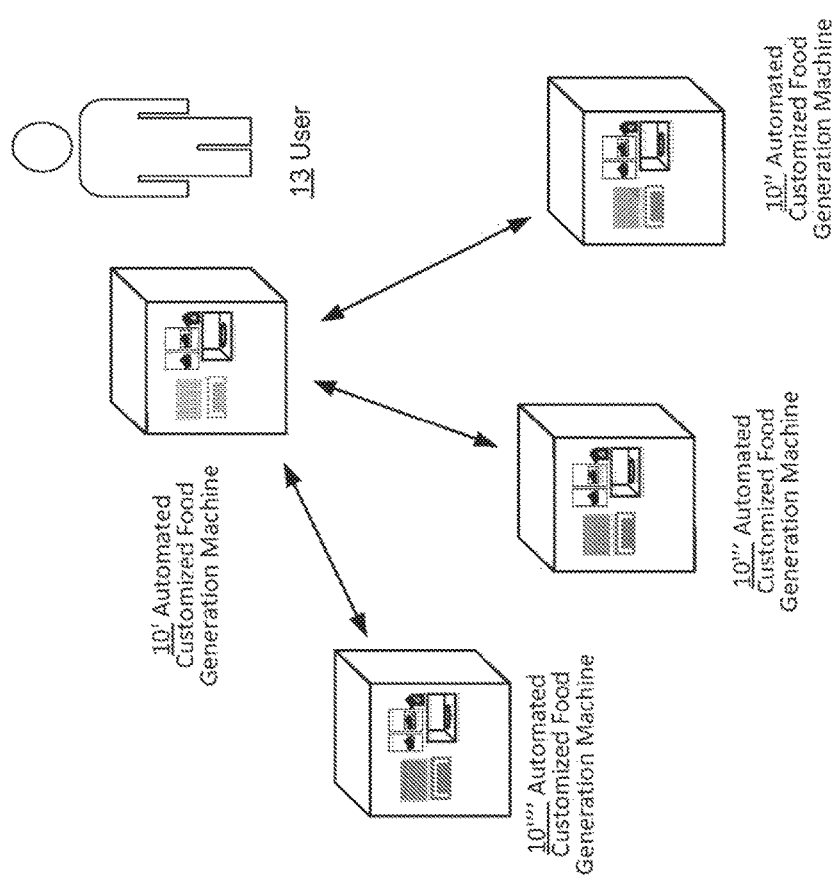
FIG. 1E shows the user 13 in another example environment that includes multiple automated customized food generation machines.

Referring now to FIG. 1E, which illustrates a scenario that is a hybrid scenario of the scenario illustrated in FIG. 1B and the scenario illustrated in FIG. 1C. In the scenario of FIG. 1E, the user 13 directly interacts with the automated customized food generation machine 10'. Upon the user 13 interfacing with the automated customized food generation machine 10' (e.g., the user 13 trying to order a customized food item 22 through the automated customized food generation machine 10'), the automated customized food generation machine 10' may at least identify which of the other automated customized food generation machines 10* (e.g., the automated customized food generation machine 10", the automated customized food generation machine 10'", and the automated customized food generation machine 10"") are capable machines that have the preferred ingredients in sufficient quantities to be able to currently generate one or more customized food items 22 in accordance with the one or more customized food preferences of the user 13. In some cases, such an operation may be executed by querying the other automated customized food generation machines 10*, or by parsing capability data stored in a memory 340 that was previously provided by the other automated customized food generation machines 10* and that indicates the ingredient capabilities of the other automated customized food generation machines 10* (e.g., the automated customized food generation machine 10", the automated customized food generation machine 10'", and the automated customized food generation machine 10""). In some embodiments, the automated customized food generation machine 10' may additionally or alternatively identify substitute automated customized food generation machines (e.g., automated customized food generation machine 10") that can only currently generate customized food items 22 that only partially complies with the one or more customized food preferences of the user 13. Based, at least in part, on the identification of the one or more capable automated customized food generation machines 10'", 10"" and/or one or more substitute automated customized food generation machines 10", the automated customized food generation machine 10' may direct the user 13 to (e.g., display to the user 13) one or more automated customized food generation machines 10*.

Figure 2A:
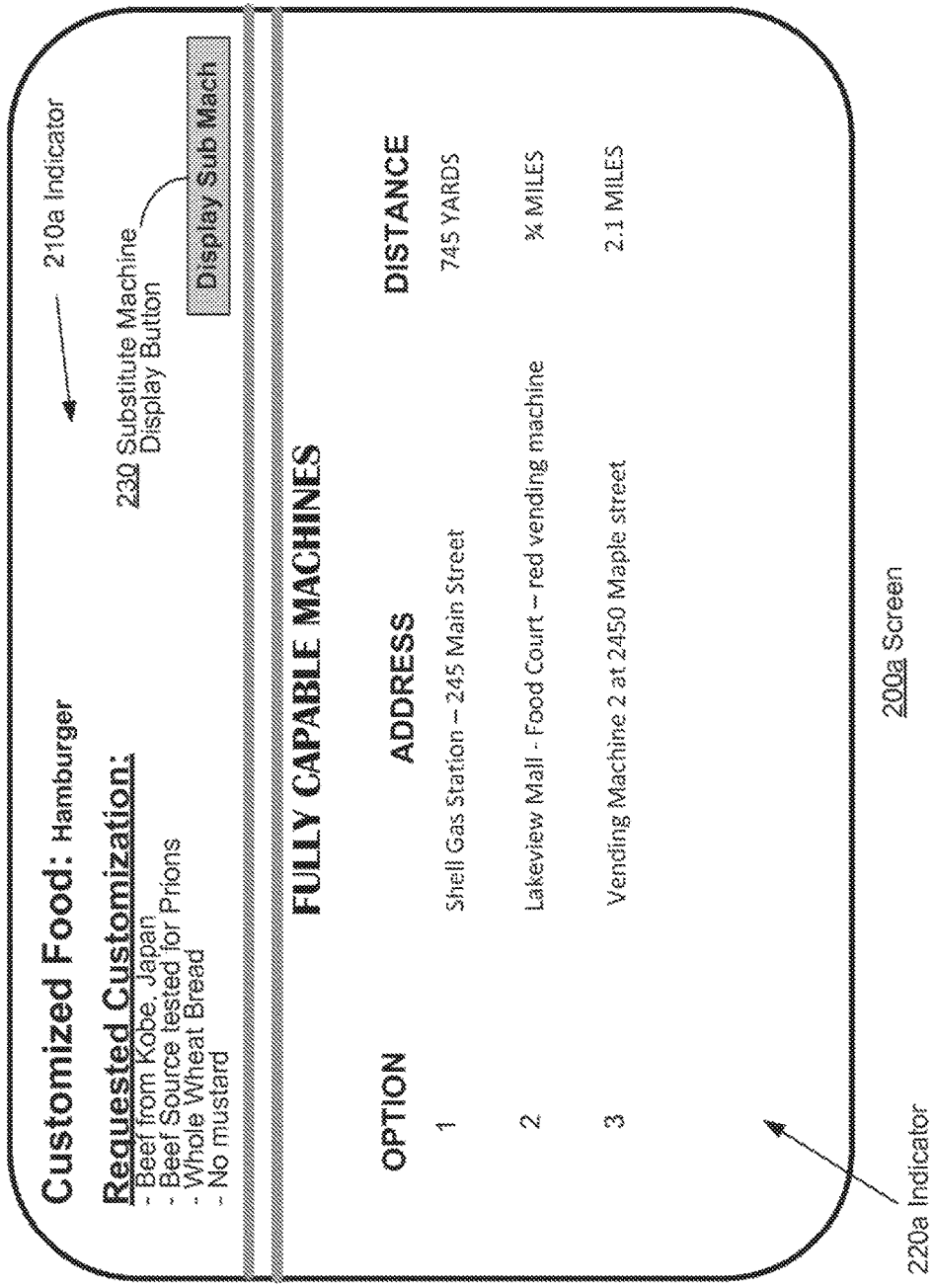
FIG. 2A illustrates an exemplary screen that identifies locations of capable automated customized food generation machines.

Referring now to FIGS. 2A, 2B, 2C, 2D, and 2E, which illustrates exemplary screens that may be displayed through a computing device 15 (see, for example, FIG. 1B or 1D) or through an automated customized food generation machine 10' (see, for example, FIG. 1C or 1E) and that provides indicators that direct a user 13 to one or more automated customized food generation machines 10* in accordance with various embodiments. Turning particularly now to FIG. 2A, which illustrates an exemplary screen 200a that includes indicator 210a that provides information that identifies the customized food being requested (e.g., hamburger) and the customized food preferences (e.g., Beef from Kobe, Japan, source for the beef tested for prions, and so forth) of the user 13. Exemplary screen 200a also includes indicator 220a that identifies capable automated customized food generation machines 10* that are determined to be able to currently generate one or more customized food items 22 in accordance with one or more customized food preferences of the user 13. Indicator 220a identifies the capable automated customized food generation machines 10* by machine identifier (e.g., "red vending machine" and "vending machine 2"), by address (e.g., "235 Main Street"), and by name of location (e.g., "Shell Gas Station" and "Lakeview Mall—Food Court"). Indicator 220a also ranks the different capable automated customized food generation machines 10* based on their distances from the user 13 (e.g., Option 1 is ranked first because it is only 745 yards away). Exemplary screen 200a also includes a substitute machine display button 230 that when tapped (if the screen 200a is being displayed on a touchscreen) or "clicked on" will result in a listing of substitute automated customized food generation machines 10* being displayed, the substitute automated customized food generation machines 10* that are listed being automated customized food generation machines 10* that are only able to currently generate one or more customized food items 22 that are only in partial compliance with the one or more customized food preferences of the user 13.

Figure 2B:
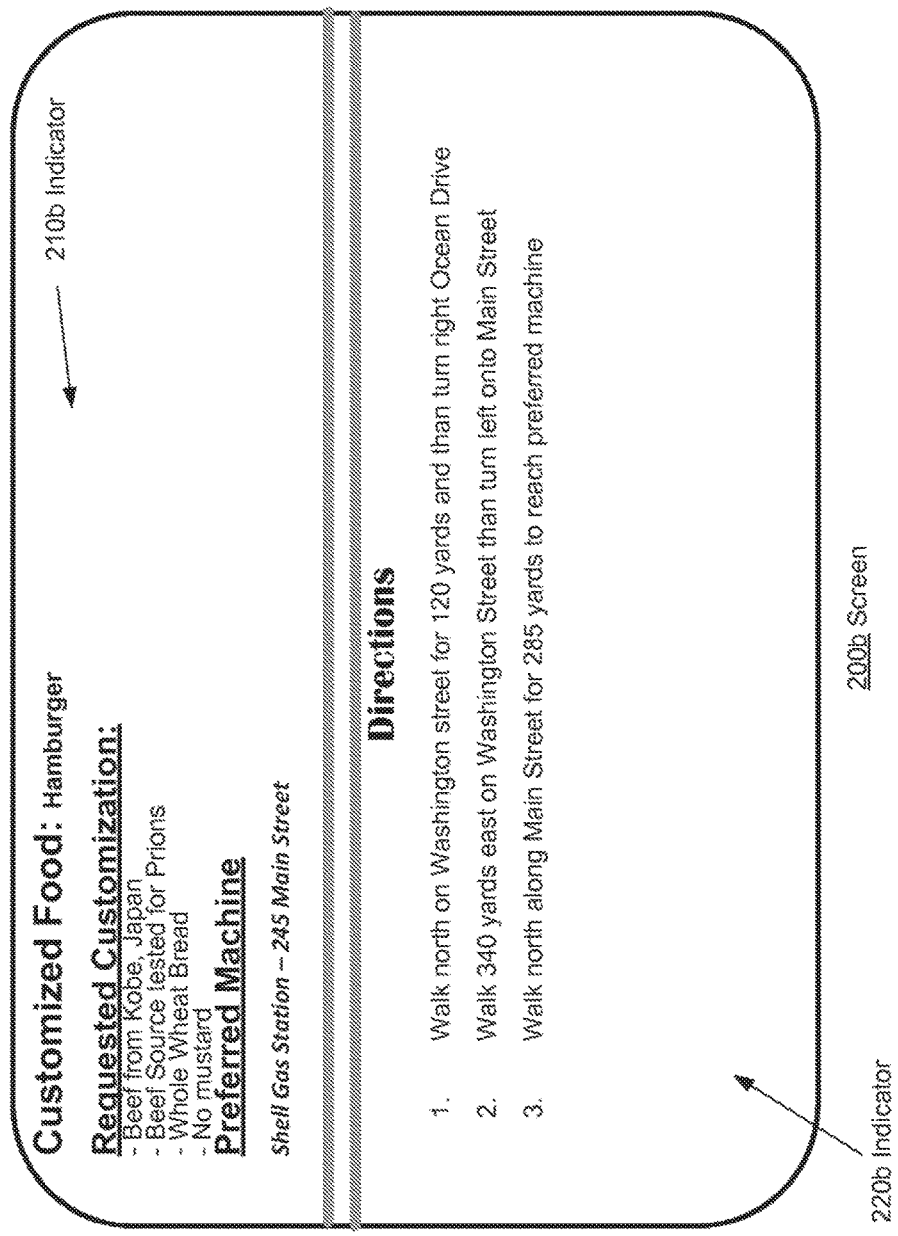
FIG. 2B illustrates an exemplary screen that provides directions to a capable automated customized food generation machine.
Figure 2C:
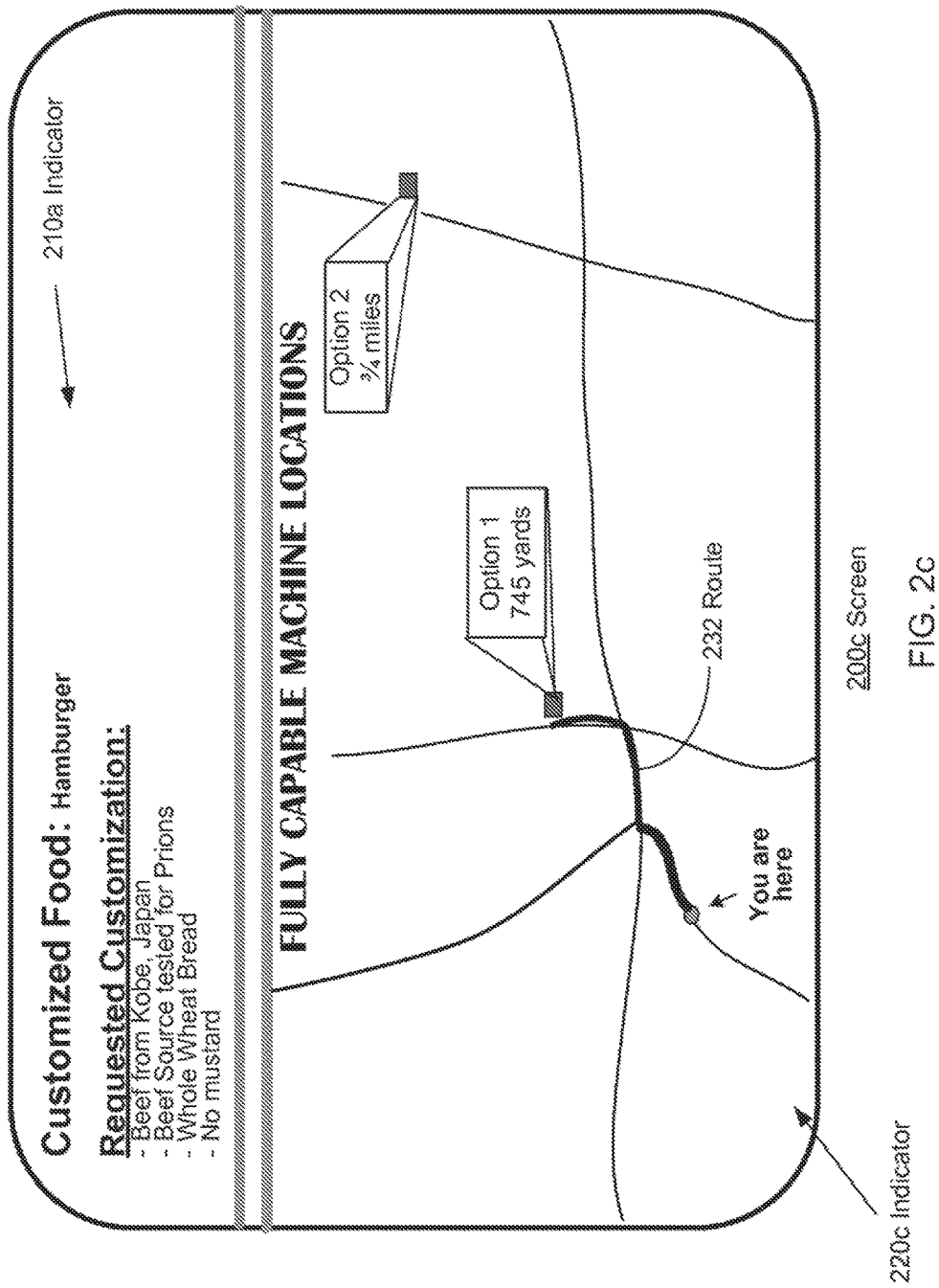
FIG. 2C illustrates an exemplary screen that shows locations of capable automated customized food generation machines on a map.
Figure 2D:
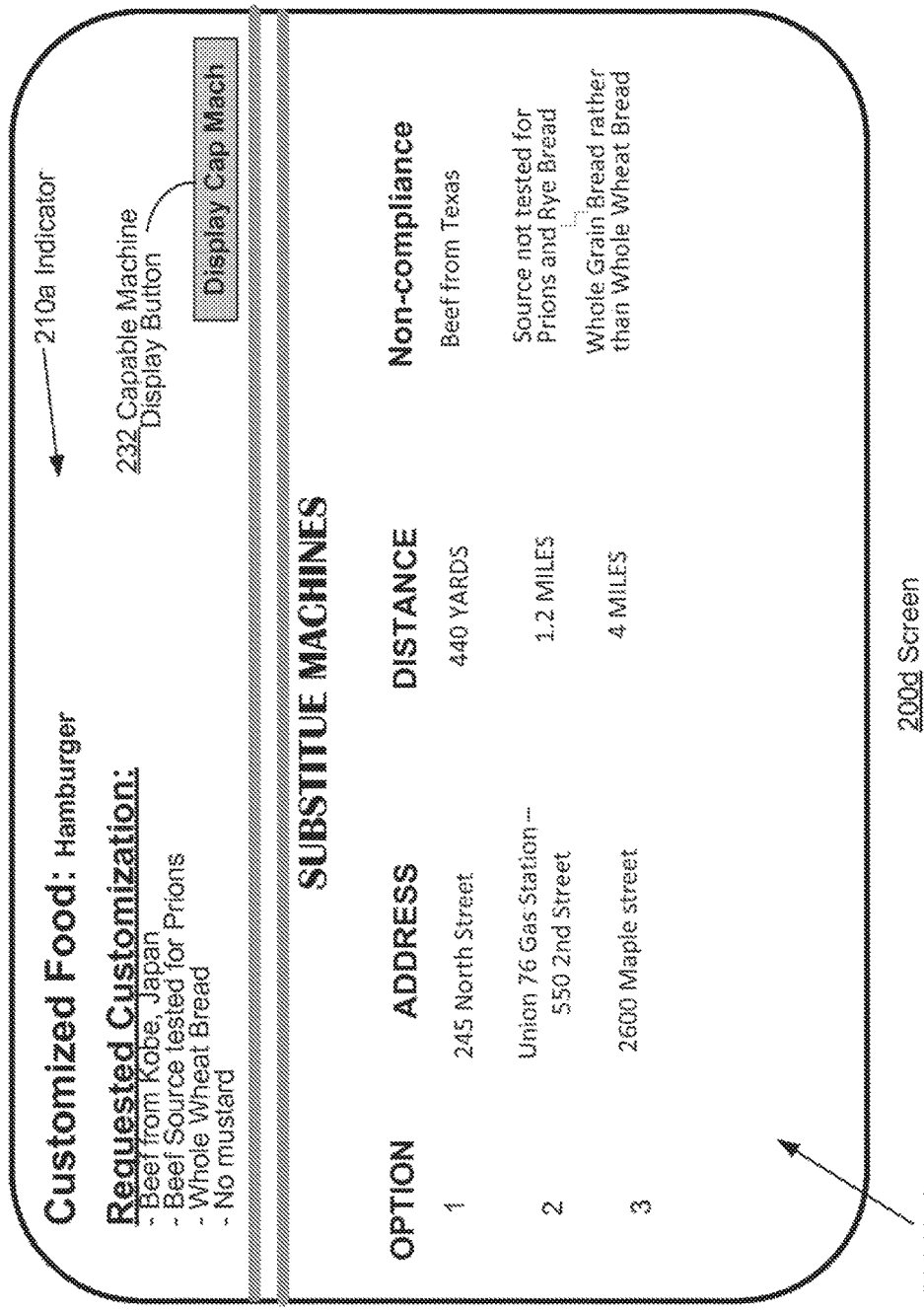
FIG. 2D illustrates an exemplary screen that identifies locations of substitute automated customized food generation machines.

FIG. 2D illustrates an exemplary screen 200d that may be displayed as a result of clicking the substitute machine display button 230 of FIG. 2A. Note that screen 200d includes a capable machine display button 232 that can be clicked or tapped on in order to return to screen 200a of FIG. 2A that displays the "fully capable machines" listing. Screen 200d includes indicator 220d that lists/identifies substitute machines. Note that in addition to the address information and distance information, indicator 220d also includes non-compliance information (e.g., Beef from Texas rather than from Kobe, ingredient source not tested for prions, and so forth) that identifies the non-compliance of the customized food items 22 that can be generated by the listed substitute machines (e.g., substitute automated customized food generation machines 10*) with respect to the one or more customized food preferences of the user 13.

FIG. 2B illustrates an exemplary screen 200b that may be displayed upon the user 13 selecting "option 1" of screen 200a of FIG. 2A. As a result of electing option 1, screen 200b is displayed that shows directions (e.g., instructions) for traveling to the corresponding capable machine (e.g., automated customized food generation machine 10'" or 10"") as indicated by indicator 220b. In contrast, indicator 210b of FIG. 2B identifies the capable machine that was selected by the user 13 (e.g., "Preferred Machine—Shell Gas Station—245 Main Street") and the original user preference information (e.g., name of the food requested—hamburger and customization preferences—beef from Kobe, Japan, source tested for prions, and so forth).

Turning now to FIG. 2C, which illustrates an exemplary screen 200c that includes indicator 220c that identifies the locations of two capable automated customized food generation machines 10* relative to the location of the user 13 on a map. In particular, indicator 220c includes squares that indicate locations of capable automated customized food generation machines 10* superimposed on top of a map. Indicator 220c further includes route 232 that shows a route that the user 13 may take in order to get to the location of one of the capable automated customized food generation machines 10* from the current location of the user 13.

Referring now to FIG. 2E, which illustrates an exemplary screen 200e that includes an indicator 220e that identifies both capable machines (e.g., automated customized food generation machines 10'" and 10"") and a substitute machine (e.g., automated customized food generation machines 10"). Note that indicator 220e also indicates the prices of the customized food items 22 that may be generated by both the capable machines and the substitute machine.

Referring now to FIGS. 3A and 3B, which as briefly described above, illustrate two block diagrams of two different implementations of the automated customized food generation machine 10* of FIG. 1A when the automated customized food generation machine 10* is a standalone device with all of the necessary logic to perform the various operations to be described below with respect to the flow process of FIG. 5. In particular, and as will be further described herein, FIG. 3A illustrates an automated customized food generation machine 10a that is the "hardwired" or "hard" implementation of a standalone automated customized food generation system that can implement the operations and processes to be described herein. The automated customized food generation machine 10a may comprise certain logic modules including, for example, a user preference information obtaining module 302', a capable automated customized food generation machine ascertaining module 304', and/or an indicator presenting module 306' that are implemented using purely hardware or circuitry components (e.g., application specific integrated circuit or "ASIC"). In contrast, FIG. 3B illustrates a standalone automated customized food generation machine 10b that is the "soft" implementation of an automated customized food generation system that can implement the operations and processes to be described herein. In various embodiments, the automated customized food generation machine 10b may also include certain logic modules including, for example, a user preference information obtaining module 302", a capable automated customized food generation machine ascertaining module 304", and/or an indicator presenting module 306" that are implemented using electronic circuitry (e.g., one or more processors 330 including one or more microprocessors, controllers, etc.) executing one or more programming instructions (e.g., software in the form of computer readable instructions 342—see FIG. 3B).

The embodiments of the standalone automated customized food generation machine 10* illustrated in FIGS. 3A and 3B are two extreme implementations of a standalone automated customized food generation system in which all of the logic modules (e.g., the user preference information obtaining module 302', the capable automated customized food generation machine ascertaining module 304', and the indicator presenting module 306') are implemented using purely hardware solutions (e.g., circuitry such as ASIC) as illustrated in, for example, FIG. 3A or in which all of the logic modules (e.g., the user preference information obtaining module 302", the capable automated customized food generation machine ascertaining module 304", and the indicator presenting module 306") are implemented using software solutions (e.g., programmable instructions in the form of computer readable instructions 342 being executed by hardware such as one or more processors 330) as illustrated in, for example, FIG. 3B. Since there are many ways of combining hardware, software, and/or firmware in order to implement the various logic modules (e.g., the user preference information obtaining module 302*, the capable automated customized food generation machine ascertaining module 304*, and the indicator presenting module 306*), only the two extreme implementations (e.g., the purely hardware solution as illustrated in FIG. 3A and the software solution of FIG. 3B) are illustrated here. It should be noted here that with respect to the "soft" implementation illustrated in FIG. 3B, hardware in the form of circuitry such as one or more processors 330 are still needed in order to execute the software. Further details related to the two implementations of the standalone automated customized food generation machine 10* illustrated in FIGS. 3A and 3B will be provided in greater detail below.

In still other implementations, the automated customized food generation machine 10* of FIG. 1A may not actually include the various logic modules (e.g., the user preference information obtaining module 302*, the capable automated customized food generation machine ascertaining module 304*, and the indicator presenting module 306*) that implement the various operations/processes described herein. For example, the automated customized food generation machine 10c of FIG. 3C illustrates such a device that does not have the various logic modules (e.g., a user preference information obtaining module 302*, a capable automated customized food generation machine ascertaining module 304*, and an indicator presenting module 306*) included in the automated customized food generation machine 10a and 10b of FIGS. 3A and 3B. Instead, such logic modules may be located in a remote device such as at a network device 12* as illustrated, for example, in FIGS. 3D and 3E. In such implementations, the other device (e.g., network device 12*) having the various logic modules (e.g., a user preference information obtaining module 302*, a capable automated customized food generation machine ascertaining module 304*, and an indicator presenting module 306*) to perform at least some of the processes and operations to be described herein. In various implementations, the network device 12* may be a network computing device (e.g., a server or a workstation) or a plurality of network devices (e.g., the cloud).

Figure 3D:
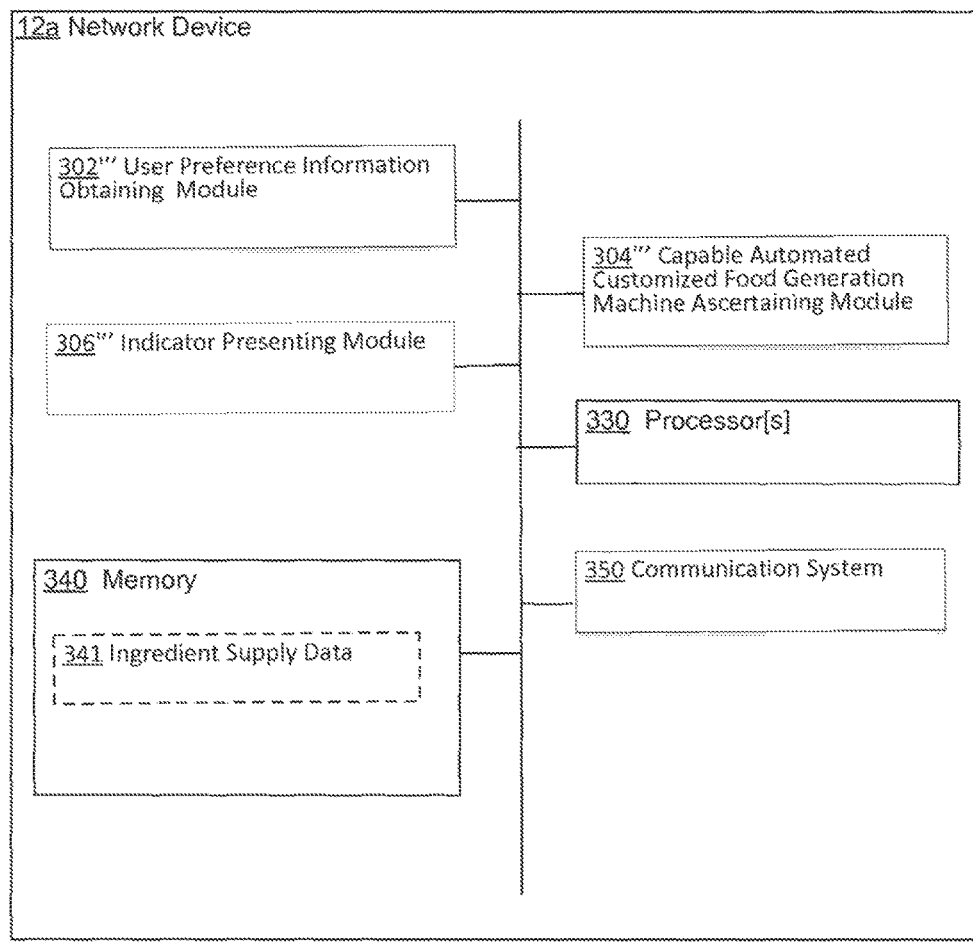
Figure 3E:
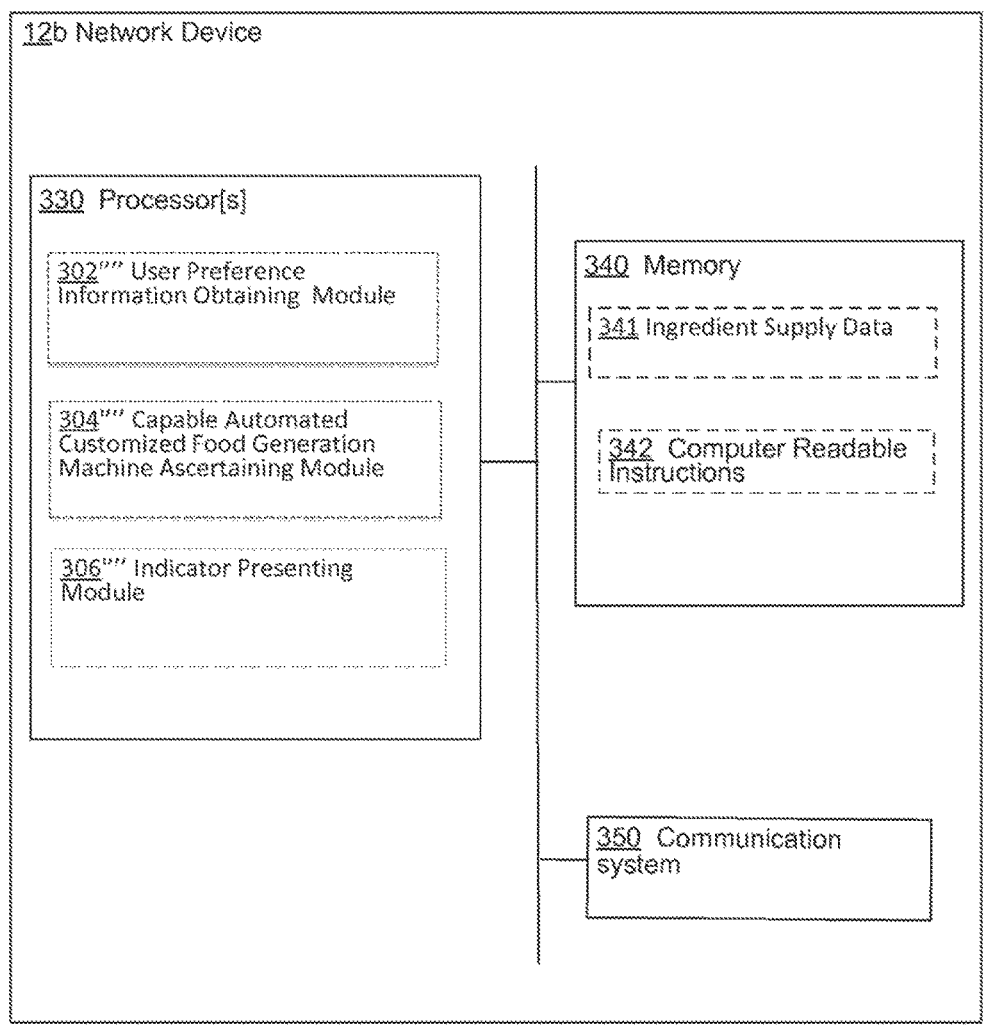
FIG. 3E shows a block diagram of a particular implementation of the network device 12* of FIG. 1B, 1C, or 1D illustrated as network device 12b.

FIGS. 3D and 3E illustrates two extreme implementations of the network device 12* of FIGS. 1B, 1C, and 1D in which all of the logic modules (e.g., the user preference information obtaining module 302''', the capable automated customized food generation machine ascertaining module 304''', and the indicator presenting module 306''') are implemented using purely hardware solutions (e.g., circuitry such as ASIC) as illustrated in, for example, FIG. 3D or in which all of the logic modules (e.g., the user preference information obtaining module 302'''', the capable automated customized food generation machine ascertaining module 304'''', and the indicator presenting module 306'''') are implemented using software solutions (e.g., programmable instructions in the form of computer readable instructions 342 being executed by hardware such as one or more processors 330) as illustrated in, for example, FIG. 3E. Again, although there are many ways to combine hardware, software, and/or firmware in order to implement the various logic modules (e.g., the user preference information obtaining module 302*, the capable automated customized food generation machine ascertaining module 304*, and the indicator presenting module 306*), for ease of illustration only the two extreme implementations (e.g., the purely hardware solution as illustrated in FIG. 3D and the software solution of FIG. 3E) are illustrated here.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 3A, which illustrates a block diagram of an automated customized food generation machine 10a that includes a user preference information obtaining module 302', a capable automated customized food generation machine ascertaining module 304', an indicator presenting module 306', memory 340, a communication system 350 (e.g., a network interface card, a transceiver, and so forth), a user interface 360 (e.g., a display, a speaker, and so forth), one or more processors 330 (e.g., one or more microprocessors), and a customized food item production system 320. In some embodiments, the memory 340 may store ingredient supply data 341 that indicates ingredient supply information of one or more automated customized food generation machines 10* (which in this case, may also indicate the supply information of the automated customized food generation machine 10a). In various embodiments, the customized food item production system 320 may include one or more ingredient supplies, and components for manufacturing customized food items including, for example, robotic components, 3-D printing components, heating and/or cooling components, molding components, and so forth. In some embodiments, the user interface 360 may include a display screen 30 such as a touchscreen, a keypad 32, and so forth.

In various embodiments, the user preference information obtaining module 302' of the automated customized food generation machine 10a of FIG. 3A is a logic module that may be designed to, among other things, obtain user preference information of a user that indicates one or more customized food preferences of the user, the one or more customized food preferences of the user preference information including at least one or more preferences of the user that are related to integrity of one or more ingredients for use in generating one or more customized food items 22. In contrast, the capable automated customized food generation machine ascertaining module 304' of FIG. 3A is a logic module that may be configured to ascertain one or more capable automated customized food generation machines 10* that have one or more ingredients in one or more sufficient quantities to be able to currently generate at least one customized food item 22 in accordance with the one or more customized food preferences of the user 13. The indicator presenting module 306' of FIG. 3A, on the other hand, is a logic module that may be configured to, among other things, present one or more indicators that direct the user to at least one automated customized food generation machine 10*, the presentation of the one or more indicators being in response, at least in part, to the ascertainment.

Turning now to FIG. 3B, which illustrates a block diagram of another automated customized food generation machine 10b that can implement the operations and processes to be described herein. As indicated earlier, the automated customized food generation machine 10b in FIG. 3B is merely the "soft" version of the automated customized food generation machine 10a of FIG. 3A because the various logic modules: the user preference information obtaining module 302", the capable automated customized food generation machine ascertaining module 304", and the indicator presenting module 306" are implemented using one or more processors 330 (e.g., one or more microprocessors or controllers) executing software (e.g., computer readable instructions 342) rather than being implemented using purely hardware (e.g., ASIC) solutions as was the case in the automated customized food generation machine 10a of FIG. 3A. Thus, the user preference information obtaining module 302", the capable automated customized food generation machine ascertaining module 304", and the indicator presenting module 306" of FIG. 3B may be designed to execute the same functions as the user preference information obtaining module 302', the capable automated customized food generation machine ascertaining module 304', and the indicator presenting module 306' of FIG. 3A. The automated customized food generation machine 10b, as illustrated in FIG. 3B, may include other components (e.g., the user interface 360, the communication system 350, the memory 340 that stores the computer readable instructions 342, the customized food item production system 320, and so forth) that are the same or similar to the other components that may be included in the automated customized food generation machine 10a of FIG. 3A. Note that in the embodiment of the automated customized food generation machine 10b illustrated in FIG. 3B, the various logic modules (e.g., the user preference information obtaining module 302", the capable automated customized food generation machine ascertaining module 304", and the indicator presenting module 306") may be implemented by the one or more processors 330 (or other types of circuitry such as field programmable gate arrays or FPGAs) executing one or more computer readable instructions 342 stored in memory 340.

In various embodiments, the memory 340 of the automated customized food generation machine 10a of FIG. 3A and the automated customized food generation machine 10b of FIG. 3B may comprise one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

FIG. 3C illustrates the automated customized food generation machine 10* of FIG. 1A (e.g., illustrated in FIG. 3C as automated customized food generation machine 10c) when the automated customized food generation machine 10* of FIG. 1A is not a standalone device but instead, relies on another device (e.g., the network device 12* of FIG. 1C or 1D) to provide the various logic needed in order to, for example, obtain user preference information of a user 13 that indicates one or more customized food preferences of the user 13; ascertaining one or more capable automated customized food generation machines 10* that have one or more ingredients in one or more sufficient quantities to be able to currently generate at least one customized food item 22 in accordance with the one or more customized food preferences of the user 13; and presenting one or more indicators that direct the user 13 to at least one automated customized food generation machine 10*, the presentation of the one or more indicators being in response at least in part to the ascertainment. In contrast, FIGS. 3D and 3E illustrate two extreme implementations (e.g., in which all of the logic modules are implemented using hardware solutions as illustrated in the network device 12a of FIG. 3D or in which all of the logic modules are implemented using software solutions as illustrated in the network device 12b of FIG. 3E) of the network device 12* of FIGS. 1B, 1C, and 1D. Note that both the network device 12a of FIG. 3D and the network device 12b of FIG. 3E have the same logic modules as those logic modules included in the customized food preparation systems 10a and 10b of FIGS. 3A and 3B performing the same or similar functionalities.

Turning now to FIG. 4A illustrating a particular implementation of the user preference information obtaining module 302* (e.g., the user preference information obtaining module 302', the user preference information obtaining module 302", the user preference information obtaining module 302''', or the user preference information obtaining module 302'''') of FIG. 3A, 3B, 3D, or 3E. As illustrated, the user preference information obtaining module 302* may include one or more sub-logic modules in various alternative implementations. For example, in various embodiments, the user preference information obtaining module 302* may include a user entry obtaining module 402, a user device user preference information obtaining module 404, a memory user preference information obtaining module 406, an internet user preference information obtaining module 408, a user proximity detecting module 410, a user affiliated determining module 412, and/or a unsatisfactory automated customized food generation machine determining module 414. Specific details related to the user preference information obtaining module 302* as well as the above-described sub-modules of the user preference information obtaining module 302* will be provided below with respect to the operations and processes to be described herein.

Turning now to FIG. 4B illustrating a particular implementation of the capable automated customized food generation machine ascertaining module 304* (e.g., the capable automated customized food generation machine ascertaining module 304', the capable automated customized food generation machine ascertaining module 304", the capable automated customized food generation machine ascertaining module 304''', or the capable automated customized food generation machine ascertaining module 304'''') of FIG. 3A, 3B, 3D, or 3E. As illustrated, the capable automated customized food generation machine ascertaining module 304* may include one or more sub-logic modules in various alternative implementations. For example, in various embodiments, the capable automated customized food generation machine ascertaining module 304* may include an automated customized food generation machine identifier ascertaining module 416, an automated customized food generation machine location ascertaining module 418, a distance ascertaining module 420, a travel instructions ascertaining module 422, a short traveling distance determining module 424, an automated customized food generation machine querying module 426, a nearby automated customized food generation machine ascertaining module 428, a substitute automated food generating machine ascertaining module 430, a unsatisfactory interfaced machine detecting module 432, and/or a unsatisfactory proximity machine detecting module 434. Specific details related to the capable automated customized food generation machine ascertaining module 304* as well as the above-described sub-modules of the capable automated customized food generation machine ascertaining module 304* will be provided below with respect to the operations and processes to be described herein.

Referring to FIG. 4C, which illustrates a particular implementation of the indicator presenting module 306* (e.g., the indicator presenting module 306', the indicator presenting module 306", the indicator presenting module 306', or the indicator presenting module 306'''') of FIG. 3A, 3B, 3D, or 3E. As illustrated, the indicator presenting module 306* may include one or more sub-logic modules in various alternative implementations. For example, in various embodiments, the indicator presenting module 306* may include an electronic indicator communicating module 436, a textual indicator presenting module 438, and/or a graphical indicator presenting module 440. Specific details related to the indicator presenting module 306* as well as the above-described sub-modules of the indicator presenting module 306* will be provided below with respect to the operations and processes to be described herein.

In the following, various operations are presented in accordance with various embodiments that may be implemented by the automated customized food generation machine 10* of FIG. 3A, 3B, or 3C, or that may be implemented by the network device 12* of FIG. 3D or 3E. FIG. 5, for example, illustrates an operational flow 500 representing example computationally-implemented operations that may be implemented for, among other things, identifying one or more automated customized food generation machines that are able to generate at least one customized food item in accordance with one or more customized food preferences of a user and presenting, in response at least in part to the identification, one or more indicators that directs one or more users to at least one automated customized food generation machine. In some implementations, at least some portions of these operations may be implemented via the automated customized food generation machine 10* (e.g., the automated customized food generation machine 10a, automated customized food generation machine 10b, or the automated customized food generation machine 10c) of, for example, FIG. 3A, 3B, or 3C or via the network device 12* (e.g., the network device 12a or the network device 12b) of FIG. 3D or 3E.

Figure 5:
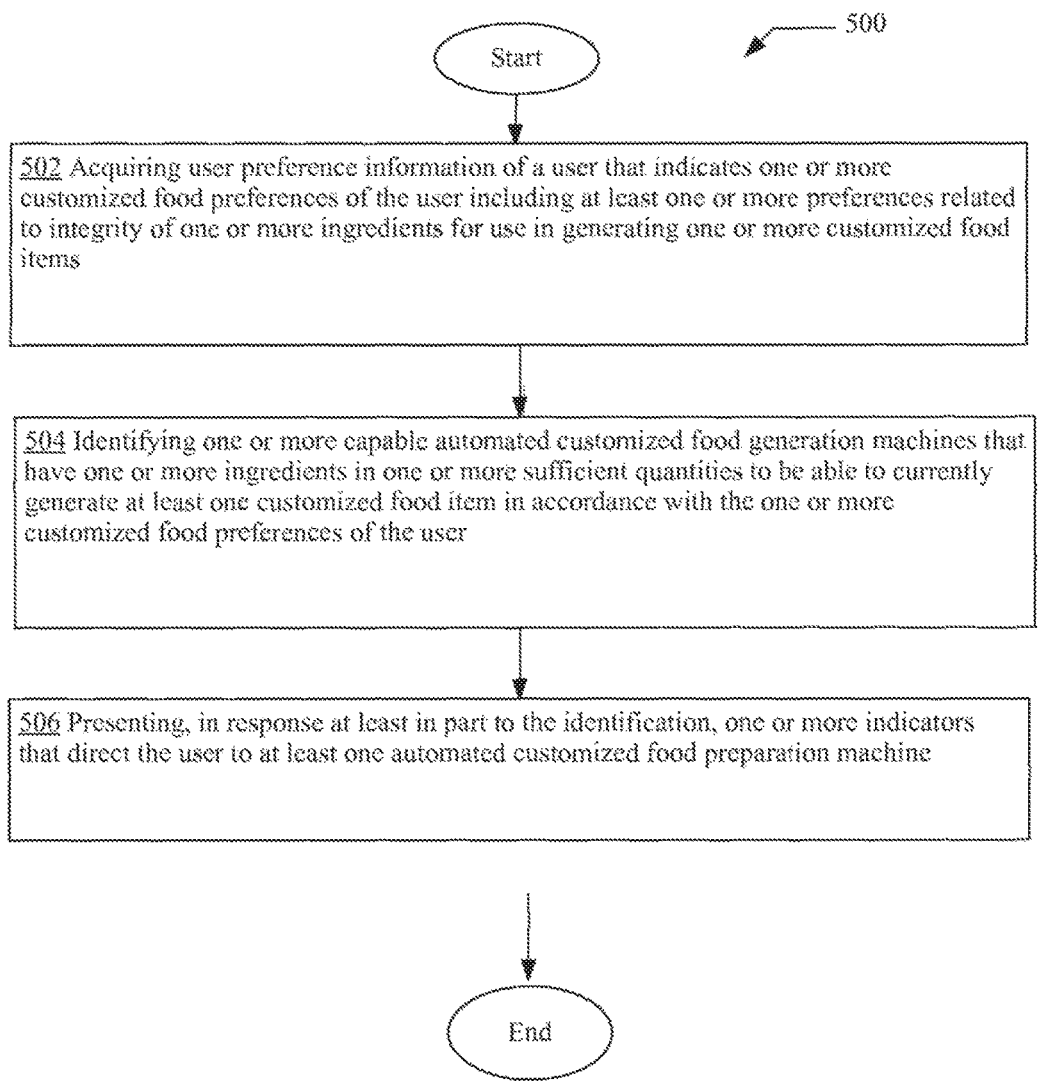
FIG. 5 is a high-level logic flowchart of a process, e.g., operational flow 500, according to some embodiments.

In FIG. 5 and in the following figures that include various examples of operational flows, discussions and explanations will be provided with respect to the automated customized food generation machine 10* or the network device 12* described above and as illustrated in FIGS. 3A, 3B, 3C, 3D, 3E, 4A, 4B, and 4C, and/or with respect to other examples (e.g., as provided in FIGS. 1A, 1B, 1C, 1D, 1E, 2A, 2B, 2C, 2D, and 2E) and contexts. However, it should be understood that the operational flows may be executed in a number of other environments and contexts, and/or in modified versions of FIGS. 1A, 1B, 1C, 1D, 1E, 2A, 2B, 2C, 2D, 2E, 3B, 3C, 3D, 3E, 4A, 4B, and 4C. Also, although the various operational flows are presented in the sequence(s) illustrated, it should be understood that the various operations may be performed in orders other than those which are illustrated, or may be performed concurrently.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 500 of FIG. 5 may move to a user preference information acquiring operation 502 for acquiring user preference information of a user that indicates one or more customized food preferences of the user including at least one or more preferences related to integrity of one or more ingredients for use in generating one or more customized food items. For instance, and as illustration, the user preference information obtaining module 302* of the automated customized food generation machine 10* of FIG. 3A or 3B (e.g., the user preference information obtaining module 302' of FIG. 3A or the user preference information obtaining module 302" of FIG. 3B) or of the network device 12* of FIG. 3D or 3E (e.g., the user preference information obtaining module 302'''' of FIG. 3D or the user preference information obtaining module 302''''' of FIG. 3E) acquiring or obtaining user preference information (e.g., user dietary information, user dietary preferences, user dietary restrictions, ingredient preference, and so forth) of a user 13 that indicates one or more customized food preferences of the user 13 including at least one or more preferences related to integrity (e.g., purity of the one or more ingredients, sourcing of the one or more ingredients, and so forth) of one or more ingredients (e.g., meats, dairy products, vegetables, processed ingredients such as flower, and so forth) for use in generating one or more customized food items 22 (e.g., customized energy bars, customized sandwiches, customized stew, and so forth).

Operational flow 500 may also include a capable automated customized food generation machine identifying operation 504 for identifying one or more capable automated customized food generation machines that have one or more ingredients in one or more sufficient quantities to be able to currently generate at least one customized food item in accordance with the one or more customized food preferences of the user. For instance, the capable automated customized food generation machine ascertaining module 304* of the automated customized food generation machine 10* of FIG. 3A or 3B (e.g., the capable automated customized food generation machine ascertaining module 304' of FIG. 3A or the capable automated customized food generation machine ascertaining module 304'' of FIG. 3B) or of the network device 12* of FIG. 3D or 3E (e.g., the capable automated customized food generation machine ascertaining module 304''' of FIG. 3D or the capable automated customized food generation machine ascertaining module 304'''' of FIG. 3E) identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate (e.g., to have capability to generate at the time of identification) at least one customized food item 22 in accordance with the one or more customized food preferences of the user 13.

For example, identifying or ascertaining at least one automated customized food generation machine 10* that is capable of generating, at least at the time of identification, a customized food item 22 in full compliance with all of the customization preferences of the user 13 as they relate to the customized food item 22. Thus, references in the following to a "capable automated customized food generation machine" or to "one or more capable automated customized food generation machines" may be in reference to automated customized food generation machines 10* that can currently (e.g., at the time of identification or ascertaining) generate one or more customized food items 22 in full compliance with one or more customized food preferences of a user 13 related to the one or more customized food items 22. In various embodiments, the ability of the one or more capable automated customized food generation machines 10* to generate the one or more customized food items 22 may be as a result of having at least immediate access to (e.g., having supplies of) the necessary ingredients needed in order to generate the one or more customized food items 22. In contrast, references in the following to a "substitute automated customized food generation machine" or to "one or more substitute automated customized food generation machines" may be in reference to automated customized food generation machines 10* that can currently generate one or more customized food items 22 that is only in partial compliance with the one or more customized food preferences of a user 13.

Operational flow 500 may further include an indicator presenting operation 506 for presenting, in response at least in part to the identification, one or more indicators that direct the user to at least one automated customized food generation machine. For instance, the indicator presenting module 306* of the automated customized food generation machine 10* of FIG. 3A or 3B (e.g., the indicator presenting module 306' of FIG. 3A or the indicator presenting module 306'' of FIG. 3B) or of the network device 12* of FIG. 3D or 3E (e.g., the indicator presenting module 306''' of FIG. 3D or the a indicator presenting module 306'''' of FIG. 3E) presenting (e.g., visually and/or audibly presenting, or electronically transmitting), in response at least in part to the identification of the one or more capable automated customized food generation machines (e.g., the automated customized food generation machine 10''' or the automated customized food generation machine 10'''' of FIGS. 1B, 1C, 1D, and 1E), one or more indicators 220* (see, for example, FIGS. 2A, 2B, 2C, 2D, and/or 2E) that direct the user 13 to at least one automated customized food generation machine 10*.

In various implementations, the one or more indicators 220* may "direct the user 13" to the at least one automated customized food generation machine 10* by a variety of different means including, for example, identifying the at least one automated customized food generation machine 10*, by providing an address for the at least one automated customized food generation machine 10*, by identifying the at least one location of the automated customized food generation machine 10* on a map, by providing directions to the at least one automated customized food generation machine 10* from the location of the user 13, and so forth as illustrated, for example, in FIGS. 2A, 2B, 2C, 2D, and/or 2E. As will be further described herein, in various embodiments, the user 13 may be directed to one or more "capable" automated customized food generation machines (e.g., the automated customized food generation machine 10''' or the automated customized food generation machine 10'''' of FIG. 1B, 1C, 1D, or 1E) and/or one or more "substitute" automated customized food generation machines (e.g., the automated customized food generation machine 10'' of FIG. 1B, 1C, 1D, or 1E) that are not capable of currently generating a customized food item 22 in full compliance of the one or more user preferences but that may be able to currently generate a customized food item 22 that is in partial compliance of the one or more user preferences.

Figure 6A:
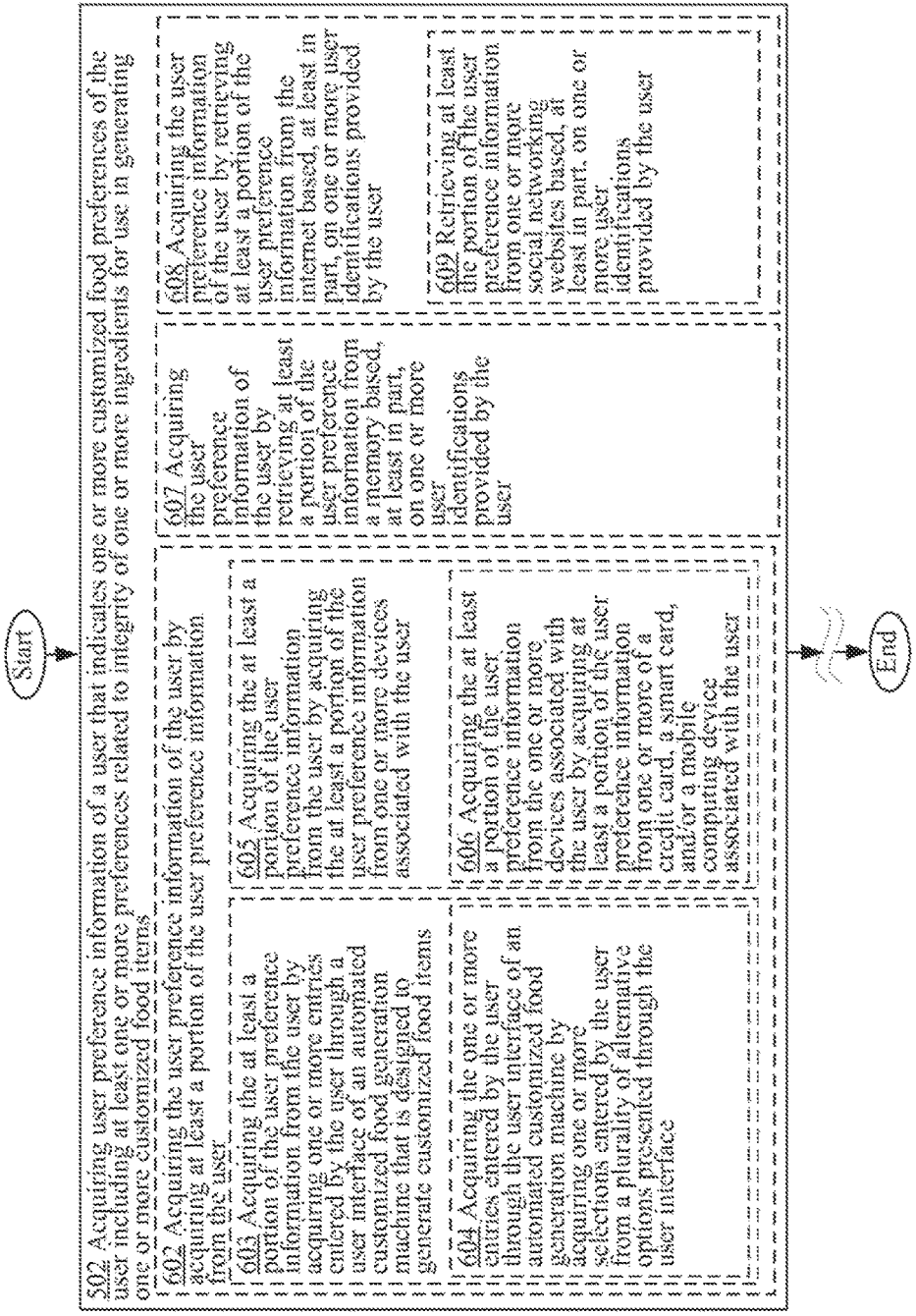
FIG. 6A is a high-level logic flowchart of a process depicting alternate implementations of the user preference information acquiring operation 502 of FIG. 5.

As will be described below, the user preference information acquiring operation 502, the capable automated customized food generation machine identifying operation 504, and the indicator presenting operation 506 may be executed in a variety of different ways in various alternative implementations. FIGS. 6A, 6B, 6C, 6D, 6E, and 6F for example, illustrate at least some of the alternative ways that the user preference information acquiring operation 502 of FIG. 5 may be implemented in various alternative implementations. In some cases, for example, the user preference information acquiring operation 502 may include an operation 602 for acquiring the user preference information of the user by acquiring at least a portion of the user preference information from the user as illustrated in FIG. 6A. For instance, the user preference information obtaining module 302* of the automated customized food generation machine 10a or 10b of FIG. 3A or 3B (or of the network device 12a or 12b of FIG. 3D or 3E) acquiring the user preference information of the user 13 by acquiring or obtaining at least a portion of the user preference information from the user 13 (e.g., preference information as entered by the user 13).

In various implementations, operation 602 may further include one or more additional operations including, in some cases, an operation 603 for acquiring the at least a portion of the user preference information from the user by acquiring one or more entries entered by the user through a user interface of an automated customized food generation machine that is designed to generate customized food items. For instance, the user preference information obtaining module 302* including the user entry obtaining module 402 (see FIG. 4A) of the automated customized food generation machine 10a or 10b of FIG. 3A or 3B (or of the network device 12a or 12b of FIG. 3D or 3E) acquiring the at least a portion of the user preference information from the user 13 by having the user entry obtaining module 402 acquire or obtain one or more entries entered by the user 13 through a user interface 360 of an automated customized food generation machine 10* that is designed to generate customized food items 22 in accordance with user customization preferences.

In some implementations, operation 603 may further include an operation 604 for acquiring the one or more entries entered by the user through the user interface of an automated customized food generation machine by acquiring one or more selections entered by the user from a plurality of alternative options presented through the user interface. For instance, the user entry obtaining module 402 of the automated customized food generation machine 10a or 10b of FIG. 3A or 3B (or of the network device 12a or 12b of FIG. 3D or 3E) acquiring the one or more entries entered by the user 13 through the user interface 360 of an automated customized food generation machine 10* by acquiring or obtaining one or more selections entered by the user 13 from a plurality of alternative options presented through the user interface 360 (e.g., a touchscreen, a keyboard, a microphone, and so forth).

In some cases, operation 602 may include an operation 605 for acquiring the at least a portion of the user preference information from the user by acquiring the at least a portion of the user preference information from one or more devices associated with the user. For instance, the user preference information obtaining module 302* including the user device user preference information obtaining module 404 (see FIG. 4A) of the automated customized food generation machine 10a or 10b of FIG. 3A or 3B (or of the network device 12a or 12b of FIG. 3D or 3E) acquiring the at least a portion of the user preference information from the user 13 by having the user device user preference information obtaining module 404 acquire or obtain the at least a portion of the user preference information from one or more devices (e.g., a mobile computing device such as a tablet computer or a Smartphone, or a Smartcard) associated with the user 13.

In some implementations, operation 605 may actually involve an operation 606 for acquiring the at least a portion of the user preference information from the one or more devices associated with the user by acquiring at least a portion of the user preference information from one or more of a credit card, a smart card, and/or a mobile computing device associated with the user. For instance, the user device user preference information obtaining module 404 of the automated customized food generation machine 10a or 10b of FIG. 3A or 3B (or of the network device 12a or 12b of FIG. 3D or 3E) acquiring the at least a portion of the user preference information from the one or more devices associated with the user 13 by acquiring or obtaining at least a portion of the user preference information (e.g., user ID, user preferences, user dietary information, etc.) from one or more of a credit card, a smart card, and/or a mobile computing device associated with the user 13.

In various implementations, the user preference information acquiring operation 502 may actually include an operation 607 for acquiring the user preference information of the user by retrieving at least a portion of the user preference information from a memory based, at least in part, on one or more user identifications provided by the user. For instance, the user preference information obtaining module 302* including the memory user preference information obtaining module 406 (see FIG. 4A) of the automated customized food generation machine 10a or 10b of FIG. 3A or 3B (or of the network device 12a or 12b of FIG. 3D or 3E) acquiring the user preference information of the user 13 by having the memory user preference information obtaining module 406 retrieve or obtain at least a portion of the user preference information from a memory 340 based, at least in part, on one or more user identifications (e.g., username, password, credit card number, and so forth) directly or indirectly provided by the user 13. For example, the user 13 may directly input user identification information via a user interface 360 of an automated customized food generation machine 10* or via a computing device 15, which may already have such user identification information stored in memory. Based on the obtained user identification information, user preference information may be retrieved.

In the same or alternative implementations, the user preference information acquiring operation 502 may include an operation 608 for acquiring the user preference information of the user by retrieving at least a portion of the user preference information from the internet based, at least in part, on one or more user identifications provided by the user. For instance, the user preference information obtaining module 302* including the internet user preference information obtaining module 408 (see FIG. 4A) of the automated customized food generation machine 10a or 10b of FIG. 3A or 3B (or of the network device 12a or 12b of FIG. 3D or 3E) acquiring the user preference information of the user 13 by having the internet user preference information obtaining module 408 retrieve or obtain at least a portion of the user preference information from the internet based, at least in part, on one or more user identifications (e.g., username, email address, password, and so forth) provided by the user 13.

In some cases, operation 608 may further include an operation 609 for retrieving at least the portion of the user preference information from one or more social networking websites based, at least in part, on one or more user identifications provided by the user. For instance, the internet user preference information obtaining module 408 of the automated customized food generation machine 10a or 10b of FIG. 3A or 3B (or of the network device 12a or 12b of FIG. 3D or 3E) retrieving or obtaining at least the portion of the user preference information from one or more social networking websites (e.g., Facebook, Twitter, and so forth) based, at least in part, on one or more user identifications directly or indirectly provided by the user 13.

Figure 6B:
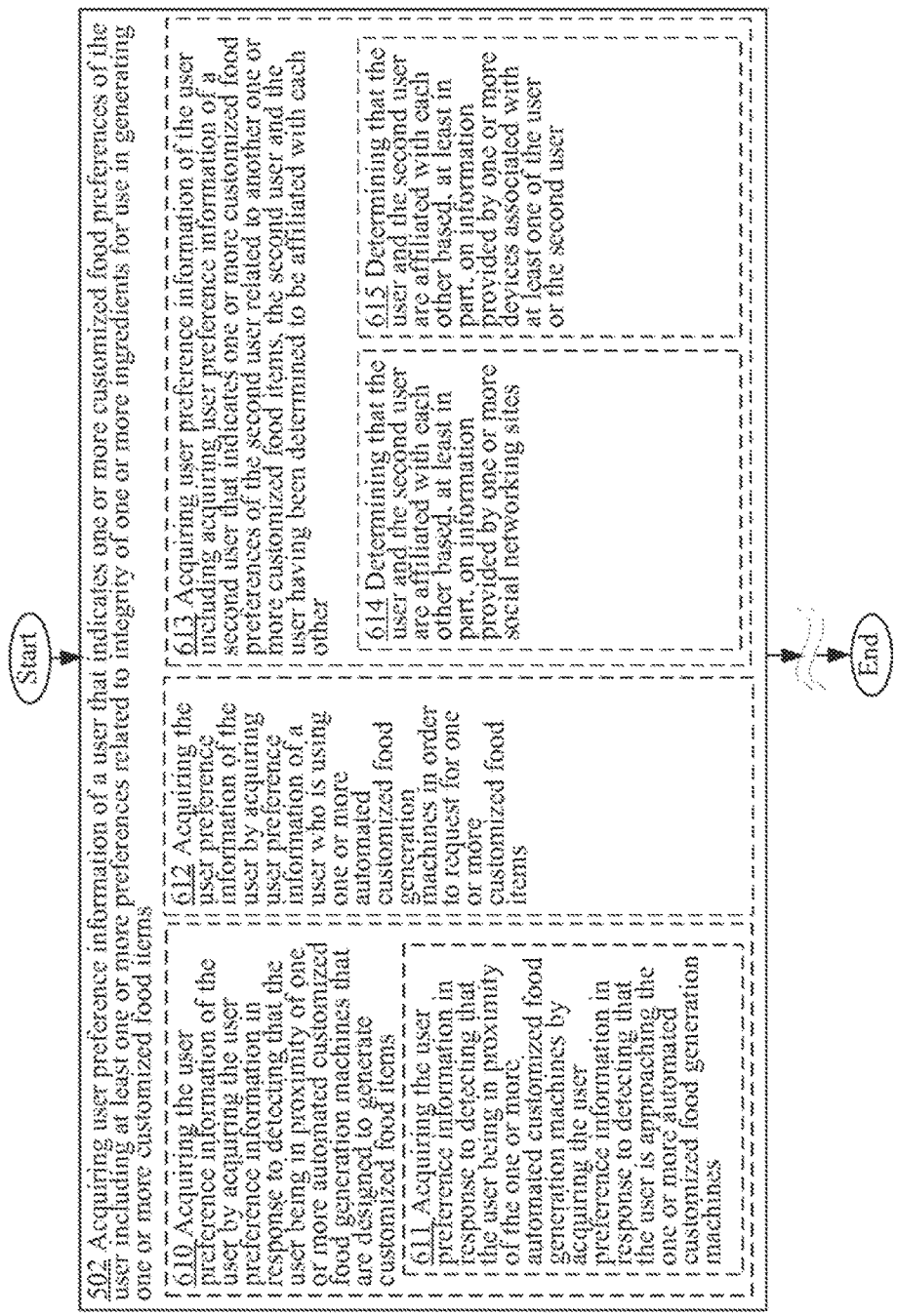
FIG. 6B is a high-level logic flowchart of a process depicting alternate implementations of the user preference information acquiring operation 502 of FIG. 5.

Turning to FIG. 6B, in the same or alternative implementations, the user preference information acquiring operation 502 may include an operation 610 for acquiring the user preference information of the user by acquiring the user preference information in response to detecting that the user being in proximity of one or more automated customized food generation machines that are designed to generate customized food items. For instance, the user preference information obtaining module 302* including the user proximity detecting module 410 (see FIG. 4A) of the automated customized food generation machine 10a or 10b of FIG. 3A or 3B (or of the network device 12a or 12b of FIG. 3D or 3E) acquiring the user preference information of the user 13 by acquiring or obtaining the user preference information in response to the user proximity detecting module 410 detecting that the user 13 being in proximity (e.g., within 20 or 30 feet) of one or more automated customized food generation machines 10* that are designed to generate customized food items 22.

In some cases, operation 610 may further include an operation 611 for acquiring the user preference information in response to detecting that the user being in proximity of the one or more automated customized food generation machines by acquiring the user preference information in response to detecting that the user is approaching the one or more automated customized food generation machines. For instance, the user preference information obtaining module 302* including the user proximity detecting module 410 of the automated customized food generation machine 10a or 10b of FIG. 3A or 3B (or of the network device 12a or 12b of FIG. 3D or 3E) acquiring the user preference information in response to detecting, by the user proximity detecting module 410, that the user 13 being in proximity (e.g., within 30 feet) of the one or more automated customized food generation machines 10* by acquiring or obtaining the user preference information in response to detecting, by the user proximity detecting module 410, that the user 13 is approaching or nearing the one or more automated customized food generation machines 10*.

In various implementations, the user preference information acquiring operation 502 may include an operation 612 for acquiring the user preference information of the user by acquiring user preference information of a user who is using one or more automated customized food generation machines in order to request for one or more customized food items. For instance, the user preference information obtaining module 302* of the automated customized food generation machine 10a or 10b of FIG. 3A or 3B (or of the network device 12a or 12b of FIG. 3D or 3E) acquiring the user preference information of the user 13 by acquiring or obtaining user preference information of a user 13 who is using (e.g., engaged with) one or more automated customized food generation machines 10* in order to request for (e.g., "order" or "purchase") one or more customized food items 22.

In the same or alternative implementations, the user preference information acquiring operation 502 may include an operation 613 for acquiring user preference information of the user including acquiring user preference information of a second user that indicates one or more customized food preferences of the second user related to another one or more customized food items, the second user and the user having been determined to be affiliated with each other. For instance, the user preference information obtaining module 302* including the user affiliated determining module 412 (see FIG. 4A) of the automated customized food generation machine 10a or 10b of FIG. 3A or 3B (or of the network device 12a or 12b of FIG. 3D or 3E) acquiring user preference information of the user 13 including acquiring or obtaining user preference information of a second user (not illustrated) that indicates one or more customized food preferences of the second user related to another one or more customized food items 22, the second user and the user 13 (e.g., the first user) having been determined by the user affiliated determining module 412, to be affiliated with each other. In some cases, collecting user preference information for multiple users 13 who are determined to be affiliated with each other (e.g., a group of friends out for lunch or snack) may facilitate in directing the multiple users 13 to appropriate one or more automated customized food preparation machines 10*.

As further illustrated in FIG. 6B, operation 613 may further include one or more additional operations in various implementations including in some cases, an operation 614 for determining that the user and the second user are affiliated with each other based, at least in part, on information provided by one or more social networking sites. For instance, the user affiliated determining module 412 of the automated customized food generation machine 10a or 10b of FIG. 3A or 3B (or of the network device 12a or 12b of FIG. 3D or 3E) determining that the user 13 and the second user are affiliated with each other based, at least in part, on information provided by one or more social networking sites (e.g., Facebook, Twitter, Friendster, and so forth).

In some implementations, operation 613 nay additionally or alternatively include an operation 615 for determining that the user and the second user are affiliated with each other based, at least in part, on information provided by one or more devices associated with at least one of the user or the second user. For instance, the user affiliated determining module 412 of the automated customized food generation machine 10a or 10b of FIG. 3A or 3B (or of the network device 12a or 12b of FIG. 3D or 3E) determining that the user 13 and the second user are affiliated with each other based, at least in part, on information provided by one or more devices (e.g., a Smartphone, a Smartcard, a tablet computer, and so forth) associated with at least one of the user 13 or the second user.

Figure 6C:
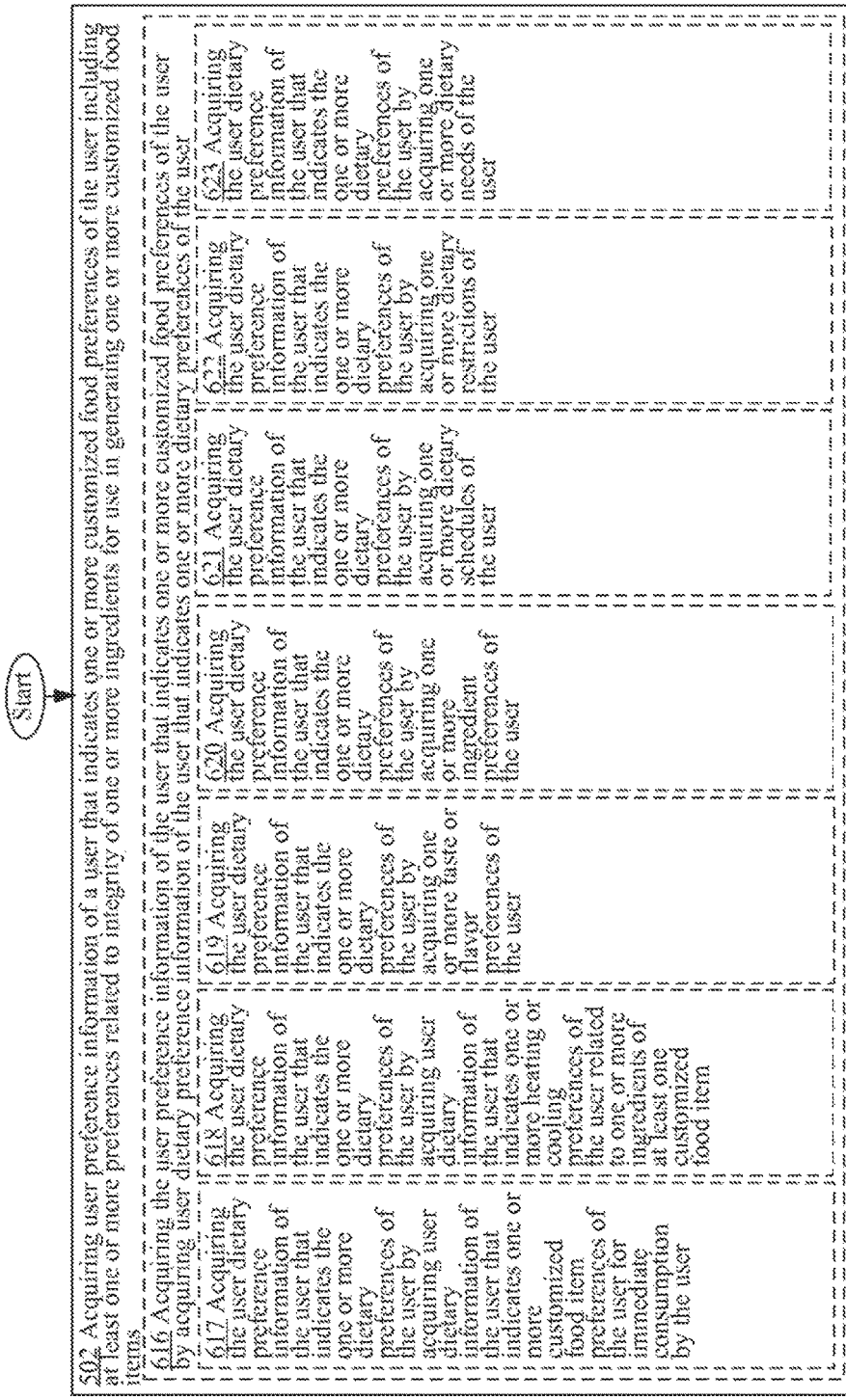
FIG. 6C is a high-level logic flowchart of a process depicting alternate implementations of the user preference information acquiring operation 502 of FIG. 5.

Turning now to FIG. 6C, in various implementations, the user preference information acquiring operation 502 of FIG. 5 may include an operation 616 for acquiring the user preference information of the user that indicates one or more customized food preferences of the user by acquiring user dietary preference information of the user that indicates one or more dietary preferences of the user. For instance, the user preference information obtaining module 302* of the automated customized food generation machine 10a or 10b of FIG. 3A or 3B (or of the network device 12a or 12b of FIG. 3D or 3E) acquiring the user preference information of the user 13 that indicates one or more customized food preferences of the user 13 by acquiring or obtaining user dietary preference information of the user 13 that indicates one or more dietary preferences (e.g., preference for chicken instead of beef, preference for not getting chicken from Tyson's farm, preference for whole bran breads, preference for aspartame as sweetener, and so forth) of the user 13.

As further illustrated in FIG. 6C, in various implementations, operation 616 may include one or more additional operations including, in some cases, an operation 617 for acquiring the user dietary preference information of the user that indicates the one or more dietary preferences of the user by acquiring user dietary information of the user that indicates one or more customized food item preferences of the user for immediate consumption by the user. For instance, the user preference information obtaining module 302* of the automated customized food generation machine 10a or 10b of FIG. 3A or 3B (or of the network device 12a or 12b of FIG. 3D or 3E) acquiring the user dietary preference information of the user 13 that indicates the one or more dietary preferences of the user 13 by acquiring or obtaining user dietary information of the user 13 that indicates one or more customized food item preferences (e.g., energy bar, hamburger, beef stew, and so forth) of the user 13 for immediate consumption by the user 13.

In the same or alternative implementations, operation 616 may additionally or alternatively include an operation 618 for acquiring the user dietary preference information of the user that indicates the one or more dietary preferences of the user by acquiring user dietary information of the user that indicates one or more heating or cooling preferences of the user related to one or more ingredients of at least one customized food item. For instance, the user preference information obtaining module 302* of the automated customized food generation machine 10a or 10b of FIG. 3A or 3B (or of the network device 12a or 12b of FIG. 3D or 3E) acquiring the user dietary preference information of the user 13 that indicates the one or more dietary preferences of the user 13 by acquiring or obtaining user dietary information of the user 13 that indicates one or more heating or cooling preferences of the user 13 related to one or more ingredients (e.g., hamburger meat, milk, ice cream, and so forth) of at least one customized food item 22 (e.g., hamburger sandwich, milk shake, and so forth).

In the same or alternative implementations, operation 616 may additionally or alternatively include an operation 619 for acquiring the user dietary preference information of the user that indicates the one or more dietary preferences of the user by acquiring one or more taste or flavor preferences of the user. For instance, the user preference information obtaining module 302* of the automated customized food generation machine 10a or 10b of FIG. 3A or 3B (or of the network device 12a or 12b of FIG. 3D or 3E) acquiring the user dietary preference information of the user 13 that indicates the one or more dietary preferences of the user 13 by acquiring or obtaining one or more taste or flavor preferences of the user 13.

In the same or alternative implementations, operation 616 may additionally or alternatively include an operation 620 for acquiring the user dietary preference information of the user that indicates the one or more dietary preferences of the user by acquiring one or more ingredient preferences of the user. For instance, the user preference information obtaining module 302* of the automated customized food generation machine 10a or 10b of FIG. 3A or 3B (or of the network device 12a or 12b of FIG. 3D or 3E) acquiring the user dietary preference information of the user 13 that indicates the one or more dietary preferences of the user 13 by acquiring or obtaining one or more ingredient preferences (e.g., non-fat milk, salt but no pepper, aspartame rather than saccharine, and so forth) of the user.

In the same or alternative implementations, operation 616 may additionally or alternatively include an operation an operation 621 for acquiring the user dietary preference information of the user that indicates the one or more dietary preferences of the user by acquiring one or more dietary schedules of the user. For instance, the user preference information obtaining module 302* of the automated customized food generation machine 10a or 10b of FIG. 3A or 3B (or of the network device 12a or 12b of FIG. 3D or 3E) acquiring the user dietary preference information of the user 13 that indicates the one or more dietary preferences of the user 13 by acquiring or obtaining one or more dietary schedules (e.g., dietary plans) of the user 13.

In the same or alternative implementations, operation 616 may additionally or alternatively include an operation 622 for acquiring the user dietary preference information of the user that indicates the one or more dietary preferences of the user by acquiring one or more dietary restrictions of the user. For instance, the user preference information obtaining module 302* of the automated customized food generation machine 10a or 10b of FIG. 3A or 3B (or of the network device 12a or 12b of FIG. 3D or 3E) acquiring the user dietary preference information of the user 13 that indicates the one or more dietary preferences of the user 13 by acquiring or obtaining one or more dietary restrictions (e.g., no peanuts, no dairy products, and so forth) of the user 13.

In the same or alternative implementations, operation 616 may additionally or alternatively include an operation 623 for acquiring the user dietary preference information of the user that indicates the one or more dietary preferences of the user by acquiring one or more dietary needs of the user. For instance, the user preference information obtaining module 302* of the automated customized food generation machine 10a or 10b of FIG. 3A or 3B (or of the network device 12a or 12b of FIG. 3D or 3E) acquiring the user dietary preference information of the user 13 that indicates the one or more dietary preferences of the user 13 by acquiring or obtaining one or more dietary needs (e.g., vitamin D enriched ingredients, high fiber diet, and so forth) of the user 13.

Figure 6D:
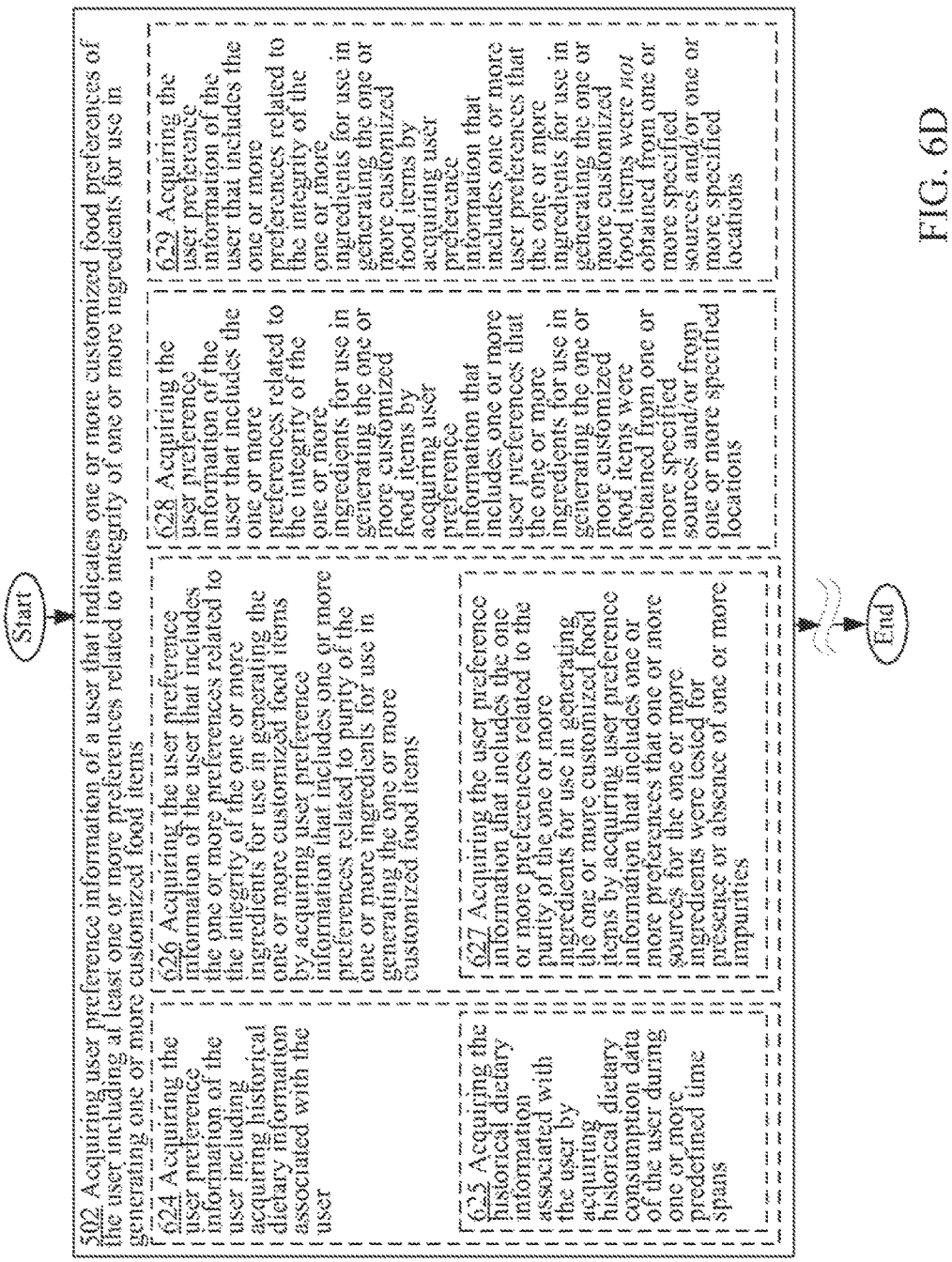
FIG. 6D is a high-level logic flowchart of a process depicting alternate implementations of the user preference information acquiring operation 502 of FIG. 5.

Referring to FIG. 6D, in various implementations, the user preference information acquiring operation 502 of FIG. 5 may include an operation 624 for acquiring the user preference information of the user including acquiring historical dietary information associated with the user. For instance, the user preference information obtaining module 302* of the automated customized food generation machine 10a or 10b of FIG. 3A or 3B (or of the network device 12a or 12b of FIG. 3D or 3E) acquiring the user preference information of the user 13 including acquiring or obtaining historical dietary information (e.g., previous food consumption data of the user 13) associated with the user 13.

In some implementations, operation 624 may include an operation 625 for acquiring the historical dietary information associated with the user by acquiring historical dietary consumption data of the user during one or more predefined time spans. For instance, the user preference information obtaining module 302* of the automated customized food generation machine 10a or 10b of FIG. 3A or 3B (or of the network device 12a or 12b of FIG. 3D or 3E) acquiring the historical dietary information associated with the user 13 by acquiring or obtaining historical dietary consumption data of the user 13 during one or more predefined (e.g., specified) time spans (e.g., one day, one week, two weeks, and so forth).

In various implementations, the user preference information acquiring operation 502 may include an operation 626 for acquiring the user preference information of the user that includes the one or more preferences related to the integrity of the one or more ingredients for use in generating the one or more customized food items by acquiring user preference information that includes one or more preferences related to purity of the one or more ingredients for use in generating the one or more customized food items. For instance, the user preference information obtaining module 302* of the automated customized food generation machine 10a or 10b of FIG. 3A or 3B (or of the network device 12a or 12b of FIG. 3D or 3E) acquiring the user preference information of the user 13 that includes the one or more preferences related to the integrity of the one or more ingredients for use in generating the one or more customized food items 22 by acquiring or obtaining user preference information that includes one or more preferences related to purity (e.g., cleanliness as it relates to presence or absence of impurities such as bacteria, virus, heavy metals, and so forth) of the one or more ingredients (e.g., meat ingredients, vegetable ingredients, processed ingredients such as flour or sugar, and so forth) for use in generating the one or more customized food items 22.

In some cases, operation 626 may further include an operation 627 for acquiring the user preference information that includes the one or more preferences related to the purity of the one or more ingredients for use in generating the one or more customized food items by acquiring user preference information that includes one or more preferences that one or more sources for the one or more ingredients were tested for presence or absence of one or more impurities. For instance, the user preference information obtaining module 302* of the automated customized food generation machine 10*a* or 10*b* of FIG. 3A or 3B (or of the network device 12*a* or 12*b* of FIG. 3D or 3E) acquiring the user preference information that includes the one or more preferences related to the purity of the one or more ingredients for use in generating the one or more customized food items 22 by acquiring or obtaining user preference information that includes one or more preferences that one or more sources (e.g., a farm, a harvest or crop, a cow, and so forth) for the one or more ingredients (e.g., meat ingredient, a dairy ingredient, a vegetable ingredient, and so forth) were tested for presence or absence of one or more impurities (e.g., bacteria, heavy metal, pesticides, and so forth).

In some implementations, the user preference information acquiring operation 502 may include an operation 628 for acquiring the user preference information of the user that includes the one or more preferences related to the integrity of the one or more ingredients for use in generating the one or more customized food items by acquiring user preference information that includes one or more user preferences that the one or more ingredients for use in generating the one or more customized food items were obtained from one or more specified sources and/or from one or more specified locations. For instance, the user preference information obtaining module 302* of the automated customized food generation machine 10*a* or 10*b* of FIG. 3A or 3B (or of the network device 12*a* or 12*b* of FIG. 3D or 3E) acquiring the user preference information of the user 13 that includes the one or more preferences related to the integrity of the one or more ingredients for use in generating the one or more customized food items 22 by acquiring or obtaining user preference information that includes one or more user preferences that the one or more ingredients for use in generating the one or more customized food items 22 were obtained from one or more specified sources (e.g., Tysons) and/or from one or more specified locations (e.g., Kobe, Japan).

In some implementations, the user preference information acquiring operation 502 may include an operation 629 for acquiring the user preference information of the user that includes the one or more preferences related to the integrity of the one or more ingredients for use in generating the one or more customized food items by acquiring user preference information that includes one or more user preferences that the one or more ingredients for use in generating the one or more customized food items were not obtained from one or more specified sources and/or one or more specified locations. For instance, the user preference information obtaining module 302* of the automated customized food generation machine 10*a* or 10*b* of FIG. 3A or 3B (or of the network device 12*a* or 12*b* of FIG. 3D or 3E) acquiring the user preference information of the user 13 that includes the one or more preferences related to the integrity of the one or more ingredients for use in generating the one or more customized food items 22 by acquiring or obtaining user preference information that includes one or more user preferences that the one or more ingredients for use in generating the one or more customized food items 22 were not obtained from one or more specified sources (e.g., Oscar Meyer) and/or one or more specified locations (e.g., Britain).

Figure 6E:
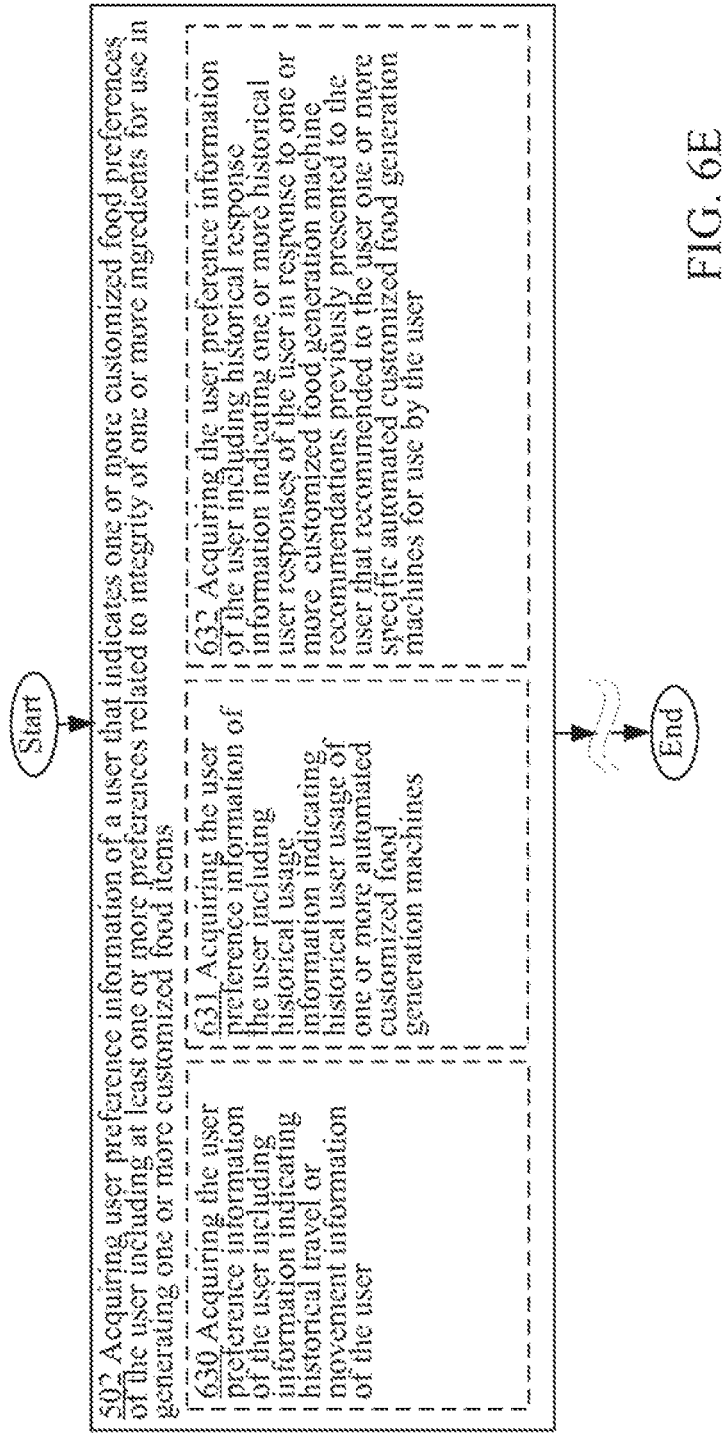
FIG. 6E is a high-level logic flowchart of a process depicting alternate implementations of the user preference information acquiring operation 502 of FIG. 5.

Referring now to FIG. 6E, in some implementations, the user preference information acquiring operation 502 of FIG. 5 may include an operation 630 for acquiring the user preference information of the user including information indicating historical travel or movement information of the user. For instance, the user preference information obtaining module 302* of the automated customized food generation machine 10*a* or 10*b* of FIG. 3A or 3B (or of the network device 12*a* or 12*b* of FIG. 3D or 3E) acquiring the user preference information of the user 13 including information indicating acquiring or obtaining historical travel or movement information (e.g., previous travel paths or routes) of the user 13. In some cases, obtaining such information may be useful in determining which automated customized food generation machine 10* the user 13 should be directed to.

In the same or alternative implementations, the user preference information acquiring operation 502 may additionally or alternative include an operation 631 for acquiring the user preference information of the user including historical usage information indicating historical user usage of one or more automated customized food generation machines. For instance, the user preference information obtaining module 302* of the automated customized food generation machine 10*a* or 10*b* of FIG. 3A or 3B (or of the network device 12*a* or 12*b* of FIG. 3D or 3E) acquiring or obtaining the user preference information of the user 13 including historical usage information indicating historical user usage of one or more automated customized food generation machines 10*. For example, acquiring user preference information of the user 13 that indicates which automated customized food generation machines 10* were previously used by the user 13.

In the same or alternative implementations, the user preference information acquiring operation 502 may additionally or alternative include an operation 632 for acquiring the user preference information including historical response information indicating one or more historical user responses of the user in response to one or more customized food generation machine recommendations previously presented to the user that recommended to the user one or more specific automated customized food generation machines for use by the user. For instance, the user preference information obtaining module 302* of the automated customized food generation machine 10*a* or 10*b* of FIG. 3A or 3B (or of the network device 12*a* or 12*b* of FIG. 3D or 3E) acquiring or obtaining the user preference information including historical response information indicating one or more historical user responses of the user 13 in response to one or more customized food generation machine recommendations previously presented to the user 13 that recommended to the user 13 one or more specific automated customized food generation machines 10* for use by the user 13.

Figure 6F:
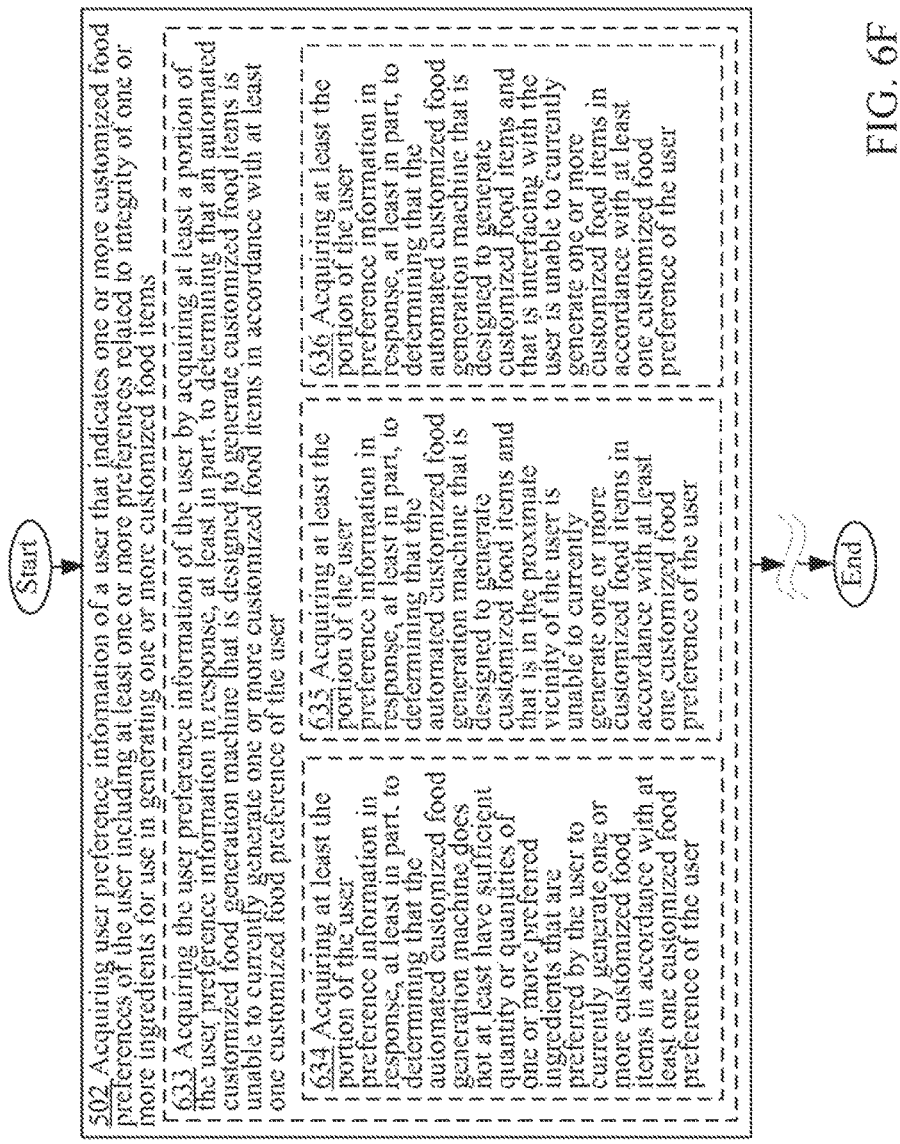
FIG. 6F is a high-level logic flowchart of a process depicting alternate implementations of the user preference information acquiring operation 502 of FIG. 5.

Turning to FIG. 6F, in various implementations, the user preference information acquiring operation 502 of FIG. 5 may additionally or alternative include an operation 633 for acquiring the user preference information of the user by acquiring at least a portion of the user preference information in response, at least in part, to determining that an automated customized food generation machine that is designed to generate customized food items is unable to currently generate one or more customized food items in accordance with at least one customized food preference of the user. For instance, the user preference information obtaining module 302* including the unsatisfactory automated customized food generation machine determining module 414 (see FIG. 6F) of the automated customized food generation machine 10a or 10b of FIG. 3A or 3B (or of the network device 12a or 12b of FIG. 3D or 3E) acquiring the user preference information of the user 13 by acquiring or obtaining at least a portion of the user preference information in response, at least in part, to determining by, for example, the unsatisfactory automated customized food generation machine determining module 414 that an automated customized food generation machine (e.g., the automated customized food generation machine 10' of FIG. 1C or 1D that the user 13 is interfacing with) that is designed to generate customized food items 22 is unable to currently generate (e.g., unable to generate proximately to when the user preference information is being acquired) one or more customized food items 22 in accordance with (e.g., in full compliance with) at least one customized food preference of the user 13.

In some cases, operation 633 may, in turn, further include an operation 634 for acquiring at least the portion of the user preference information in response, at least in part, to determining that the automated customized food generation machine does not at least have sufficient quantity or quantities of one or more preferred ingredients that are preferred by the user to be able to currently generate one or more customized food items in accordance with at least one customized food preference of the user. For instance, the user preference information obtaining module 302* including the unsatisfactory automated customized food generation machine determining module 414 of the automated customized food generation machine 10a or 10b of FIG. 3A or 3B (or of the network device 12a or 12b of FIG. 3D or 3E) acquiring or obtaining at least the portion of the user preference information in response at least in part to determining by, for example, the unsatisfactory automated customized food generation machine determining module 414 that the automated customized food generation machine (e.g., the automated customized food generation machine 10' of FIG. 1C or 1D that the user 13 is interfacing with) does not at least have sufficient quantity or quantities of one or more preferred ingredients (e.g., meat from a cattle heart that was tested for prions) that are preferred by the user 13 to be able to currently generate one or more customized food items 22 in accordance with at least one customized food preference of the user 13.

In some cases, operation 633 may include an operation 635 for acquiring at least the portion of the user preference information in response, at least in part, to determining that the automated customized food generation machine that is designed to generate customized food items and that is in the proximate vicinity of the user is unable to currently generate one or more customized food items in accordance with at least one customized food preference of the user. For instance, the user preference information obtaining module 302* including the unsatisfactory automated customized food generation machine determining module 414 of the automated customized food generation machine 10a or 10b of FIG. 3A or 3B (or of the network device 12a or 12b of FIG. 3D or 3E) acquiring or obtaining at least the portion of the user preference information in response, at least in part, to determining by, for example, the unsatisfactory automated customized food generation machine determining module 414 that the automated customized food generation machine (e.g., the automated customized food generation machine 10' of FIG. 1C or 1D that the user 13 is interfacing with) that is designed to generate customized food items 22 and that is in the proximate vicinity (e.g., within 30 feet) of the user 13 is to currently generate one or more customized food items 22 in accordance with at least one customized food preference of the user 13.

In some cases, operation 633 may include an operation 636 for acquiring at least the portion of the user preference information in response, at least in part, to determining that the automated customized food generation machine that is designed to generate customized food items and that is interfacing with the user is unable to currently generate one or more customized food items in accordance with at least one customized food preference of the user. For instance, the user preference information obtaining module 302* including the unsatisfactory automated customized food generation machine determining module 414 of the automated customized food generation machine 10a or 10b of FIG. 3A or 3B (or of the network device 12a or 12b of FIG. 3D or 3E) acquiring or obtaining at least the portion of the user preference information in response, at least in part, to determining by, for example, the unsatisfactory automated customized food generation machine determining module 414 that the automated customized food generation machine (e.g., the automated customized food generation machine 10' of FIG. 1C or 1D that the user 13 is interfacing with) that is designed to generate customized food items 22 and that is interfacing (e.g., interacting) with the user 13 is unable to currently generate one or more customized food items 22 in accordance with at least one customized food preference of the user 13.

Referring back to the capable automated customized food generation machine identifying operation 504 of FIG. 5, the capable automated customized food generation machine identifying operation 504 similar to the user preference information acquiring operation 502 of FIG. 5 may be executed in a number of different ways in various alternative embodiments as illustrated, for example, in FIGS. 7A, 7B, 7C, 7D, 7E, 7F, 7G, 7H, 7I, 7J, and 7K. In some cases, for example, the capable automated customized food generation machine identifying operation 504 may actually include or involve an operation 737 for identifying the one or more capable automated customized food generation machines by determining one or more identifiers of the one or more capable automated customized food generation machines that have the one or more ingredients in the one or more sufficient quantities to be able to currently generate the at least one customized food item in accordance with the one or more customized food preferences of the user. For instance, the capable automated customized food generation machine ascertaining module 304* including the automated customized food generation machine identifier ascertaining module 416 (see FIG. 4B) of the automated customized food generation machine 10a or 10b of FIG. 3A or 3B (or of the network device 12a or 12b of FIG. 3D or 3E) identifying the one or more capable automated customized food generation machines by having, for example, the automated customized food generation machine identifier ascertaining module 416 determine or ascertain one or more identifiers (e.g., machine number, IP address, etc.) of the one or more capable automated customized food generation machines (e.g., the automated customized food generation machine 10''' or the automated customized food generation machine 10'''' of FIG. 1B, 1C, 1D, or 1E) that have the one or more ingredients in the one or more sufficient quantities to be able to currently generate (e.g., to be able to generate at time of the identification) the at least one customized food item 22 in accordance with (e.g., in full compliance with) the one or more customized food preferences of the user 13 as they relate to the at least one customized food item 22.

In the same or alternative implementations, the capable automated customized food generation machine identifying operation 504 may additionally or alternatively include an operation 738 for identifying the one or more capable automated customized food generation machines by determining one or more locations of the one or more capable automated customized food generation machines that have the one or more ingredients in the one or more sufficient quantities to be able to currently generate the at least one customized food item in accordance with the one or more customized food preferences of the user. For instance, the capable automated customized food generation machine ascertaining module 304* including the automated customized food generation machine location ascertaining module 418 (see FIG. 4B) of the automated customized food generation machine 10a or 10b of FIG. 3A or 3B (or of the network device 12a or 12b of FIG. 3D or 3E) identifying the one or more capable automated customized food generation machines by having, for example, the automated customized food generation machine location ascertaining module 418 determine or ascertain one or more locations (e.g., addresses or geographical locations such as latitude and longitude) of the one or more capable automated customized food generation machines (e.g., the automated customized food generation machine 10''' or the automated customized food generation machine 10'''' of FIG. 1B, 1C, 1D, or 1E) that have the one or more ingredients in the one or more sufficient quantities to be able to currently generate the at least one customized food item 22 in accordance with the one or more customized food preferences of the user 13.

In the same or alternative implementations, the capable automated customized food generation machine identifying operation 504 may additionally or alternatively include an operation 739 for identifying the one or more capable automated customized food generation machines by determining one or more distances between the user and the one or more capable automated customized food generation machines that have the one or more ingredients in the one or more sufficient quantities to be able to currently generate the at least one customized food item in accordance with the one or more customized food preferences of the user. For instance, the capable automated customized food generation machine ascertaining module 304* including the distance ascertaining module 420 (see FIG. 4B) of the automated customized food generation machine 10a or 10b of FIG. 3A or 3B (or of the network device 12a or 12b of FIG. 3D or 3E) identifying the one or more capable automated customized food generation machines by having, for example, the distance ascertaining module 420 determine or ascertain one or more distances between the user 13 and the one or more capable automated customized food generation machines (e.g., the automated customized food generation machine 10''' or the automated customized food generation machine 10'''' of FIG. 1B, 1C, 1D, or 1E) that have the one or more ingredients in the one or more sufficient quantities to be able to currently generate the at least one customized food item 22 in accordance with the one or more customized food preferences of the user 13. In some cases, such information (e.g., distance between the user 13 and the one or more capable automated customized food generation machines 10*) may then be presented to the user 13 in order to assist the user 13 in selecting an automated customized food generation machine 10* for usage.

In the same or alternative implementations, the capable automated customized food generation machine identifying operation 504 may additionally or alternatively include an operation 740 for identifying the one or more capable automated customized food generation machines by determining one or more instructions for traveling to the one or more capable automated customized food generation machines from one or more locations of the one or more users. For instance, the capable automated customized food generation machine ascertaining module 304* including the travel instructions ascertaining module 422 (see FIG. 4B) of the automated customized food generation machine 10a or 10b of FIG. 3A or 3B (or of the network device 12a or 12b of FIG. 3D or 3E) identifying the one or more capable automated customized food generation machines (e.g., the automated customized food generation machine 10''' or the automated customized food generation machine 10'''' of FIG. 1B, 1C, 1D, or 1E) by having, for example, the travel instructions ascertaining module 422 determine or ascertain one or more instructions (e.g., directions) for traveling to the one or more capable automated customized food generation machines 10* from one or more locations of the one or more users 13.

Turning now to FIG. 7B, the capable automated customized food generation machine identifying operation 504 of FIG. 5 may include an operation 741 for identifying the one or more capable automated customized food generation machines that have the one or more ingredients in the one or more sufficient quantities to be able to currently generate at least the one customized food item in accordance with the one or more customized food preferences of the user by identifying one or more capable automated customized food generation machines that are determined to be located within a short traveling distance from a location of the user and that have one or more ingredients in one or more sufficient quantities to be able to currently generate at least one customized food item in accordance with the one or more customized food preferences of the user in various implementations. For instance, the capable automated customized food generation machine ascertaining module 304* including the short traveling distance ascertaining module 424 (see FIG. 4B) of the automated customized food generation machine 10a or 10b of FIG. 3A or 3B (or of the network device 12a or 12b of FIG. 3D or 3E) identifying the one or more capable automated customized food generation machines that have the one or more ingredients in the one or more sufficient quantities to be able to currently generate at least the one customized food item 22 in accordance with the one or more customized food preferences of the user 13 by identifying or ascertaining one or more capable automated customized food generation machines (e.g., the automated customized food generation machine 10''' or the automated customized food generation machine 10'''' of FIG. 1B, 1C, 1D, or 1E) that are, for example, determined by the short traveling distance ascertaining module 424 to be located within a short traveling distance (e.g., walking, mass transit, and/or driving distance such as within ½ mile to 5 miles) from a location of the user 13 and that have one or more ingredients in one or more sufficient quantities to be able to currently generate at least one customized food item 22 in accordance with the one or more customized food preferences of the user 13.

In some cases, operation 741 may include an operation 742 for identifying one or more capable automated customized food generation machines that are determined to be located within a distance corresponding to a maximum distance traveled by a user via walking, mass transit, and/or automobile in 30 minutes and that have one or more ingredients in one or more sufficient quantities to be able to currently generate at least one customized food item in accordance with the one or more customized food preferences of the user. For instance, the capable automated customized food generation machine ascertaining module 304* including the short traveling distance ascertaining module 424 of the automated customized food generation machine 10a or 10b of FIG. 3A or 3B (or of the network device 12a or 12b of FIG. 3D or 3E) identifying or ascertaining one or more capable automated customized food generation machines (e.g., the automated customized food generation machine 10''' or the automated customized food generation machine 10'''' of FIG. 1B, 1C, 1D, or 1E) that are, for example, determined by the short traveling distance ascertaining module 424 to be located within a distance corresponding to a maximum distance traveled by a user 13 by walking, mass transit, and/or automobile in 30 minutes and that have one or more ingredients in one or more sufficient quantities to be able to currently generate at least one customized food item 22 in accordance with the one or more customized food preferences of the user 13.

In some cases, operation 741 may include an operation 743 for identifying one or more capable automated customized food generation machines that are determined to be located within five miles from the location of the user and that have one or more ingredients in one or more sufficient quantities to be able to currently generate at least one customized food item in accordance with the one or more customized food preferences of the user. For instance, the capable automated customized food generation machine ascertaining module 304* including the short traveling distance ascertaining module 424 of the automated customized food generation machine 10a or 10b of FIG. 3A or 3B (or of the network device 12a or 12b of FIG. 3D or 3E) identifying or ascertaining one or more capable automated customized food generation machines (e.g., the automated customized food generation machine 10''' or the automated customized food generation machine 10'''' of FIG. 1B, 1C, 1D, or 1E) that are determined, for example, by the short traveling distance ascertaining module 424, to be located within five miles from the current location of the user 13 and that have one or more ingredients in one or more sufficient quantities to be able to currently generate at least one customized food item 22 in accordance with the one or more customized food preferences of the user 13.

In the same or alternative implementations, the capable automated customized food generation machine identifying operation 504 may include an operation 744 for identifying the one or more capable automated customized food generation machines that have the one or more ingredients in the one or more sufficient quantities to be able to currently generate the at least one customized food item in accordance with the one or more customized food preferences of the user, the identification being based on data stored in a memory, the data having been previously supplied to the memory by one or more automated customized food generation machines and indicating ingredient supply statuses of the one or more automated customized food generation machines. For instance, the capable automated customized food generation machine ascertaining module 304* of the automated customized food generation machine 10a or 10b of FIG. 3A or 3B (or of the network device 12a or 12b of FIG. 3D or 3E) identifying or ascertaining the one or more capable automated customized food generation machines (e.g., the automated customized food generation machine 10''' or the automated customized food generation machine 10'''' of FIG. 1B, 1C, 1D, or 1E) that have the one or more ingredients in the one or more sufficient quantities to be able to currently generate the at least one customized food item 22 in accordance with the one or more customized food preferences of the user 13, the identification or ascertainment being based on data stored in a memory 340, the data having been previously supplied to the memory 340 by one or more automated customized food generation machines 10* and indicating ingredient supply statuses of the one or more automated customized food generation machines 10*.

Referring to FIG. 7C, in various implementations, the capable automated customized food generation machine identifying operation 504 may include an operation 745 for identifying the one or more capable automated customized food generation machines that have the one or more ingredients in the one or more sufficient quantities to be able to currently generate the at least one customized food item in accordance with the one or more customized food preferences of the user by querying one or more automated customized food generation machines in order to determine that the one or more queried automated customized food generation machines have the one or more ingredients in the one or more sufficient quantities to be able to currently generate the at least one customized food item in accordance with the one or more customized food preferences of the user. For instance, the capable automated customized food generation machine ascertaining module 304* including the automated customized food generation machine querying module 426 (see FIG. 4B) of the automated customized food generation machine 10a or 10b of FIG. 3A or 3B (or of the network device 12a or 12b of FIG. 3D or 3E) identifying or ascertaining the one or more capable automated customized food generation machines (e.g., the automated customized food generation machine 10''' or the automated customized food generation machine 10'''' of FIG. 1B, 1C, 1D, or 1E) that have the one or more ingredients in the one or more sufficient quantities to be able to currently generate the at least one customized food item 22 in accordance with the one or more customized food preferences of the user 13 by having the automated customized food generation machine querying module 426, for example, query one or more automated customized food generation machines 10* in order to determine that the one or more queried automated customized food generation machines 10* have the one or more ingredients in the one or more sufficient quantities to be able to currently generate the at least one customized food item 22 in accordance with the one or more customized food preferences of the user 13.

As further illustrated in FIG. 7C, in various implementations, operation 745 may actually include an operation 746a for determining presence of one or more automated customized food generation machines within a short walking, mass transit, and/or driving distance from current location of the user and an operation 746b for querying the one or more automated customized food generation machines that were determined to be located within the short walking, mass transit, and/or driving distance from the current location of the user in order to determine that the one or more automated customized food generation machines have the one or more ingredients in the one or more sufficient quantities to be able to currently generate the at least one customized food item in accordance with the one or more customized food preferences of the user. For instance, the nearby automated customized food generation machine ascertaining module 428 (see FIG. 4B) of the automated customized food generation machine 10a or 10b of FIG. 3A or 3B (or of the network device 12a or 12b of FIG. 3D or 3E) determining or ascertaining presence of one or more automated customized food generation machines 10* within a short walking, mass transit, and/or driving distance from current location of the user 13; and the automated customized food generation machine querying module 426 (see FIG. 4B) of the automated customized food generation machine 10*a* or 10*b* of FIG. 3A or 3B (or of the network device 12*a* or 12*b* of FIG. 3D or 3E) querying the one or more automated customized food generation machines 10* that were determined to be located within the short walking, mass transit, and/or driving distance from the current location of the user 13 in order to determine that the one or more automated customized food generation machines 10* have the one or more ingredients in the one or more sufficient quantities to be able to currently generate the at least one customized food item 22 in accordance with the one or more customized food preferences of the user 13. There are a number of ways to determine or ascertain the presence of the one or more automated customized food generation machines 10* within a short walking, mass transit, and/or driving distance from the current location of the user 13. For example, such information may be obtained using GPS data obtained from a mobile device of the user 13 and the known locations of the automated customized food generation machines 10*, or using previously stored information related to the relative locations of different automated customized food generation machines 10* with respect to each other in situations where, for example, the user 13 is using or is at one of the automated customized food generation machines 10*.

As further illustrated in FIG. 7C, operation 746*a* may include one or more additional operations including, in some cases, an operation 747 for determining the presence of the one or more automated customized food generation machines within the short walking, mass transit, and/or driving distance from current location of the user by determining presence of one or more automated customized food generation machines within one mile from current location of the user. For instance, the nearby automated customized food generation machine ascertaining module 428 of the automated customized food generation machine 10*a* or 10*b* of FIG. 3A or 3B (or of the network device 12*a* or 12*b* of FIG. 3D or 3E) determining the presence of the one or more automated customized food machines 10* within the short walking, mass transit, and/or driving distance from current location of the user 13 by determining or ascertaining presence of one or more automated customized food machines 10* within one mile from current location of the user 13.

In some implementations, operation 746*a* may include an operation 748 for determining the presence of the one or more automated customized food generation machines within the short walking, mass transit, and/or driving distance from the current location of the user by determining presence of one or more automated customized food generation machines within five miles from the current location of the user. For instance, the nearby automated customized food generation machine ascertaining module 428 of the automated customized food generation machine 10*a* or 10*b* of FIG. 3A or 3B (or of the network device 12*a* or 12*b* of FIG. 3D or 3E) determining the presence of the one or more automated customized food machines 10* within the short walking, mass transit, and/or driving distance from the current location of the user 13 by determining or ascertaining presence of one or more automated customized food generation machines 10* within five miles from the current location of the user 13.

In some implementations, operation 746*a* may include an operation 749 for determining the presence of the one or more automated customized food generation machines within the short walking, mass transit, and/or driving distance from the current location of the user by determining presence of one or more automated customized food generation machines within 30 minutes of traveling by walking, mass transit, and/or automobile from the current location of the user. For instance, the nearby automated customized food generation machine ascertaining module 428 of the automated customized food generation machine 10*a* or 10*b* of FIG. 3A or 3B (or of the network device 12*a* or 12*b* of FIG. 3D or 3E) determining the presence of the one or more automated customized food generation machines 10* within the short walking, mass transit, and/or driving distance from the current location of the user 13 by determining or ascertaining presence of one or more automated customized food generation machines 10* within 30 minutes of traveling by walking, mass transit, and/or automobile from the current location of the user 13.

Figure 7A:
FIG. 7A is a high-level logic flowchart of a process depicting alternate implementations of the capable automated customized food generation machine identifying operation 504 of FIG. 5.
Figure 7D:
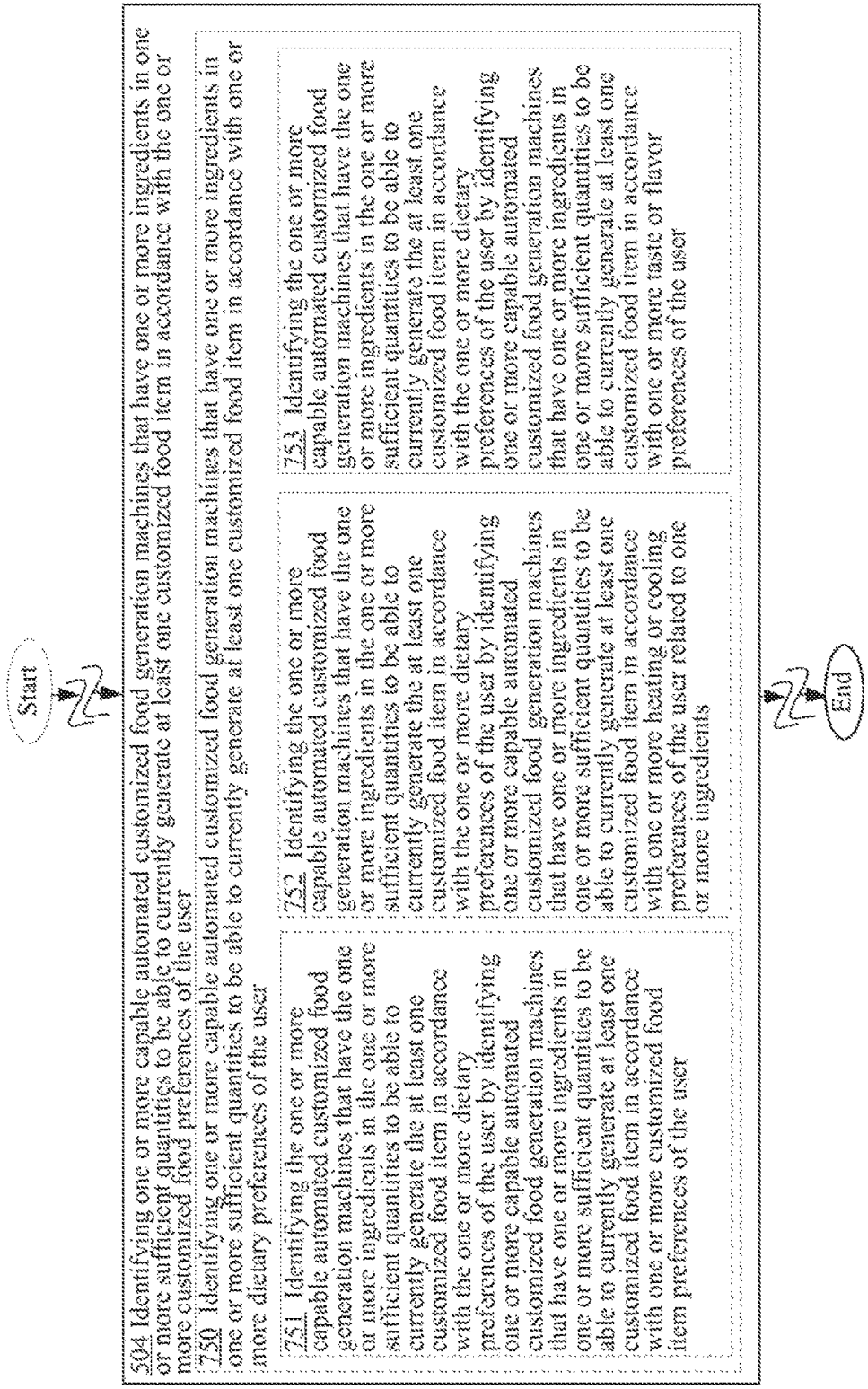
FIG. 7D is a high-level logic flowchart of a process depicting alternate implementations of the capable automated customized food generation machine identifying operation 504 of FIG. 5.

In various implementations, the capable automated customized food generation machine identifying operation 504 may actually include an operation 750 for identifying one or more capable automated customized food generation machines that have one or more ingredients in one or more sufficient quantities to be able to currently generate at least one customized food item in accordance with one or more dietary preferences of the user as illustrated in FIG. 7D. For instance, the capable automated customized food generation machine ascertaining module 304* of the automated customized food generation machine 10*a* or 10*b* of FIG. 3A or 3B (or of the network device 12*a* or 12*b* of FIG. 3D or 3E) identifying one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more dietary preferences (e.g., chicken from Tyson farm to be used, non-fat milk, and so forth) of the user 13.

As further illustrated in FIG. 7D, in various implementations, operation 750 may further include one or more additional operations including, in some cases, an operation 751 for identifying the one or more capable automated customized food generation machines that have the one or more ingredients in the one or more sufficient quantities to be able to currently generate the at least one customized food item in accordance with the one or more dietary preferences of the user by identifying one or more capable automated customized food generation machines that have one or more ingredients in one or more sufficient quantities to be able to currently generate at least one customized food item in accordance with one or more customized food item preferences of the user. For instance, the capable automated customized food generation machine ascertaining module 304* of the automated customized food generation machine 10*a* or 10*b* of FIG. 3A or 3B (or of the network device 12*a* or 12*b* of FIG. 3D or 3E) identifying the one or more capable automated customized food generation machines that have the one or more ingredients in the one or more sufficient quantities to be able to currently generate the at least one customized food item 22 in accordance with the one or more dietary preferences of the user 13 by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more customized food item preferences (e.g., peanut butter energy bar, hamburger, beef stew, and so forth) of the user 13.

In the same or different implementations, operation 750 may additionally or alternatively include an operation 752 for identifying the one or more capable automated customized food generation machines that have the one or more ingredients in the one or more sufficient quantities to be able to currently generate the at least one customized food item in accordance with the one or more dietary preferences of the user by identifying one or more capable automated customized food generation machines that have one or more ingredients in one or more sufficient quantities to be able to currently generate at least one customized food item in accordance with one or more heating or cooling preferences of the user related to one or more ingredients. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines that have the one or more ingredients in the one or more sufficient quantities to be able to currently generate the at least one customized food item 22 in accordance with the one or more dietary preferences of the user 13 by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more heating or cooling preferences of the user 13 related to one or more ingredients (e.g., meats or ice cream).

In the same or different implementations, operation 750 may additionally or alternatively include an operation 753 for identifying the one or more capable automated customized food generation machines that have the one or more ingredients in the one or more sufficient quantities to be able to currently generate the at least one customized food item 22 in accordance with the one or more dietary preferences of the user by identifying one or more capable automated customized food generation machines that have one or more ingredients in one or more sufficient quantities to be able to currently generate at least one customized food item in accordance with one or more taste or flavor preferences of the user. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines that have the one or more ingredients in the one or more sufficient quantities to be able to currently generate the at least one customized food item 22 in accordance with the one or more dietary preferences of the user 13 by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more taste or flavor (e.g., spicy, tangy, and so forth) preferences of the user 13.

Figure 7E:
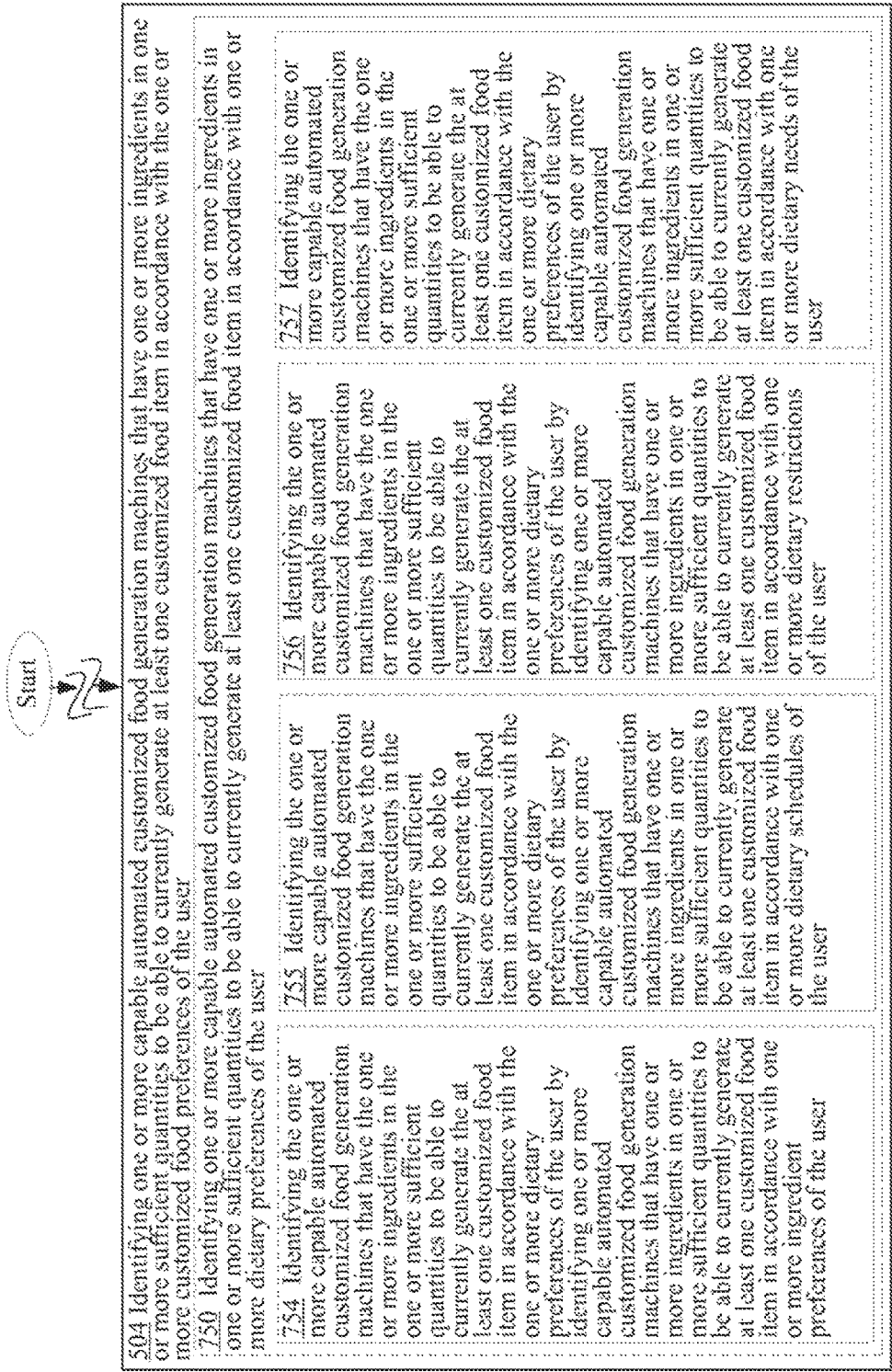
FIG. 7E is a high-level logic flowchart of a process depicting alternate implementations of the capable automated customized food generation machine identifying operation 504 of FIG. 5.

In the same or different implementations, operation 750 may additionally or alternatively include an operation 754 for identifying the one or more capable automated customized food generation machines that have the one or more ingredients in the one or more sufficient quantities to be able to currently generate the at least one customized food item in accordance with the one or more dietary preferences of the user by identifying one or more capable automated customized food generation machines that have one or more ingredients in one or more sufficient quantities to be able to currently generate at least one customized food item in accordance with one or more ingredient preferences of the user as illustrated in FIG. 7E. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines that have the one or more ingredients in the one or more sufficient quantities to be able to currently generate the at least one customized food item 22 in accordance with the one or more dietary preferences of the user 13 by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item in accordance with one or more ingredient preferences (e.g., chicken rather than beef, aspartame for sweetener, wheat bread, and so forth) of the user 13.

In the same or different implementations, operation 750 may additionally or alternatively include an operation 755 for identifying the one or more capable automated customized food generation machines that have the one or more ingredients in the one or more sufficient quantities to be able to currently generate the at least one customized food item in accordance with the one or more dietary preferences of the user by identifying one or more capable automated customized food generation machines that have one or more ingredients in one or more sufficient quantities to be able to currently generate at least one customized food item in accordance with one or more dietary schedules of the user. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines that have the one or more ingredients in the one or more sufficient quantities to be able to currently generate the at least one customized food item 22 in accordance with the one or more dietary preferences of the user 13 by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more dietary schedules (e.g., dietary plans) of the user 13.

In the same or different implementations, operation 750 may additionally or alternatively include an operation 756 for identifying the one or more capable automated customized food generation machines that have the one or more ingredients in the one or more sufficient quantities to be able to currently generate the at least one customized food item in accordance with the one or more dietary preferences of the user by identifying one or more capable automated customized food generation machines that have one or more ingredients in one or more sufficient quantities to be able to currently generate at least one customized food item in accordance with one or more dietary restrictions of the user. For instance, the capable automated customized food generation machine ascertaining module 304\* of the automated customized food generation machine 10a or 10b of FIG. 3A or 3B (or of the network device 12a or 12b of FIG. 3D or 3E) identifying the one or more capable automated customized food generation machines that have the one or more ingredients in the one or more sufficient quantities to be able to currently generate the at least one customized food item 22 in accordance with the one or more dietary preferences of the user 13 by identifying or ascertaining one or more capable automated customized food generation machines (e.g., the automated customized food generation machine 10‴ or the automated customized food generation machine 10⁗ of FIG. 1B, 1C, 1D, or 1E) that have one or more ingredients in one or more sufficient quantities to be able to currently generate at least one customized food item 22 in accordance with one or more dietary restrictions (e.g., no tree nuts, low carbohydrates, non-dairy ingredients such as soy milk, and so forth) of the user 13.

In the same or different implementations, operation 750 may additionally or alternatively include an operation 757 for identifying the one or more capable automated customized food generation machines that have the one or more ingredients in the one or more sufficient quantities to be able to currently generate the at least one customized food item in accordance with the one or more dietary preferences of the user by identifying one or more capable automated customized food generation machines that have one or more ingredients in one or more sufficient quantities to be able to currently generate at least one customized food item in accordance with one or more dietary needs of the user. For instance, the capable automated customized food generation machine ascertaining module 304\* of the automated customized food generation machine 10a or 10b of FIG. 3A or 3B (or of the network device 12a or 12b of FIG. 3D or 3E) identifying the one or more capable automated customized food generation machines that have the one or more ingredients in the one or more sufficient quantities to be able to currently generate the at least one customized food item 22 in accordance with the one or more dietary preferences of the user 13 by identifying or ascertaining one or more capable automated customized food generation machines (e.g., the automated customized food generation machine 10′ or the automated customized food generation machine 10⁗ of FIG. 1B, 1C, 1D, or 1E) that have one or more ingredients in one or more sufficient quantities to be able to currently generate at least one customized food item 22 in accordance with one or more dietary needs (e.g., vitamin D enriched ingredients, high fiber diet, and so forth) of the user 13.

Figure 7F:
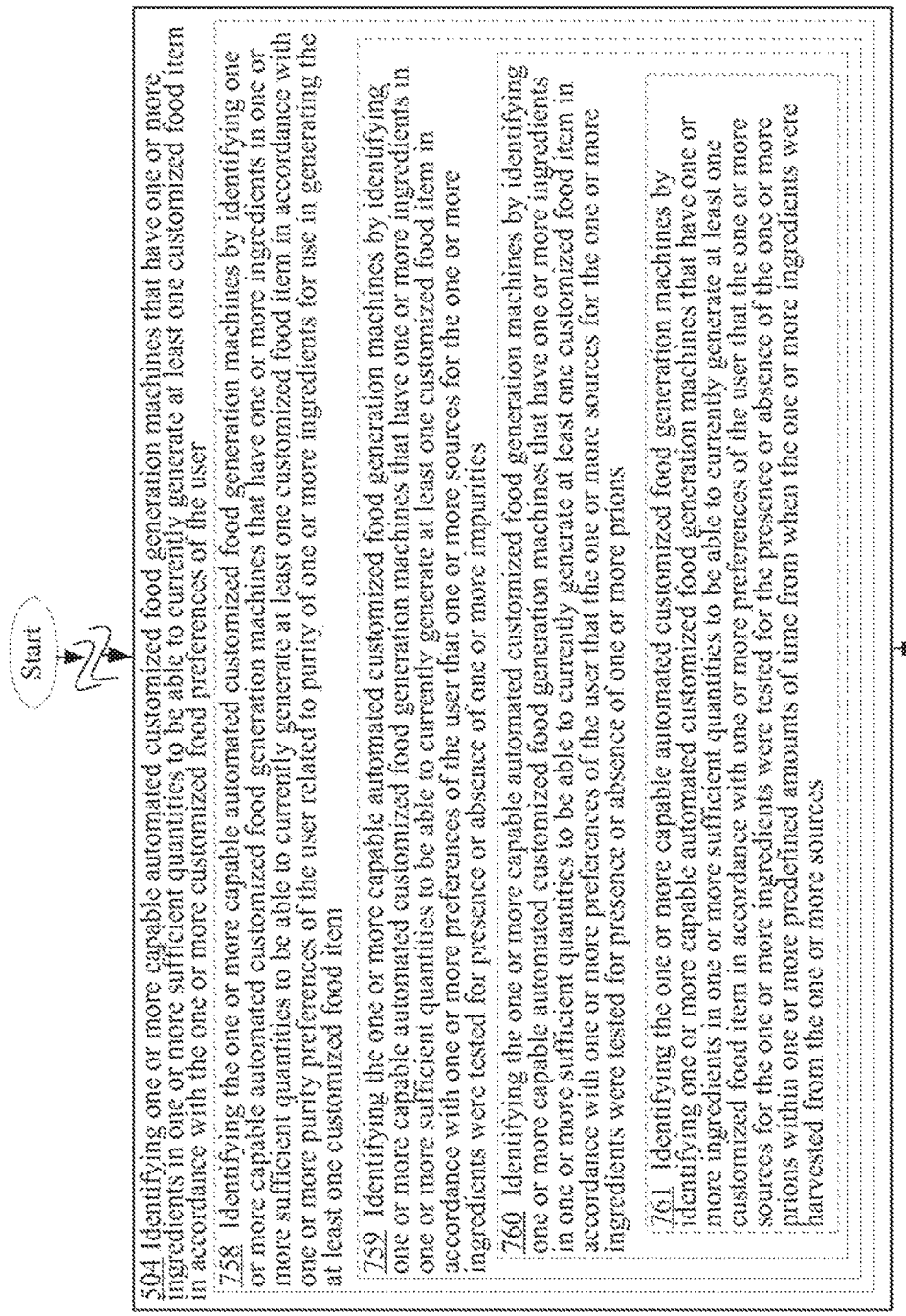
FIG. 7F is a high-level logic flowchart of a process depicting alternate implementations of the capable automated customized food generation machine identifying operation 504 of FIG. 5.

Turning now to FIG. 7F, in various implementations, the capable automated customized food generation machine identifying operation 504 may include an operation 758 for identifying the one or more capable automated customized food generation machines by identifying one or more capable automated customized food generation machines that have one or more ingredients in one or more sufficient quantities to be able to currently generate at least one customized food item in accordance with one or more purity preferences of the user related to purity of one or more ingredients for use in generating the at least one customized food item. For instance, the capable automated customized food generation machine ascertaining module 304\* of the automated customized food generation machine 10a or 10b of FIG. 3A or 3B (or of the network device 12a or 12b of FIG. 3D or 3E) identifying the one or more capable automated customized food generation machines by identifying or ascertaining one or more capable automated customized food generation machines (e.g., the automated customized food generation machine 10‴ or the automated customized food generation machine 10⁗ of FIG. 1B, 1C, 1D, or 1E) that have one or more ingredients in one or more sufficient quantities to be able to currently generate at least one customized food item 22 in accordance with one or more purity preferences of the user 13 related to purity of one or more ingredients (e.g., preferences that antibiotic free or hormone free meats be used) for use in generating the at least one customized food item 22.

As further illustrated in FIG. 7F, operation 758 may, in some cases, include an operation 759 for identifying the one or more capable automated customized food generation machines by identifying one or more capable automated customized food generation machines that have one or more ingredients in one or more sufficient quantities to be able to currently generate at least one customized food item in accordance with one or more preferences of the user that one or more sources for the one or more ingredients were tested for presence or absence of one or more impurities. For instance, the capable automated customized food generation machine ascertaining module 304\* of the automated customized food generation machine 10a or 10b of FIG. 3A or 3B (or of the network device 12a or 12b of FIG. 3D or 3E) identifying the one or more capable automated customized food generation machines by identifying or ascertaining one or more capable automated customized food generation machines (e.g., the automated customized food generation machine 10‴ or the automated customized food generation machine 10⁗ of FIG. 1B, 1C, 1D, or 1E) that have one or more ingredients in one or more sufficient quantities to be able to currently generate at least one customized food item 22 in accordance with one or more preferences of the user 13 that one or more sources (e.g., a farm, a crop batch, a domestic animal, and so forth) for the one or more ingredients (e.g., meats, vegetables, and so forth) were tested for presence or absence of one or more impurities (e.g., bacteria, viral agents, heavy metals, pesticides, and so forth).

In some implementations, operation 759 may, in turn, further include an operation 760 for identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested for presence or absence of one or more prions. For instance, the capable automated customized food generation machine ascertaining module 304\* of the automated customized food generation machine 10a or 10b of FIG. 3A or 3B (or of the network device 12a or 12b of FIG. 3D or 3E) identifying the one or more capable automated customized food generation machines by identifying or ascertaining one or more capable automated customized food generation machines (e.g., the automated customized food generation machine 10‴ or the automated customized food generation machine 10⁗ of FIG. 1B, 1C, 1D, or 1E) that have one or more ingredients in one or more sufficient quantities to be able to currently generate at least one customized food item 22 in accordance with one or more preferences of the user 13 that the one or more sources (e.g., a cow or a cattle herd)

for the one or more ingredients were tested for presence or absence of one or more prions.

As further illustrated in FIG. 7F, operation 760 may further include, in some implementations, an operation 761 for identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested for the presence or absence of the one or more prions within one or more predefined amounts of time from when the one or more ingredients were harvested from the one or more sources. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more preferences of the user 13 that the one or more sources for the one or more ingredients (e.g., ground beef) were tested for the presence or absence of the one or more prions within one or more predefined amounts of time (e.g., one month) from when the one or more ingredients were harvested from the one or more sources (e.g., a cow).

In various implementations, operation 759 for identifying the one or more capable automated customized food generation machines by identifying one or more capable automated customized food generation machines that have one or more ingredients in one or more sufficient quantities to be able to currently generate at least one customized food item in accordance with one or more preferences of the user that one or more sources for the one or more ingredients were tested for presence or absence of one or more impurities in FIG. 7F may further include an operation 762 for identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested for presence or absence of one or more selective bacteria as illustrated in FIG. 7G. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more preferences of the user 13 that the one or more sources (e.g., a crop harvest, a farm, and so forth) for the one or more ingredients were tested for presence or absence of one or more selective bacteria that are identified by the one or more preferences of the user 13.

As also further illustrated in FIG. 7G, operation 762 in various implementations may include one or more additional operations including, in some cases, an operation 763 for identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested to confirm that the one or more selective bacteria are present in the one or more sources at below one or more predefined levels. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more preferences of the user 13 that the one or more sources for the one or more ingredients were tested to confirm that the one or more selective bacteria are present in the one or more sources at below one or more predefined levels. That is, in some cases, the presence of certain low levels of certain bacteria types may be acceptable to users 13.

In the same or alternative implementations, operation 762 may include an operation 764 for identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested for the presence of the one or more selective bacteria within one or more predefined amounts of time from when the one or more ingredients were harvested from the one or more sources. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more preferences of the user 13 that the one or more sources for the one or more ingredients were tested for the presence of the one or more selective bacteria within one or more predefined amounts of time from when the one or more ingredients (e.g., vegetables or vegetable products, meats, and so forth) were harvested from the one or more sources (e.g., crop harvest, farms, a cow or a herd of domesticated animals, and so forth).

In the same or alternative implementations, operation 762 may include an operation 765 for identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested for presence or absence of the one or more selective bacteria, the one or more selective bacteria including at least one of *enterococcus, E. coli, campylobacter, klebsiella pneumoniae, salmonella*, or *staphylococcus aureus*. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more preferences of the user 13 that the one or more sources for the one or more ingredients were tested for presence or absence of the one or more selective bacteria, the one or more selective bacteria including at least one of *enterococcus, E. coli, campylobacter, klebsiella pneumoniae, salmonella*, or *staphylococcus aureus*.

Turning now to FIG. 7H, in various implementations, operation 759 may include an operation 766 for identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested for presence or absence of one or more antibiotics. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more preferences of the user 13 that the one or more sources (e.g., butchered meats, cattle herd, pork farm, and so forth) for the one or more ingredients (e.g., beef, chicken, pork, and so forth) were tested for presence or absence of one or more antibiotics.

In some implementations, operation 766 may further include an operation 767 for identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested to confirm that the one or more antibiotics are present in the one or more sources at below one or more predefined levels. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more preferences of the user 13 that the one or more sources for the one or more ingredients were tested to confirm that the one or more antibiotics are present in the one or more sources at below one or more predefined levels. That is, in some cases, it may be acceptable to at least some users 13 to use ingredients with certain low levels of selective antibiotics for generating customized food items 22.

In the same or alternative implementations, operation 759 may additionally or alternatively include an operation 768 for identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested for presence or absence of one or more pesticides. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more preferences of the user 13 that the one or more sources (e.g., crop harvest, processed batch, and so forth) for the one or more ingredients (e.g., vegetables, processed ingredients such as flour or sugar, homogenized dairy products, and so forth) were tested for presence or absence of one or more pesticides.

In some cases, operation 768 may further include an operation 769 for identifying the one or more capable automated customized food generation machines by identifying one or more capable automated customized food generation machines that have one or more ingredients in one or more sufficient quantities to be able to currently generate at least one customized food item in accordance with one or more preferences of the user that the one or more sources for the one or more ingredients were tested to confirm that the one or more sources were tested to be free of one or more specified pesticides. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more preferences of the user 13 that the one or more sources for the one or more ingredients were tested to confirm that the one or more sources were tested to be free of one or more specified pesticides (e.g., specified pesticides as specified by the one or more preferences of the user 13.

Referring now to FIG. 7I, in some implementations, operation 758 for identifying the one or more capable automated customized food generation machines by identifying one or more capable automated customized food generation machines that have one or more ingredients in one or more sufficient quantities to be able to currently generate at least one customized food item in accordance with one or more purity preferences of the user related to purity of one or more ingredients for use in generating the at least one customized food item may include an operation 770 for identifying the one or more capable automated customized food generation machines that have the one or more ingredients in the one or more sufficient quantities to be able to currently generate the at least one customized food item in accordance with the one or more purity preferences of the user by identifying one or more capable automated customized food generation machines that have one or more ingredients in one or more sufficient quantities to be able to currently generate at least one customized food item in accordance with one or more preferences of the user related to purity of one or more meat ingredients to be used for generating the at least one customized food item. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines that have the one or more ingredients in the one or more sufficient quantities to be able to currently generate the at least one customized food item 22 in accordance with the one or more purity preferences of the user 13 by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more preferences of the user 13 related to purity (e.g., free of excessive hormones or free of selective viral agents) of one or more meat ingredients (e.g., beef, pork, chicken, and so forth) to be used for generating the at least one customized food item 22.

In the same or alternative implementations, operation 758 may additionally or alternatively include an operation 771 for identifying the one or more capable automated customized food generation machines that have the one or more ingredients in the one or more sufficient quantities to be able to currently generate the at least one customized food item in accordance with the one or more purity preferences of the user by identifying one or more capable automated customized food generation machines that have one or more ingredients in one or more sufficient quantities to be able to currently generate at least one customized food item in accordance with one or more preferences of the user related to purity of one or more processed ingredients to be used for generating the at least one customized food item. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines that have the one or more ingredients in the one or more sufficient quantities to be able to currently generate the at least one customized food item 22 in accordance with the one or more purity preferences of the user 13 by identifying and ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more preferences of the user 13 related to purity of one or more processed ingredients (e.g., processed flour, processed sugar, dairy products, and so forth) to be used for generating the at least one customized food item 22.

In the same or alternative implementations, operation 758 may additionally or alternatively an operation 772 for identifying the one or more capable automated customized food generation machines that have the one or more ingredients in the one or more sufficient quantities to be able to currently generate the at least one customized food item in accordance with the one or more purity preferences of the user by identifying one or more capable automated customized food generation machines that have one or more ingredients in one or more sufficient quantities to be able to currently generate at least one customized food item in accordance with one or more preferences of the user related to purity of one or more vegetable ingredients to be used for generating the at least one customized food item. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines that have the one or more ingredients in the one or more sufficient quantities to be able to currently generate the at least one customized food item 22 in accordance with the one or more purity preferences of the user 13 by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more preferences of the user 13 related to purity of one or more vegetable ingredients (e.g., vegetables including fruits, certain vegetable based spices, carrots, lettuce, and so forth) to be used for generating the at least one customized food item 22.

Figure 7J:
FIG. 7J is a high-level logic flowchart of a process depicting alternate implementations of the capable automated customized food generation machine identifying operation 504 of FIG. 5.

Turning now to FIG. 7J, in various implementations, the capable automated customized food generation machine identifying operation 504 may include an operation 773 for identifying the one or more capable automated customized food generation machines that have the one or more ingredients in the one or more sufficient quantities to be able to currently generate the at least one customized food item in accordance with the one or more customized food preferences of the user by identifying one or more capable automated customized food generation machines that have one or more ingredients in one or more sufficient quantities to be able to currently generate at least one customized food item in accordance with one or more customized food preferences of the user that the one or more ingredients for use in generating the at least one customized food item were obtained from one or more specified sources. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines that have the one or more ingredients in the one or more sufficient quantities to be able to currently generate the at least one customized food item 22 in accordance with the one or more customized food preferences of the user 13 by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more customized food preferences of the user 13 that the one or more ingredients for use in generating the at least one customized food item 22 were obtained from one or more specified sources (e.g., Tyson's farm, Kirkland, Del Monte, Green Giant, and so forth).

In the same or alternative implementations, the capable automated customized food generation machine identifying operation 504 may additionally or alternatively include an operation 774 for identifying the one or more capable automated customized food generation machines that have the one or more ingredients in the one or more sufficient quantities to be able to currently generate the at least one customized food item in accordance with the one or more customized food preferences of the user by identifying one or more capable automated customized food generation machines that have one or more ingredients in one or more sufficient quantities to be able to currently generate at least one customized food item in accordance with one or more customized food preferences of the user that the one or more ingredients for use in generating the at least one customized food item were not obtained from one or more specified sources. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines that have the one or more ingredients in the one or more sufficient quantities to be able to currently generate the at least one customized food item 22 in accordance with the one or more customized food preferences of the user 13 by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more customized food preferences of the user 13 that the one or more ingredients for use in generating the at least one customized food item 22 were not obtained from one or more specified sources (e.g., Oscar Meyers, Tysons farms, Dole, and so forth).

In the same or alternative implementations, the capable automated customized food generation machine identifying operation 504 may additionally or alternatively include an operation 775 for identifying the one or more capable automated customized food generation machines that have the one or more ingredients in the one or more sufficient quantities to be able to currently generate the at least one customized food item in accordance with the one or more customized food preferences of the user by identifying one or more capable automated customized food generation machines that have one or more ingredients in one or more sufficient quantities to be able to currently generate at least one customized food item in accordance with one or more customized food preferences of the user that the one or more ingredients for use in generating the at least one customized food item were obtained from one or more specified locations. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines that have the one or more ingredients in the one or more sufficient quantities to be able to currently generate the at least one customized food item 22 in accordance with the one or more customized food preferences of the user 13 by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more customized food preferences of the user 13 that the one or more ingredients (e.g., beef) for use in generating the at least one customized food item 22 were obtained from one or more specified locations (e.g., Kobe, Japan).

In the same or alternative implementations, the capable automated customized food generation machine identifying operation 504 may additionally or alternatively include an operation 776 for identifying the one or more capable automated customized food generation machines that have the one or more ingredients in the one or more sufficient quantities to be able to currently generate the at least one customized food item in accordance with the one or more customized food preferences of the user by identifying one or more capable automated customized food generation machines that have one or more ingredients in one or more sufficient quantities to be able to currently generate at least one customized food item in accordance with one or more customized food preferences of the user that the one or more ingredients for use in generating the at least one customized food item were not obtained from one or more specified locations. For instance, the capable automated customized food generation machine ascertaining module 304* of the automated customized food generation machine 10a or 10b of FIG. 3A or 3B (or of the network device 12a or 12b of FIG. 3D or 3E) identifying the one or more capable automated customized food generation machines that have the one or more ingredients in the one or more sufficient quantities to be able to currently generate the at least one customized food item 22 in accordance with the one or more customized food preferences of the user 13 by identifying or ascertaining one or more capable automated customized food generation machines (e.g., the automated customized food generation machine 10''' or the automated customized food generation machine 10'''' of FIG. 1B, 1C, 1D, or 1E) that have one or more ingredients in one or more sufficient quantities to be able to currently generate at least one customized food item 22 in accordance with one or more customized food preferences of the user 13 that the one or more ingredients (e.g., beef) for use in generating the at least one customized food item 22 were not obtained from one or more specified locations (e.g., Britain which is where an outbreak of mad-cow disease occurred).

Figure 7K:
FIG. 7K is a high-level logic flowchart of a process depicting alternate implementations of the capable automated customized food generation machine identifying operation 504 of FIG. 5.

In the same or alternative implementations, the capable automated customized food generation machine identifying operation 504 may additionally or alternatively include an operation 777 for identifying the one or more capable automated customized food generation machines including identifying one or more substitute automated customized food generation machines that do not have the one or more ingredients in the one or more sufficient quantities to be able to currently generate the at least one customized food item in accordance with the one or more customized food preferences of the user but which are able to currently generate at least one substitute customized food item that is a substitute for the at least one customized food item as illustrated in FIG. 7K. For instance, the capable automated customized food generation machine ascertaining module 304* including the substitute automated customized food generation machine ascertaining module 430 (see FIG. 4B) of the automated customized food generation machine 10a or 10b of FIG. 3A or 3B (or of the network device 12a or 12b of FIG. 3D or 3E) identifying the one or more capable automated customized food generation machines including identifying or ascertaining, by for example, the substitute automated customized food generation machine ascertaining module 430, one or more substitute automated customized food generation machines (e.g., the automated customized food generation machine 10" of FIG. 1B, 1C, 1D, or 1E) that do not have the one or more ingredients in the one or more sufficient quantities to be able to currently generate the at least one customized food item 22 in accordance with the one or more customized food preferences of the user 13 but which are able to currently generate at least one substitute customized food item that is a substitute for the at least one customized food item 22. That is, in some situations a user 13 may prefer to use a substitute automated customized food generation machine 10" rather than a capable automated customized food generation machine 10'" or 10"" because the substitute automated customized food generation machine 10" is closer to the location of the user 13, because the substitute customized food item or items generated by the substitute automated customized food generation machine 10" is acceptable to the user 13 and is cheaper than purchasing a fully compliant customized food item 22 from a capable automated customized food generation machine 10'" or 10"", and/or for other reasons.

As further illustrated in FIG. 7K, in some implementations, operation 777 may include an operation 778 for identifying the one or more substitute automated customized food generation machines by identifying one or more substitute automated customized food generation machines that have one or more ingredients in one or more sufficient quantities to be able to currently generate a substitute customized food item that is substantially in compliance with the one or more customized food preferences of the user. For instance, the substitute automated customized food generation machine ascertaining module 430 of the automated customized food generation machine 10a or 10b of FIG. 3A or 3B (or of the network device 12a or 12b of FIG. 3D or 3E) identifying the one or more substitute automated customized food generation machines by identifying or ascertaining one or more substitute automated customized food generation machines (e.g., the automated customized food generation machine 10" of FIG. 1B, 1C, 1D, or 1E) that have one or more ingredients in one or more sufficient quantities to be able to currently generate a substitute customized food item 22 that is substantially in compliance with (e.g., more than 50 percent compliant with) the one or more customized food preferences of the user 13.

In the same or alternative implementations, the capable automated customized food generation machine identifying operation 504 may additionally or alternatively include an operation 779 for identifying the one or more capable automated customized food generation machines in response to detecting that an automated customized food generation machine that the user is interfacing with is unable to generate at least one customized food item in compliance with the one or more customized food preferences of the user. For instance, the capable automated customized food generation machine ascertaining module 304* including the unsatisfactory interfaced machine detecting module 432 (see FIG. 4B) of the automated customized food generation machine 10a or 10b of FIG. 3A or 3B (or of the network device 12a or 12b of FIG. 3D or 3E) identifying the one or more capable automated customized food generation machines (e.g., the automated customized food generation machine 10'" or the automated customized food generation machine 10"" of FIG. 1B, 1C, 1D, or 1E) in response to, for example, the unsatisfactory interfaced machine detecting module 432 detecting that an automated customized food generation machine (e.g., the automated customized food generation machine 10' of FIG. 1C, 1D, or 1E) that the user 13 is interfacing with is unable to generate at least one customized food item 22 in compliance with the one or more customized food preferences of the user 13 related to the customized food item 22.

In the same or alternative implementations, the capable automated customized food generation machine identifying operation 504 may additionally or alternatively include an operation 780 for identifying the one or more capable automated customized food generation machines in response to detecting that an automated customized food generation machine that is in proximate vicinity of the user is unable to generate at least one customized food item in compliance with the one or more customized food preferences of the user. For instance, the capable automated customized food generation machine ascertaining module 304* including the unsatisfactory proximity machine detecting module 434 (see FIG. 4B) of the automated customized food generation machine 10a or 10b of FIG. 3A or 3B (or of the network device 12a or 12b of FIG. 3D or 3E) identifying the one or more capable automated customized food generation machines (e.g., the automated customized food generation machine 10'" or the automated customized food generation machine 10"" of FIG. 1B, 1C, 1D, or 1E) in response to detecting, by for example the unsatisfactory proximity machine detecting module 434 that an automated customized food generation machine (e.g., the automated customized food generation machine 10' of FIG. 1C, 1D, or 1E) that is in proximate vicinity (e.g., within 30 feet) of the user 13 is unable to generate at least one customized food item 22 in compliance with the one or more customized food preferences of the user 13 related to the at least one customized food item 22.

Figure 8A:
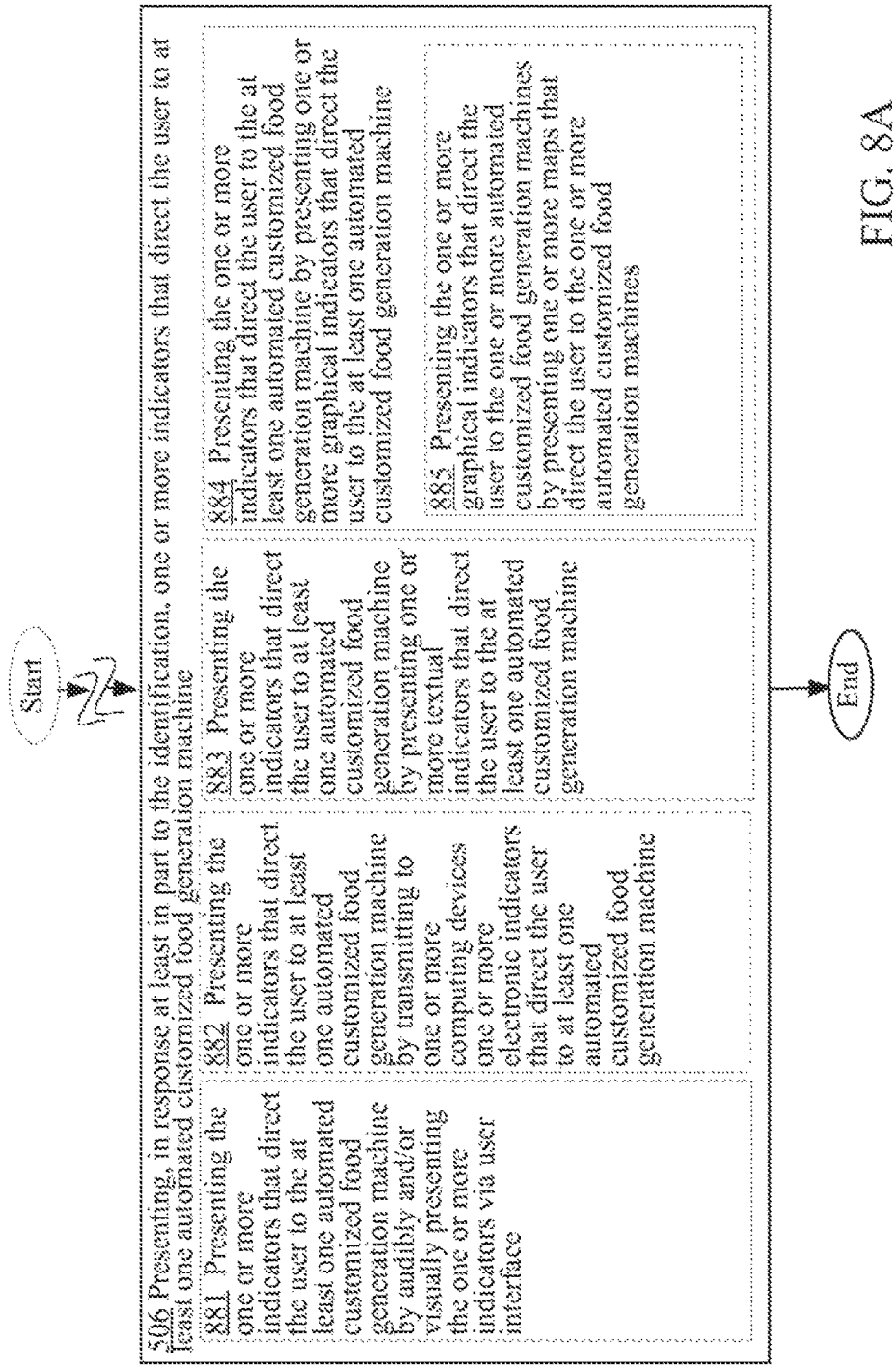
FIG. 8A is a high-level logic flowchart of a process depicting alternate implementations of the indicator presenting operation 506 of FIG. 5.

Referring back to the indicator presenting operation 506 of FIG. 5, the indicator presenting operation 506 similar to the user preference information acquiring operation 502 and the capable automated customized food generation machine identifying operation 504 of FIG. 5 may be executed in a number of different ways in various alternative embodiments as illustrated, for example, in FIGS. 8A, 8B, 8C, 8D, and 8E. In some cases, for example, the indicator presenting operation 506 may actually include or involve an operation 881 for presenting the one or more indicators that direct the user to the at least one automated customized food generation machine by audibly and/or visually presenting the one or more indicators via user interface as illustrated in FIG. 8A. For instance, the indicator presenting module 306* of the automated customized food generation machine 10a or 10b of FIG. 3A or 3B (or of the network device 12a or 12b of FIG. 3D or 3E) presenting the one or more indicators 220* that direct or instruct the user 13 to the at least one automated customized food generation machine 10* by audibly and/or visually presenting the one or more indicators 220* (e.g., textual indicators, graphical indicators, and/or audio indicators) via user interface 360 (e.g., touchscreen and/or microphones).

In some implementations, the indicator presenting operation 506 may include an operation 882 for presenting the one or more indicators that direct the user to at least one automated customized food generation machine by transmitting to one or more computing devices one or more electronic indicators that direct the user to at least one automated customized food generation machine. For instance, the indicator presenting module 306* including the electronic indicator communicating module 436 (see FIG. 4C) of the automated customized food generation machine 10a or 10b of FIG. 3A or 3B (or of the network device 12a or 12b of FIG. 3D or 3E) presenting the one or more indicators 220* that direct the user 13 to at least one automated customized food generation machine 10* when the electronic indicator communicating module 436 transmits or communicates to one or more computing devices 15 (which may be a mobile device that is affiliated with the user 13) one or more electronic indicators (e.g., electronic versions of the indicators 220* of FIG. 2 that direct the user 13 to at least one automated customized food generation machine 10* (e.g., one or more capable automated customized food generation machines and/or one or more substitute automated customized food generation machines).

In some implementations, the indicator presenting operation 506 may include an operation 883 for presenting the one or more indicators that direct the user to at least one automated customized food generation machine by presenting one or more textual indicators that direct the user to the at least one automated customized food generation machine. For instance, the indicator presenting module 306* including the textual indicator presenting module 438 (see FIG. 4C) of the automated customized food generation machine 10a or 10b of FIG. 3A or 3B (or of the network device 12a or 12b of FIG. 3D or 3E) presenting the one or more indicators 220* that direct the user 13 to at least one automated customized food generation machine 10* when the textual indicator presenting module 438 presents one or more textual (e.g., alphanumeric) indicators 220* that direct the user 13 to the at least one automated customized food generation machine 10*.

In some implementations, the indicator presenting operation 506 may include an operation 884 for presenting the one or more indicators that direct the user to the at least one automated customized food generation machine by presenting one or more graphical indicators that direct the user to the at least one automated customized food generation machine. For instance, the indicator presenting module 306* including the graphical indicator presenting module 440 (see FIG. 4C) of the automated customized food generation machine 10a or 10b of FIG. 3A or 3B (or of the network device 12a or 12b of FIG. 3D or 3E) presenting the one or more indicators 220* that direct the user 13 to the at least one automated customized food generation machine 10* when the graphical indicator presenting module 440 presents one or more graphical indicators (see, for example, indicator 220c of FIG. 2C, which includes textual component as well as a graphical component in the form of a map) that direct the user 13 to the at least one automated customized food generation machine 10*.

In some cases, operation 884 may further include an operation 885 for presenting the one or more graphical indicators that direct the user to the one or more automated customized food generation machines by presenting one or more maps that direct the user to the one or more automated customized food generation machines. For instance, the graphical indicator presenting module 440 of the automated customized food generation machine 10a or 10b of FIG. 3A or 3B (or of the network device 12a or 12b of FIG. 3D or 3E) presenting the one or more graphical indicators (see, for example, indicator 220c of FIG. 2C) that direct the user 13 to the one or more automated customized food generation machines 10* by presenting one or more maps (see, for example, FIG. 2C) that direct the user 13 to the one or more automated customized food generation machines 10*.

Figure 8B:
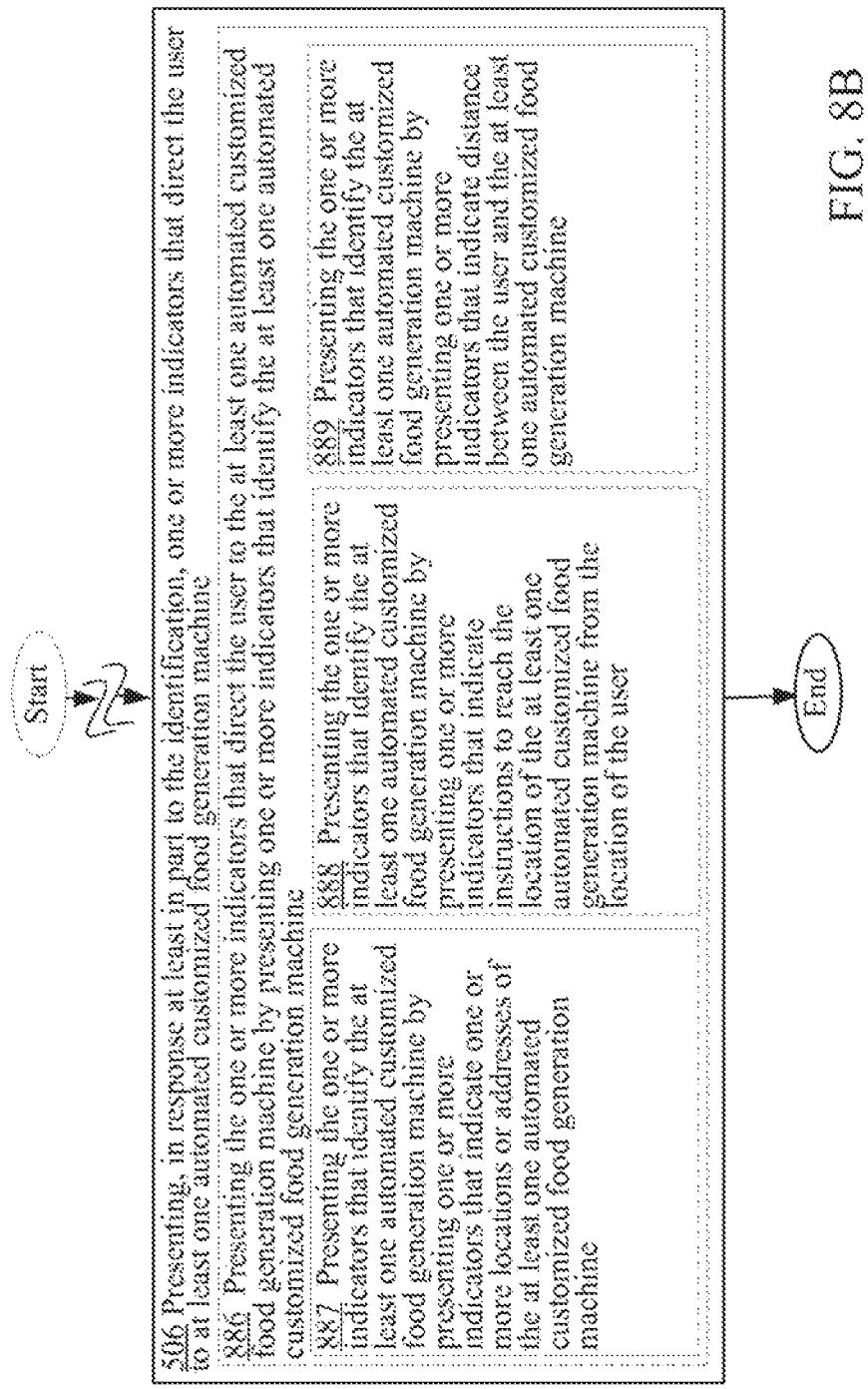
FIG. 8B is a high-level logic flowchart of a process depicting alternate implementations of the indicator presenting operation 506 of FIG. 5.

In various implementations, the indicator presenting operation 506 may include an operation 886 for presenting the one or more indicators that direct the user to the at least one automated customized food generation machine by presenting one or more indicators that identify the at least one automated customized food generation machine as illustrated in FIG. 8B. For instance, the indicator presenting module 306* of the automated customized food generation machine 10a or 10b of FIG. 3A or 3B (or of the network device 12a or 12b of FIG. 3D or 3E) presenting the one or more indicators 220* that direct the user 13 to the at least one automated customized food generation machine 10* by presenting one or more indicators (e.g., indicator 220a of FIG. 2A, which identifies different machines by a variety of ways including by address, by name of location—"Lakeview mall—food court," by machine number) that identify the at least one automated customized food generation machine 10*.

As further illustrated in FIG. 8B, operation 886 may include one or more additional operations in various alternative implementations including, in some implementations, an operation 887 for presenting the one or more indicators that identify the at least one automated customized food generation machine by presenting one or more indicators that indicate one or more locations or addresses of the at least one automated customized food generation machine. For instance, the indicator presenting module 306* of the automated customized food generation machine 10a or 10b of FIG. 3A or 3B (or of the network device 12a or 12b of FIG. 3D or 3E) presenting the one or more indicators that identify 220* the at least one automated customized food generation machine 10* by presenting one or more indicators 220a (e.g. FIG. 2A) that indicate one or more locations or addresses of the at least one automated customized food generation machine 10*.

In the same or alternative implementations, operation 886 may additionally or alternatively include an operation 888 for presenting the one or more indicators that identify the at least one automated customized food generation machine by presenting one or more indicators that indicate instructions to reach the location of the at least one automated customized food generation machine from the location of the user. For instance, the indicator presenting module 306* of the automated customized food generation machine 10*a* or 10*b* of FIG. 3A or 3B (or of the network device 12*a* or 12*b* of FIG. 3D or 3E) presenting the one or more indicators 220* that identify the at least one automated customized food generation machine 10* by presenting one or more indicators 200*b* (see FIG. 2B) that indicate instructions to reach the location of the at least one automated customized food generation machine 10* from the location of the user 13.

In the same or alternative implementations, operation 886 may additionally or alternatively may include an operation 889 for presenting the one or more indicators that identify the at least one automated customized food generation machine by presenting one or more indicators that indicate distance between the user and the at least one automated customized food generation machine. For instance, the indicator presenting module 306* of the automated customized food generation machine 10*a* or 10*b* of FIG. 3A or 3B (or of the network device 12*a* or 12*b* of FIG. 3D or 3E) presenting the one or more indicators 220* that identify the at least one automated customized food generation machine 10* by presenting one or more indicators 220*b* or 220*c* (see FIG. 2B or 2C) that indicate distance between the user 13 and the at least one automated customized food generation machine 10*.

Figure 8C:
FIG. 8C is a high-level logic flowchart of a process depicting alternate implementations of the indicator presenting operation 506 of FIG. 5.

Turning to FIG. 8C, in various implementations, the indicator presenting operation 506 may include an operation 890 for presenting the one or more indicators that direct the user to the at least one automated customized food generation machine by presenting one or more indicators that direct the user to at least one automated customized food generation machine that was identified as having the one or more ingredients in the one or more sufficient quantities to be able to currently generate the at least one customized food item in accordance with the one or more customized food preferences of the user. For instance, the indicator presenting module 306* of the automated customized food generation machine 10*a* or 10*b* of FIG. 3A or 3B (or of the network device 12*a* or 12*b* of FIG. 3D or 3E) presenting the one or more indicators 220* that direct the user 13 to the at least one automated customized food generation machine 10* by presenting one or more indicators (e.g., indicator 220*a*, 200*b*, 200*c*, or 200*e* FIG. 2A, 2B, 2C, or 2E) that direct the user 13 to at least one automated customized food generation machine (e.g., the automated customized food generation machine 10''' or the automated customized food generation machine 10'''' of FIG. 1B, 1C, 1D, or 1E) that was identified as having the one or more ingredients in the one or more sufficient quantities to be able to currently generate the at least one customized food item 22 in accordance with the one or more customized food preferences of the user 13.

As further illustrated in FIG. 8C, operating 890 may further include one or more additional operations in various implementations including, in some cases, an operation 891 for presenting the one or more indicators that direct the user to the at least one automated customized food generation machine that was identified as having the one or more ingredients in the one or more sufficient quantities to be able to currently generate the at least one customized food item in accordance with the one or more customized food preferences of the user by presenting one or more indicators that direct the user to at least one automated customized food generation machine that was identified as having the one or more ingredients in the one or more sufficient quantities to be able to currently generate the at least one customized food item in accordance with the one or more customized food preferences of the user and that is identified as being located within a short traveling distance from location of the user. For instance, the indicator presenting module 306* of the automated customized food generation machine 10*a* or 10*b* of FIG. 3A or 3B (or of the network device 12*a* or 12*b* of FIG. 3D or 3E) presenting the one or more indicators 220* that direct the user 13 to the at least one automated customized food generation machine 10* that was identified as having the one or more ingredients in the one or more sufficient quantities to be able to currently generate the at least one customized food item 22 in accordance with the one or more customized food preferences of the user 13 by presenting one or more indicators (e.g., indicator 220*a*, 200*b*, 200*c*, or 200*e* of FIG. 2A, 2B, 2C, or 2E) that direct the user 13 to at least one automated customized food generation machine (e.g., the automated customized food generation machine 10''' or the automated customized food generation machine 10'''' of FIG. 1B, 1C, 1D, or 1E) that was identified as having the one or more ingredients in the one or more sufficient quantities to be able to currently generate the at least one customized food item 22 in accordance with the one or more customized food preferences of the user 13 and that is identified as being located within a short traveling distance (e.g., within short 30 minutes walking, mass transit, and/or driving distance) from location of the user 13.

In some implementations, operation 890 may include an operation 892 for presenting the one or more indicators that direct the user to the at least one automated customized food generation machine that was identified as having the one or more ingredients in the one or more sufficient quantities to be able to currently generate the at least one customized food item in accordance with the one or more customized food preferences of the user by presenting one or more indicators that direct the user to at least one automated customized food generation machine that was identified as having the one or more ingredients in the one or more sufficient quantities to be able to currently generate the at least one customized food item in accordance with the one or more customized food preferences of the user and that is identified as being located along or proximate to one or more historical travel routes of the user. For instance, the indicator presenting module 306* of the automated customized food generation machine 10*a* or 10*b* of FIG. 3A or 3B (or of the network device 12*a* or 12*b* of FIG. 3D or 3E) presenting the one or more indicators 220* that direct the user 13 to the at least one automated customized food generation machine 10* that was identified as having the one or more ingredients in the one or more sufficient quantities to be able to currently generate the at least one customized food item 22 in accordance with the one or more customized food preferences of the user 13 by presenting one or more indicators (e.g., indicator 220*a*, 200*b*, 200*c*, or 200*e* of FIG. 2A, 2B, 2C, or 2E) that direct the user 13 to at least one automated customized food generation machine (e.g., the automated customized food generation machine 10''' or the automated customized food generation machine 10'''' of FIG. 1B, 1C, 1D, or 1E) that was identified as having the one or more ingredients in the one or more sufficient quantities to be able to currently generate the at least one customized food item 22 in accordance with the one or more customized food preferences of the user 13 and that is identified as being located along or proximate to (e.g., within ¼ mile of) one or more historical travel routes of the user 13. That is, a user 13 may prefer to use automated customized food generation machines 10* that are along or near the user's 13 past travel paths rather than using an automated customized food generation machines 10* that is nowhere near the user's 13 past travel paths.

In some implementations, operation 890 may include an operation 893 for presenting one or more indicators that direct the user to a plurality of automated customized food generation machines that were each identified as having the one or more ingredients in the one or more sufficient quantities to be able to currently generate the at least one customized food item in accordance with the one or more customized food preferences of the user, the one or more indicators indicating travel distance to each location of the plurality of automated customized food generation machines from location of the user, nearness of each of the plurality of automated customized food generation machines to one or more historical travel routes of the user, and/or one or more price discounts available through each of the plurality of automated customized food generation machines. For instance, the indicator presenting module 306* of the automated customized food generation machine 10a or 10b of FIG. 3A or 3B (or of the network device 12a or 12b of FIG. 3D or 3E) presenting one or more indicators 220* that direct the user 13 to a plurality of automated customized food generation machines (e.g., the automated customized food generation machine 10''' and the automated customized food generation machine 10'''' of FIG. 1B, 1C, 1D, or 1E) that were each identified as having the one or more ingredients in the one or more sufficient quantities to be able to currently generate the at least one customized food item 22 in accordance with the one or more customized food preferences of the user 13, the one or more indicators (e.g., indicator 220a or 220c of FIG. 2A or 2C) indicating travel distance to each location of the plurality of automated customized food generation machines (e.g., the automated customized food generation machine 10''' and the automated customized food generation machine 10'''') from location of the user 13, nearness of each of the plurality of automated customized food generation machines (e.g., the automated customized food generation machine 10''') to one or more historical travel routes of the user 13, and/or one or more price discounts available through each of the plurality of automated customized food generation machines (e.g., the automated customized food generation machine 10''' and the automated customized food generation machine 10'''').

Figure 8D:
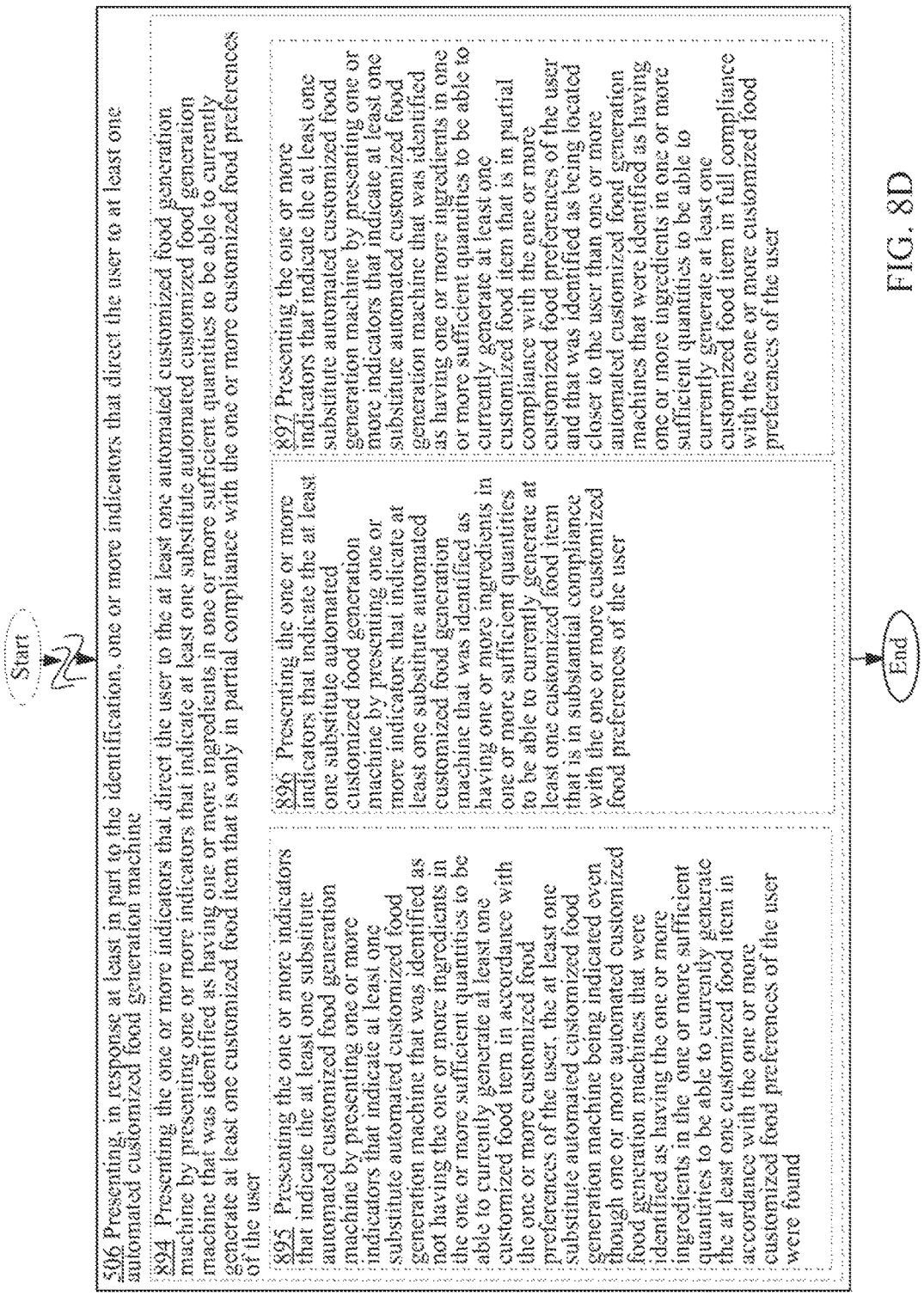
FIG. 8D is a high-level logic flowchart of a process depicting alternate implementations of the indicator presenting operation 506 of FIG. 5.

Referring to FIG. 8D, in various implementations, the indicator presenting operation 506 may include an operation 894 for presenting the one or more indicators that direct the user to the at least one automated customized food generation machine by presenting one or more indicators that indicate at least one substitute automated customized food generation machine that was identified as having one or more ingredients in one or more sufficient quantities to be able to currently generate at least one customized food item that is only in partial compliance with the one or more customized food preferences of the user. For instance, the indicator presenting module 306* of the automated customized food generation machine 10a or 10b of FIG. 3A or 3B (or of the network device 12a or 12b of FIG. 3D or 3E) presenting the one or more indicators 220* that direct the user 13 to the at least one automated customized food generation machine 10* by presenting one or more indicators (e.g., indicator 220d or 200e of FIG. 2D or 2E) that indicate at least one substitute automated customized food generation machine (e.g., the automated customized food generation machine 10'' of FIGS. 2B, 2C, 2D, and 2E) that was identified as having one or more ingredients in one or more sufficient quantities to be able to currently generate at least one customized food item 22 that is only in partial compliance with the one or more customized food preferences of the user 13.

Figure 8E:
FIG. 8E is a high-level logic flowchart of a process depicting alternate implementations of the indicator presenting operation 506 of FIG. 5.

As further illustrated in FIGS. 8D and 8E, operation 894 may further include one or more additional operations including, in some implementations, an operation 895 for presenting the one or more indicators that indicate the at least one substitute automated customized food generation machine by presenting one or more indicators that indicate at least one substitute automated customized food generation machine that was identified as not having the one or more ingredients in the one or more sufficient quantities to be able to currently generate at least one customized food item in accordance with the one or more customized food preferences of the user, the at least one substitute automated customized food generation machine being indicated even though one or more automated customized food generation machines that were identified as having the one or more ingredients in the one or more sufficient quantities to be able to currently generate the at least one customized food item in accordance with the one or more customized food preferences of the user were found. For instance, the indicator presenting module 306* of the automated customized food generation machine 10a or 10b of FIG. 3A or 3B (or of the network device 12a or 12b of FIG. 3D or 3E) presenting the one or more indicators (e.g., indicator 220d or 200e of FIG. 2D or 2E) that indicate the at least one substitute automated customized food generation machine (e.g., the automated customized food generation machine 10'' of FIGS. 2B, 2C, 2D, and 2E) by presenting one or more indicators (e.g., indicator 220e of FIG. 2E) that indicate at least one substitute automated customized food generation machine (e.g., the automated customized food generation machine 10'' of FIGS. 2B, 2C, 2D, and 2E) that was identified as not having the one or more ingredients in the one or more sufficient quantities to be able to currently generate at least one customized food item 22 in accordance with the one or more customized food preferences of the user 13, the at least one substitute automated customized food generation machine (e.g., the automated customized food generation machine 10'') being indicated or identified (see FIG. 2E) even though one or more automated customized food generation machines (e.g., the automated customized food generation machine 10''' and the automated customized food generation machine 10'''' of FIG. 1B, 1C, 1D, or 1E) that were identified as having the one or more ingredients in the one or more sufficient quantities to be able to currently generate the at least one customized food item 22 in accordance with the one or more customized food preferences of the user 13 were found or detected.

In the same or alternative implementations, operation 894 may additionally or alternatively include an operation 896 for presenting the one or more indicators that indicate the at least one substitute automated customized food generation machine by presenting one or more indicators that indicate at least one substitute automated customized food generation machine that was identified as having one or more ingredients in one or more sufficient quantities to be able to currently generate at least one customized food item that is in substantial compliance with the one or more customized food preferences of the user. For instance, the indicator presenting module 306* of the automated customized food generation machine 10a or 10b of FIG. 3A or 3B (or of the network device 12a or 12b of FIG. 3D or 3E) presenting the one or more indicators (e.g., indicator 220d or 200e of FIG. 2D or 2E) that indicate the at least one substitute automated customized food generation machine (e.g., the automated customized food generation machine 10'' of FIGS. 2B, 2C, 2D, and 2E) by presenting one or more indicators (e.g., indicator 220d or 200e of FIG. 2D or 2E) that indicate at least one substitute automated customized food generation machine (e.g., the automated customized food generation machine 10" of FIGS. 2B, 2C, 2D, and 2E) that was identified as having one or more ingredients in one or more sufficient quantities to be able to currently generate at least one customized food item 22 that is in substantial compliance with the one or more customized food preferences of the user 13.

In the same or alternative implementations, operation 894 may additionally or alternatively include an operation 897 for presenting the one or more indicators that indicate the at least one substitute automated customized food generation machine by presenting one or more indicators that indicate at least one substitute automated customized food generation machine that was identified as having one or more ingredients in one or more sufficient quantities to be able to currently generate at least one customized food item that is in partial compliance with the one or more customized food preferences of the user and that was identified as being located closer to the user than one or more automated customized food generation machines that were identified as having one or more ingredients in one or more sufficient quantities to be able to currently generate at least one customized food item in full compliance with the one or more customized food preferences of the user. For instance, the indicator presenting module 306* of the automated customized food generation machine 10a or 10b of FIG. 3A or 3B (or of the network device 12a or 12b of FIG. 3D or 3E) presenting the one or more indicators (e.g., indicator 220d or 200e of FIG. 2D or 2E) that indicate the at least one substitute automated customized food generation machine (e.g., the automated customized food generation machine 10" of FIGS. 2B, 2C, 2D, and 2E) by presenting one or more indicators (e.g., indicator 220d or 200e) that indicate at least one substitute automated customized food generation machine (e.g., the automated customized food generation machine 10") that was identified as having one or more ingredients in one or more sufficient quantities to be able to currently generate at least one customized food item 22 that is in partial compliance with the one or more customized food preferences of the user 13 and that was identified as being located closer to the user 13 than one or more automated customized food generation machines (e.g., capable customized food generation machines such as the automated customized food generation machine 10''' and the automated customized food generation machine 10'''' of FIG. 1B, 1C, 1D, or 1E) that were identified as having one or more ingredients in one or more sufficient quantities to be able to currently generate at least one customized food item 22 in full compliance with the one or more customized food preferences of the user 13 related to the at least one customized food item 22. For example, in FIG. 2E, the substitute automated customized food generation machine that is indicated is located closer to the user 13 than the indicated "fully" capable automated customized food generation machines.

In the same or alternative implementations, operation 894 may additionally or alternatively include an operation 898 for presenting the one or more indicators that indicate the at least one substitute automated customized food generation machine by presenting one or more indicators that indicate at least one substitute automated customized food generation machine that was identified as having one or more ingredients in one or more sufficient quantities to be able to currently generate at least one customized food item that is in partial compliance with the one or more customized food preferences of the user and that was identified as being located closer to one or more historical travel routes of the user than one or more automated customized food generation machines that were identified as having one or more ingredients in one or more sufficient quantities to be able to currently generate at least one customized food item in full compliance with the one or more customized food preferences of the user as illustrated in FIG. 8E. For instance, the indicator presenting module 306* of the automated customized food generation machine 10a or 10b of FIG. 3A or 3B (or of the network device 12a or 12b of FIG. 3D or 3E) presenting the one or more indicators (e.g., indicator 220d or 200e of FIG. 2D or 2E) that indicate the at least one substitute automated customized food generation machine (e.g., the automated customized food generation machine 10" of FIGS. 2B, 2C, 2D, and 2E) by presenting one or more indicators (e.g., indicator 220d or 200e) that indicate at least one substitute automated customized food generation machine (e.g., the automated customized food generation machine 10") that was identified as having one or more ingredients in one or more sufficient quantities to be able to currently generate at least one customized food item 22 that is in partial compliance with the one or more customized food preferences of the user 13 and that was identified as being located closer to one or more historical travel routes of the user 13 than one or more automated customized food generation machines (e.g., the automated customized food generation machine 10''' and the automated customized food generation machine 10'''' of FIG. 1B, 1C, 1D, or 1E) that were identified as having one or more ingredients in one or more sufficient quantities to be able to currently generate at least one customized food item 22 in full compliance with the one or more customized food preferences of the user 13 related to the at least one customized food item 22.

In the same or alternative implementations, operation 894 may additionally or alternatively include an operation 899 for presenting the one or more indicators that indicate the at least one substitute automated customized food generation machine by presenting one or more indicators that indicate at least one substitute automated customized food generation machine that was identified as having one or more ingredients in one or more sufficient quantities to be able to currently generate at least one customized food item that is in partial compliance with the one or more customized food preferences of the user and that was identified as having lower retail prices than retail prices of one or more automated customized food generation machines that were identified as having one or more ingredients in one or more sufficient quantities to be able to currently generate at least one customized food item in full compliance with the one or more customized food preferences of the user. For instance, the indicator presenting module 306* of the automated customized food generation machine 10a or 10b of FIG. 3A or 3B (or of the network device 12a or 12b of FIG. 3D or 3E) presenting the one or more indicators (e.g., indicator 220d or 200e of FIG. 2D or 2E) that indicate the at least one substitute automated customized food generation machine (e.g., the automated customized food generation machine 10" of FIGS. 2B, 2C, 2D, and 2E) by presenting one or more indicators (e.g., indicator 220e of FIG. 2E) that indicate at least one substitute automated customized food generation machine (e.g., the automated customized food generation machine 10") that was identified as having one or more ingredients in one or more sufficient quantities to be able to currently generate at least one customized food item 22 that is only in partial compliance with the one or more customized food preferences of the user 13 and that was identified as having lower retail prices than retail prices (see, for example, FIG. 2E) of one or more automated customized food generation machines (the automated customized food generation machine 10''' and the automated customized food generation machine 10'''' of FIG. 1B, 1C, 1D, or 1E)) that were identified as having one or more ingredients in one or more sufficient quantities to be able to currently generate at least one customized food item 22 in full compliance with the one or more customized food preferences of the user 13 related to the at least one customized food item 22.

In the same or alternative implementations, operation 894 may additionally or alternatively include an operation 8100 for presenting the one or more indicators that indicate the at least one substitute automated customized food generation machine by presenting one or more indicators that indicate the at least one substitute automated customized food generation machine and that indicate one or more capable automated customized food generation machines that were identified as having one or more ingredients in one or more sufficient quantities to be able to currently generate at least one customized food item in full compliance with the one or more customized food preferences of the user. For instance, the indicator presenting module 306* of the automated customized food generation machine 10a or 10b of FIG. 3A or 3B (or of the network device 12a or 12b of FIG. 3D or 3E) presenting the one or more indicators (e.g., indicator 220d or 200e of FIG. 2D or 2E) that indicate the at least one substitute automated customized food generation machine (e.g., the automated customized food generation machine 10" of FIGS. 2B, 2C, 2D, and 2E) by presenting one or more indicators (e.g., indicator 220e of FIG. 2E) that indicate the at least one substitute automated customized food generation machine (e.g., the automated customized food generation machine 10") and that indicate (see indicator 220e of FIG. 2E) one or more capable automated customized food generation machines that were identified as having one or more ingredients in one or more sufficient quantities to be able to currently generate at least one customized food item 22 in full compliance with the one or more customized food preferences of the user 13 related to the at least one customized food item 22.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

In some instances, one or more components may have been referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein, "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited, to physically mateable and/or physically interacting components, and/or wirelessly interactable, and/or wirelessly interacting components, and/or logically interacting, and/or logically interactable components.

Although one or more users may be shown and/or described herein as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system, comprising:
   at least one automated customized food generation machine including at least one robotic food manufacturing component;
   at least one processing device; and
   one or more instructions which, when executed by the at least one processing device, configure the at least one processing device to perform one or more operations including at least:
   acquiring one or more customized food preferences of a user for use in generating one or more customized food items for the user;
   identifying one or more capable automated customized food generation machines that have one or more ingredients in one or more sufficient quantities to be able to currently generate at least one customized food item in accordance with the one or more customized food preferences of the user;
   providing one or more indicators that direct the user to at least one capable automated customized food generation machine; and
   generating, at least in part via the at least one robotic food manufacturing component, the at least one customized food item in accordance with the one or more customized food preferences of the user.

2. The system of claim 1, wherein acquiring one or more customized food preferences of a user for use in generating one or more customized food items for the user comprises:
   acquiring the one or more customized food preferences in response to detection that the user is within at least one proximity of one or more automated customized food generation machines designed to generate customized food items.

3. The system of claim 1, wherein acquiring one or more customized food preferences of a user for use in generating one or more customized food items for the user comprises:

acquiring one or more customized food preferences of a second user, the second user and the user having been determined to be affiliated with each other.

4. The system of claim 1, wherein acquiring one or more customized food preferences of a user for use in generating one or more customized food items for the user comprises:
acquiring one or more dietary preferences of the user.

5. The system of claim 1, wherein acquiring one or more customized food preferences of a user for use in generating one or more customized food items for the user comprises:
acquiring at least some historical dietary information associated with the user.

6. The system of claim 1, wherein acquiring one or more customized food preferences of a user for use in generating one or more customized food items for the user comprises:
acquiring at least some information indicating at least one of historical travel or movement information of the user.

7. The system of claim 1, wherein acquiring one or more customized food preferences of a user for use in generating one or more customized food items for the user comprises:
acquiring at least some historical usage information indicating historical user usage of one or more automated customized food generation machines.

8. The system of claim 1, wherein acquiring one or more customized food preferences of a user for use in generating one or more customized food items for the user comprises:
acquiring at least some historical response information indicating one or more historical user responses of the user in response to one or more automated customized food generation machine recommendations previously presented to the user that recommended to the user one or more specific automated customized food generation automated machines for use by the user.

9. The system of claim 1, wherein acquiring one or more customized food preferences of a user for use in generating one or more customized food items for the user comprises:
acquiring the one or more customized food preferences in response, at least in part, to a determination that an automated customized food generation machine designed to generate customized food items is unable to currently generate one or more customized food items in accordance with at least one customized food preference of the user.

10. The system of claim 1, wherein identifying one or more capable automated customized food generation machines that have one or more ingredients in one or more sufficient quantities to be able to currently generate at least one customized food item in accordance with the one or more customized food preferences of the user comprises:
identifying one or more capable automated customized food generation machines that are determined to be located within a short traveling distance from a location of the user and that have one or more ingredients in one or more sufficient quantities to be able to currently generate at least one customized food item in accordance with the one or more customized food preferences of the user.

11. The system of claim 1, wherein identifying one or more capable automated customized food generation machines that have one or more ingredients in one or more sufficient quantities to be able to currently generate at least one customized food item in accordance with the one or more customized food preferences of the user comprises:
identifying one or more capable automated customized food generation machines that have one or more ingredients in one or more sufficient quantities to be able to currently generate at least one customized food item in accordance with one or more dietary preferences of the user.

12. The system of claim 11, wherein identifying one or more capable automated customized food generation machines that have one or more ingredients in one or more sufficient quantities to be able to currently generate at least one customized food item in accordance with one or more dietary preferences of the user comprises:
identifying one or more capable automated customized food generation machines that have one or more ingredients in one or more sufficient quantities to be able to currently generate at least one customized food item in accordance with one or more ingredient preferences of the user.

13. The system of claim 11, wherein identifying one or more capable automated customized food generation machines that have one or more ingredients in one or more sufficient quantities to be able to currently generate at least one customized food item in accordance with one or more dietary preferences of the user comprises:
identifying one or more capable automated customized food generation machines that have one or more ingredients in one or more sufficient quantities to be able to currently generate at least one customized food item in accordance with one or more dietary schedules of the user.

14. The system of claim 11, wherein identifying one or more capable automated customized food generation machines that have one or more ingredients in one or more sufficient quantities to be able to currently generate at least one customized food item in accordance with one or more dietary preferences of the user comprises:
identifying one or more capable automated customized food generation machines that have one or more ingredients in one or more sufficient quantities to be able to currently generate at least one customized food item in accordance with one or more dietary restrictions of the user.

15. The system of claim 1, wherein identifying one or more capable automated customized food generation machines that have one or more ingredients in one or more sufficient quantities to be able to currently generate at least one customized food item in accordance with the one or more customized food preferences of the user comprises:
identifying one or more capable automated customized food generation machines that have one or more ingredients in one or more sufficient quantities to be able to currently generate at least one customized food item in accordance with one or more purity preferences of the user related to purity of one or more ingredients for use in generating the at least one customized food item.

16. The system of claim 15, wherein identifying one or more capable automated customized food generation machines that have one or more ingredients in one or more sufficient quantities to be able to currently generate at least one customized food item in accordance with one or more purity preferences of the user related to purity of one or more ingredients for use in generating the at least one customized food item comprises:
identifying one or more capable automated customized food generation machines that have one or more ingredients in one or more sufficient quantities to be able to currently generate at least one customized food item in accordance with one or more preferences of the user that one or more sources for the one or more ingredients were tested for at least one of presence or absence of one or more impurities, presence or absence of one or more selective bacteria, or presence or absence of one or more pesticides.

17. The system of claim 1, wherein identifying one or more capable automated customized food generation machines that have one or more ingredients in one or more sufficient quantities to be able to currently generate at least one customized food item in accordance with the one or more customized food preferences of the user comprises:

identifying one or more capable automated customized food generation machines that have one or more ingredients in one or more sufficient quantities to be able to currently generate at least one customized food item in accordance with one or more customized food preferences of the user that the one or more ingredients for use in generating the at least one customized food item were obtained from at least one of one or more specified sources or one or more specified locations.

18. The system of claim 1, wherein identifying one or more capable automated customized food generation machines that have one or more ingredients in one or more sufficient quantities to be able to currently generate at least one customized food item in accordance with the one or more customized food preferences of the user comprises:

identifying one or more capable automated customized food generation machines that have one or more ingredients in one or more sufficient quantities to be able to currently generate at least one customized food item in accordance with one or more customized food preferences of the user that the one or more ingredients for use in generating the at least one customized food item were not obtained from at least one of one or more specified sources or one or more specified locations.

19. The system of claim 1, wherein identifying one or more capable automated customized food generation machines that have one or more ingredients in one or more sufficient quantities to be able to currently generate at least one customized food item in accordance with the one or more customized food preferences of the user comprises:

identifying one or more substitute automated customized food generation machines that do not have the one or more ingredients in the one or more sufficient quantities to be able to currently generate the at least one customized food item in accordance with the one or more customized food preferences of the user but which are able to currently generate at least one substitute customized food item that is a substitute for the at least one customized food item.

20. The system of claim 19, wherein identifying one or more substitute automated customized food generation machines that do not have the one or more ingredients in the one or more sufficient quantities to be able to currently generate the at least one customized food item in accordance with the one or more customized food preferences of the user but which are able to currently generate at least one substitute customized food item that is a substitute for the at least one customized food item comprises:

identifying one or more substitute automated customized food generation machines that have one or more ingredients in one or more sufficient quantities to be able to currently generate a substitute customized food item that is substantially in compliance with the one or more customized food preferences of the user.

21. The system of claim 1, wherein identifying one or more capable automated customized food generation machines that have one or more ingredients in one or more sufficient quantities to be able to currently generate at least one customized food item in accordance with the one or more customized food preferences of the user comprises:

identifying the one or more capable automated customized food generation machines in response to detection that an automated customized food generation machine that the user is interfacing with is unable to generate at least one customized food item in compliance with the one or more customized food preferences of the user.

22. The system of claim 1, wherein providing one or more indicators that direct the user to at least one capable automated customized food generation machine comprises:

causing at least one mobile device associated with the user to provide the one or more indicators that direct the user to the at least one capable automated customized food generation machine.

23. The system of claim 22, wherein causing at least one mobile device associated with the user to provide the one or more indicators that direct the user to the at least one capable automated customized food generation machine comprises:

determining at least one current location of the user at least partially based on receiving, from the at least one mobile device associated with the user, at least one position indication derived from at least one hardware-based position sensor of the at least one mobile device of the user; and transmitting, to the at least one mobile device associated with the user, the one or more indicators that direct the user to the at least one capable automated customized food generation machine at least in part based on the at least one current location of the user.

24. The system of claim 23, wherein transmitting, to the at least one mobile device associated with the user, the one or more indicators that direct the user to the at least one capable automated customized food generation machine at least in part based on the at least one current location of the user comprises:

preparing at least one map, the at least one map depicting at least one route from the at least one current location of the user to at least one location of the at least one capable automated customized food generation machine; and transmitting at least one indication of the at least one map to the at least one mobile device associated with the user.

25. The system of claim 24, wherein preparing at least one map, the at least one map depicting at least one route from the at least one current location of the user to at least one location of the at least one capable automated customized food generation machine comprises:

presenting, as at least a portion of the at least one map, one or more indicators that indicate distance between the at least one current location of the user and at least one other automated customized food generation machine that is also capable of generating the at least one customized food item in accordance with the one or more customized food preferences of the user.

26. The system of claim 1, wherein providing one or more indicators that direct the user to at least one capable automated customized food generation machine comprises:

providing one or more indicators that direct the user to at least one automated customized food generation machine that was identified as having the one or more ingredients in the one or more sufficient quantities to be able to currently generate the at least one customized food item in accordance with the one or more customized food preferences of the user.

27. The system of claim 1, wherein providing one or more indicators that direct the user to at least one capable automated customized food generation machine comprises:
  providing one or more indicators that direct the user to at least one capable automated customized food generation machine that is identified as being located along or proximate to one or more historical travel routes of the user.

28. The system of claim 1, wherein providing one or more indicators that direct the user to at least one capable automated customized food generation machine comprises:
  providing one or more indicators of location of at least a first capable automated customized food generation machine and at least a second capable automated customized food generation machine and one or more indicators of at least one price discount for the at least one customized food item available via the at least a second capable automated customized food generation machine relative to a price for the at least one customized food item via the at least a first capable automated customized food generation machine.

29. The system of claim 1, wherein providing one or more indicators that direct the user to at least one capable automated customized food generation machine comprises:
  providing one or more indicators that indicate at least one substitute automated customized food generation machine that was identified as having one or more ingredients in one or more sufficient quantities to be able to currently generate at least one customized food item that is only in partial compliance with the one or more customized food preferences of the user.

30. The system of claim 29, wherein providing one or more indicators that indicate at least one substitute automated customized food generation machine that was identified as having one or more ingredients in one or more sufficient quantities to be able to currently generate at least one customized food item that is only in partial compliance with the one or more customized food preferences of the user comprises:
  providing one or more indicators that indicate at least one substitute automated customized food generation machine that was identified as having one or more ingredients in one or more sufficient quantities to be able to currently generate at least one customized food item that is in partial compliance with the one or more customized food preferences of the user and that was identified as being located closer to the user than one or more automated customized food generation machines that were identified as having one or more ingredients in one or more sufficient quantities to be able to currently generate at least one customized food item in full compliance with the one or more customized food preferences of the user.

31. The system of claim 29, wherein providing one or more indicators that indicate at least one substitute automated customized food generation machine that was identified as having one or more ingredients in one or more sufficient quantities to be able to currently generate at least one customized food item that is only in partial compliance with the one or more customized food preferences of the user comprises:
  providing one or more indicators that indicate at least one substitute automated customized food generation machine that was identified as having one or more ingredients in one or more sufficient quantities to be able to currently generate at least one customized food item that is in partial compliance with the one or more customized food preferences of the user and that was identified as being located closer to one or more historical travel routes of the user than one or more automated customized food generation machines that were identified as having one or more ingredients in one or more sufficient quantities to be able to currently generate at least one customized food item in full compliance with the one or more customized food preferences of the user.

32. The system of claim 29, wherein providing one or more indicators that indicate at least one substitute automated customized food generation machine that was identified as having one or more ingredients in one or more sufficient quantities to be able to currently generate at least one customized food item that is only in partial compliance with the one or more customized food preferences of the user comprises:
  providing one or more indicators that indicate at least one substitute automated customized food generation machine that was identified as having one or more ingredients in one or more sufficient quantities to be able to currently generate at least one customized food item that is in partial compliance with the one or more customized food preferences of the user and that was identified as having lower retail prices than retail prices of one or more automated customized food generation machines that were identified as having one or more ingredients in one or more sufficient quantities to be able to currently generate at least one customized food item in full compliance with the one or more customized food preferences of the user.

33. The system of claim 29, wherein providing one or more indicators that indicate at least one substitute automated customized food generation machine that was identified as having one or more ingredients in one or more sufficient quantities to be able to currently generate at least one customized food item that is only in partial compliance with the one or more customized food preferences of the user comprises:
  providing one or more indicators that indicate the at least one substitute automated customized food generation machine and that indicate one or more capable automated customized food generation machines that were identified as having one or more ingredients in one or more sufficient quantities to be able to currently generate at least one customized food item in full compliance with the one or more customized food preferences of the user.

34. A method, comprising:
  providing at least one automated customized food generation machine including at least one robotic food manufacturing component;
  acquiring one or more customized food preferences of a user for use in generating one or more customized food items for the user;
  identifying one or more capable automated customized food generation machines that have one or more ingredients in one or more sufficient quantities to be able to currently generate at least one customized food item in accordance with the one or more customized food preferences of the user;
  providing one or more indicators that direct the user to at least one capable automated customized food generation machine; and
  generating, at least in part via the at least one robotic food manufacturing component, the at least one customized food item in accordance with the one or more customized food preferences of the user.

35. A system, comprising:
at least one automated customized food generation machine including at least one robotic food manufacturing component
a computing device; and
at least one non-transitory computer-readable medium coupled with the computing device including at least one or more instructions which, when executed by the computing device, cause the computing device to perform one or more operations including at least:
acquiring one or more customized food preferences of a user for use in generating one or more customized food items for the user;
identifying one or more capable automated customized food generation machines that have one or more ingredients in one or more sufficient quantities to be able to currently generate at least one customized food item in accordance with the one or more customized food preferences of the user;
providing one or more indicators that direct the user to at least one capable automated customized food generation machine; and
generating, at least in part via the at least one robotic food manufacturing component, the at least one customized food item in accordance with the one or more customized food preferences of the user.

36. The system of claim 1, wherein generating, at least in part via the at least one robotic food manufacturing component, the at least one customized food item in accordance with the one or more customized food preferences of the user comprises:
detecting the user within at least one proximity of the at least one capable automated customized food generation machine; and
generating the at least one customized food item in accordance with the one or more customized food preferences of the user at least in part responsive to the user being within the at least one proximity of the at least one capable automated customized food generation machine.

37. The system of claim 36, wherein detecting the user within at least one proximity of the at least one capable automated customized food generation machine comprises:
detecting at least one mobile device of the user within the at least one proximity of the at least one capable automated customized food generation machine.

38. The system of claim 37, wherein detecting at least one mobile device of the user within the at least one proximity of the at least one capable automated customized food generation machine comprises:
detecting at least one direct Wi-Fi communication between the at least one mobile device and the at least one capable automated customized food generation machine.

39. The system of claim 1, wherein generating, at least in part via the at least one robotic food manufacturing component, the at least one customized food item in accordance with the one or more customized food preferences of the user comprises:
generating, at least in part via at least one food printer as the at least one robotic food manufacturing component, the at least one customized food item in accordance with the one or more customized food preferences of the user.

40. The system of claim 1, wherein generating, at least in part via the at least one robotic food manufacturing component, the at least one customized food item in accordance with the one or more customized food preferences of the user comprises:
generating, at least in part via at least one 3-D printing component, at least one heating component, at least one cooling component, or at least one molding component as the at least one robotic food manufacturing component, the at least one customized food item in accordance with the one or more customized food preferences of the user.

* * * * *